(12) United States Patent
Reese et al.

(10) Patent No.: US 11,207,824 B2
(45) Date of Patent: *Dec. 28, 2021

(54) LOCALIZED HEATING TO IMPROVE INTERLAYER BONDING IN 3D PRINTING

(71) Applicant: Arevo, Inc., Milpitas, CA (US)

(72) Inventors: Riley Reese, Sunnyvale, CA (US); Hemant Bheda, Saratoga, CA (US)

(73) Assignee: Arevo, Inc., Milpitas, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/845,673

(22) Filed: Dec. 18, 2017

(65) Prior Publication Data

US 2018/0117837 A1 May 3, 2018

Related U.S. Application Data

(63) Continuation of application No. PCT/US2017/035551, filed on Jun. 1, 2017.

(Continued)

(51) Int. Cl.
*B29C 69/00* (2006.01)
*B29C 64/135* (2017.01)
(Continued)

(52) U.S. Cl.
CPC .......... *B29C 64/135* (2017.08); *B23K 26/067* (2013.01); *B23K 26/0643* (2013.01);
(Continued)

(58) Field of Classification Search
CPC ......... B33Y 10/00; B33Y 30/00; B33Y 50/00; B33Y 50/02; B33Y 70/00; B29C 64/135;
(Continued)

(56) References Cited

U.S. PATENT DOCUMENTS 5,121,329 A 6/1992 Crump
5,578,227 A 11/1996 Rabinovich
(Continued)

FOREIGN PATENT DOCUMENTS

EP 3045992 A1 7/2016
EP 3051445 A1 8/2016
(Continued)

OTHER PUBLICATIONS

Clausen, et al. Exploiting Additive Manufacturing Infill in Topology Optimization for Improved Buckling Load. Engineering 2.2 (2016): 250-257.
(Continued)

*Primary Examiner* — Ryan M Ochylski
(74) *Attorney, Agent, or Firm* — Jing Wang; Kenneth Ottesen

(57) ABSTRACT

The present disclosure provides methods for printing at least a portion of a three-dimensional (3D) object, comprising receiving, in computer memory, a model of the 3D object. Next, at least one filament material from a source of the at least one filament material may be directed towards a substrate that is configured to support the 3D object, thereby depositing a first layer corresponding to a portion of the 3D object adjacent to the substrate. A second layer corresponding to at least a portion of the 3D object may be deposited. The first and second layer may be deposited in accordance with the model of the 3D object. At least a first energy beam from at least one energy source may be used to selectively melt at least a portion of the first layer and/or the second layer, thereby forming at least a portion of the 3D object.

21 Claims, 7 Drawing Sheets

Related U.S. Application Data

(60) Provisional application No. 62/344,250, filed on Jun. 1, 2016.

(51) Int. Cl.
| | |
|---|---|
| *B33Y 10/00* | (2015.01) |
| *B33Y 30/00* | (2015.01) |
| *B29C 67/00* | (2017.01) |
| *B29C 64/209* | (2017.01) |
| *B29C 64/295* | (2017.01) |
| *B33Y 50/02* | (2015.01) |
| *B29C 64/118* | (2017.01) |
| *B29C 64/393* | (2017.01) |
| *B29C 64/268* | (2017.01) |
| *B23K 26/06* | (2014.01) |
| *B23K 26/067* | (2006.01) |
| *B23K 26/34* | (2014.01) |
| *B33Y 70/00* | (2020.01) |
| *B29K 105/08* | (2006.01) |

(52) U.S. Cl.
CPC ............ *B23K 26/34* (2013.01); *B29C 64/118* (2017.08); *B29C 64/209* (2017.08); *B29C 64/268* (2017.08); *B29C 64/295* (2017.08); *B29C 64/393* (2017.08); *B29C 67/00* (2013.01); *B33Y 10/00* (2014.12); *B33Y 30/00* (2014.12); *B33Y 50/02* (2014.12); *B33Y 70/00* (2014.12); *B29K 2105/08* (2013.01)

(58) Field of Classification Search
CPC ... B29C 64/268; B29C 64/118; B29C 64/295; B29C 64/209; B29C 64/393; B29C 67/00; B23K 26/0643; B23K 26/067; B23K 26/34; B29K 2105/08
See application file for complete search history.

(56) References Cited

U.S. PATENT DOCUMENTS

| | | | |
|---|---|---|---|
| 6,004,124 A | 12/1999 | Swanson et al. | |
| 6,054,077 A | 4/2000 | Comb et al. | |
| 6,391,251 B1 | 5/2002 | Keicher et al. | |
| 6,441,342 B1 | 8/2002 | Hsu | |
| 7,024,272 B2 | 4/2006 | Thomas et al. | |
| 7,483,818 B2 | 1/2009 | Amakai et al. | |
| 7,896,209 B2 | 3/2011 | Batchelder et al. | |
| 7,897,074 B2 | 3/2011 | Batchelder et al. | |
| 8,308,876 B2 | 11/2012 | Woods et al. | |
| 8,465,111 B2 | 6/2013 | Swanson et al. | |
| 8,647,102 B2 | 2/2014 | Swanson et al. | |
| 8,808,603 B2 | 8/2014 | Swanson | |
| 8,920,697 B2 | 12/2014 | Mikulak et al. | |
| 9,102,099 B1 | 8/2015 | Karpas et al. | |
| 9,126,367 B1 | 9/2015 | Mark et al. | |
| 9,156,205 B2 | 10/2015 | Mark et al. | |
| 9,174,389 B2 | 11/2015 | Swanson | |
| 9,254,535 B2 | 2/2016 | Buller et al. | |
| 9,321,609 B2 | 4/2016 | Koop et al. | |
| 9,327,452 B2 | 5/2016 | Mark et al. | |
| 9,327,453 B2 | 5/2016 | Mark et al. | |
| 9,339,972 B2 | 5/2016 | Gordon | |
| 9,353,481 B2 | 5/2016 | Gupta et al. | |
| 9,533,451 B2 | 1/2017 | Folgar et al. | |
| 9,579,851 B2 | 2/2017 | Mark et al. | |
| 9,579,891 B2 | 2/2017 | Hayashi et al. | |
| 9,592,660 B2 | 3/2017 | Reese et al. | |
| 9,595,037 B2 | 3/2017 | Glasgow et al. | |
| 9,656,429 B1 | 5/2017 | Mantha et al. | |
| 9,724,877 B2 | 8/2017 | Flitsch et al. | |
| 9,738,030 B2 | 8/2017 | Lee et al. | |
| 9,757,880 B2 | 9/2017 | Rothfuss et al. | |
| 9,796,140 B2 | 10/2017 | Page et al. | |
| 9,815,268 B2 | 11/2017 | Mark et al. | |
| 10,052,813 B2 | 8/2018 | Armijo et al. | |
| 2005/0098260 A1 | 5/2005 | Chen et al. | |
| 2010/0312364 A1 | 12/2010 | Eryilmaz et al. | |
| 2013/0101728 A1 | 4/2013 | Keremes et al. | |
| 2013/0255346 A1 | 10/2013 | Danby et al. | |
| 2013/0316081 A1 | 11/2013 | Kovalcik et al. | |
| 2014/0232035 A1 | 8/2014 | Bheda | |
| 2014/0265035 A1 | 9/2014 | Buser et al. | |
| 2014/0268604 A1 | 9/2014 | Wicker et al. | |
| 2014/0277669 A1 | 9/2014 | Nardi et al. | |
| 2014/0291886 A1 | 10/2014 | Mark et al. | |
| 2014/0328963 A1 | 11/2014 | Mark et al. | |
| 2014/0361460 A1* | 12/2014 | Mark .................... B29C 70/521 264/248 |
| 2014/0371895 A1 | 12/2014 | Sadusk et al. | |
| 2015/0045928 A1 | 2/2015 | Perez et al. | |
| 2015/0052025 A1 | 2/2015 | Apsley et al. | |
| 2015/0097308 A1 | 4/2015 | Batchelder et al. | |
| 2015/0246481 A1 | 9/2015 | Schlick et al. | |
| 2015/0251356 A1 | 9/2015 | Batchelder et al. | |
| 2015/0273583 A1 | 10/2015 | Bumgardner | |
| 2015/0298393 A1 | 10/2015 | Suarez | |
| 2015/0314532 A1 | 11/2015 | Gordon et al. | |
| 2015/0321255 A1 | 11/2015 | Colin et al. | |
| 2015/0321422 A1 | 11/2015 | Boyer | |
| 2015/0328839 A1 | 11/2015 | Willis et al. | |
| 2015/0331402 A1 | 11/2015 | Lin et al. | |
| 2015/0336292 A1 | 11/2015 | Mikulak et al. | |
| 2015/0360288 A1 | 12/2015 | Zalewski et al. | |
| 2016/0031159 A1 | 2/2016 | Church et al. | |
| 2016/0038655 A1 | 2/2016 | Weisman et al. | |
| 2016/0046081 A1 | 2/2016 | Kim et al. | |
| 2016/0075091 A1 | 3/2016 | Cable | |
| 2016/0082641 A1 | 3/2016 | Bogucki et al. | |
| 2016/0129643 A1 | 5/2016 | Mark et al. | |
| 2016/0136885 A1 | 5/2016 | Nielsen-Cole et al. | |
| 2016/0136887 A1 | 5/2016 | Guillemette et al. | |
| 2016/0144564 A1 | 5/2016 | Padgett et al. | |
| 2016/0144565 A1 | 5/2016 | Mark et al. | |
| 2016/0144566 A1 | 5/2016 | Mark et al. | |
| 2016/0151833 A1 | 6/2016 | Tsao | |
| 2016/0159012 A1 | 6/2016 | Lee et al. | |
| 2016/0184925 A1 | 6/2016 | Huang et al. | |
| 2016/0185028 A1 | 6/2016 | Bogue et al. | |
| 2016/0236279 A1 | 8/2016 | Ashton et al. | |
| 2016/0236414 A1 | 8/2016 | Reese et al. | |
| 2016/0236416 A1 | 8/2016 | Bheda et al. | |
| 2016/0236419 A1 | 8/2016 | Griffin et al. | |
| 2016/0243649 A1 | 8/2016 | Zheng et al. | |
| 2016/0257068 A1 | 9/2016 | Albert et al. | |
| 2016/0266573 A1 | 9/2016 | Bheda et al. | |
| 2016/0271880 A1 | 9/2016 | Bheda et al. | |
| 2016/0288264 A1* | 10/2016 | Jones ......................... B22F 7/08 |
| 2016/0297142 A1 | 10/2016 | Bheda et al. | |
| 2016/0297935 A1 | 10/2016 | Reese et al. | |
| 2016/0303805 A1 | 10/2016 | Chen et al. | |
| 2016/0311165 A1 | 10/2016 | Mark et al. | |
| 2016/0325491 A1 | 11/2016 | Sweeney et al. | |
| 2016/0332366 A1 | 11/2016 | Donovan | |
| 2016/0332380 A1 | 11/2016 | De Pena et al. | |
| 2016/0346998 A1 | 12/2016 | Mark et al. | |
| 2016/0361869 A1 | 12/2016 | Mark et al. | |
| 2016/0368213 A1 | 12/2016 | Mark | |
| 2017/0021565 A1 | 1/2017 | Deaville | |
| 2017/0036403 A1 | 2/2017 | Ruff et al. | |
| 2017/0057160 A1 | 3/2017 | Duty et al. | |
| 2017/0057167 A1 | 3/2017 | van Tooren et al. | |
| 2017/0072633 A1 | 3/2017 | Hsu | |
| 2017/0080642 A1 | 3/2017 | Tyler | |
| 2017/0096576 A1 | 4/2017 | Bheda et al. | |
| 2017/0120519 A1 | 5/2017 | Mark | |
| 2017/0144375 A1 | 5/2017 | Waldrop, III et al. | |
| 2017/0145155 A1 | 5/2017 | Wright et al. | |
| 2017/0146489 A1 | 5/2017 | Redding et al. | |
| 2017/0151704 A1 | 6/2017 | Go et al. | |
| 2017/0151728 A1 | 6/2017 | Kuno et al. | |
| 2017/0157843 A1 | 6/2017 | Nystrom et al. | |
| 2017/0173868 A1 | 6/2017 | Mark | |

(56) References Cited

U.S. PATENT DOCUMENTS

| | | |
|---|---|---|
| 2017/0197371 A1 | 7/2017 | Fetfatsidis et al. |
| 2017/0210074 A1 | 7/2017 | Ueda et al. |
| 2017/0247553 A1 | 8/2017 | Ganapathiappan et al. |
| 2017/0266885 A1 | 9/2017 | Gifford et al. |
| 2017/0274585 A1 | 9/2017 | Armijo et al. |
| 2017/0304894 A1 | 10/2017 | Buller |
| 2017/0326802 A1 | 11/2017 | Mark et al. |
| 2017/0368748 A1 | 12/2017 | De Pena et al. |
| 2018/0001550 A1 | 1/2018 | Zhao et al. |
| 2018/0243978 A1 | 8/2018 | Nguyen et al. |
| 2018/0272460 A1* | 9/2018 | Nelson .................. B22F 3/1055 |
| 2018/0321659 A1 | 11/2018 | Dasappa et al. |

FOREIGN PATENT DOCUMENTS

| | | |
|---|---|---|
| EP | 3148711 A1 | 4/2017 |
| EP | 3150361 A1 | 4/2017 |
| GB | 2453945 A | 4/2009 |
| KR | 100847550 B1 | 7/2008 |
| KR | 20130060144 A | 6/2013 |
| KR | 101451794 B1 | 10/2014 |
| WO | 2014193505 A1 | 12/2014 |
| WO | WO-2015009938 A1 | 1/2015 |
| WO | WO-2015042422 A1 | 3/2015 |
| WO | 2015119819 A2 | 8/2015 |
| WO | 2015130401 A2 | 9/2015 |
| WO | WO-2015163776 A1 | 10/2015 |
| WO | 2015193819 A2 | 12/2015 |
| WO | WO-2016142472 A1 | 9/2016 |
| WO | WO-2016187106 A1 | 11/2016 |
| WO | WO-2017008789 A1 | 1/2017 |
| WO | WO-2017100783 A1 | 6/2017 |
| WO | WO-2017123726 A1 | 7/2017 |
| WO | WO-2017149896 A1 | 9/2017 |
| WO | WO-2017210490 A1 | 12/2017 |
| WO | WO-2018182773 | 10/2018 |
| WO | WO-2018204574 | 11/2018 |
| WO | WO-2018217650 A1 | 11/2018 |
| WO | WO-2019050509 | 3/2019 |

OTHER PUBLICATIONS

Co-pending U.S. Appl. No. 15/845,629, filed Dec. 18, 2017.
Co-pending U.S. Appl. No. 15/845,762, filed Dec. 18, 2017.
Co-pending U.S. Appl. No. 15/845,843, filed Dec. 18, 2017.
International search report and written opinion dated Aug. 17, 2017 for PCT Application No. PCT/US2017/035551.
International search report and written opinion dated Nov. 22, 2017 for PCT Application No. PCT/US2017/045986.
Notice of allowance dated Jan. 4, 2017 for U.S. Appl. No. 15/232,767.
Notice of allowance dated Apr. 27, 2017 for U.S. Appl. No. 15/232,767.
Notice of allowance dated Nov. 30, 2017 for U.S. Appl. No. 14/623,471.
Office action dated Mar. 30, 2017 for U.S. Appl. No. 14/623,471.
Office action dated Aug. 30, 2017 for U.S. Appl. No. 14/623,471.
Office action dated Sep. 14, 2017 for U.S. Appl. No. 14/621,205.
Office action dated Nov. 14, 2016 for U.S. Appl. No. 15/232,767.
Wong, et al. A review of additive manufacturing. ISRN Mechanical Engineering 2012.
Wu, et al. Infill Optimization for Additive Manufacturing-Approaching Bone-like Porous Structures. IEEE Transactions on Visualization and Computer Graphics (2017).
Co-pending U.S. Appl. No. 15/479,055, filed Apr. 4, 2017.
U.S. Appl. No. 15/471,786 Notice of Allowance dated Jun. 27, 2018.
Co-pending U.S. Appl. No. 15/587,292, filed May 4, 2017.
Co-pending U.S. Appl. No. 16/033,041, filed Jul. 11, 2018.
PCT/US2017/050153 International Search Report and Written Opinion dated May 24, 2018.
PCT/US2017/050155 International Search Report and Written Opinion dated Dec. 7, 2017.
U.S. Appl. No. 15/471,786 Notice of Allowance dated Feb. 7, 2018.
U.S. Appl. No. 15/471,786 Office Action dated Aug. 23, 2017.
U.S. Appl. No. 15/845,629 Office Action dated Apr. 13, 2018.
U.S. Appl. No. 15/845,762 Office Action dated Apr. 6, 2018.
U.S. Appl. No. 15/845,843 Office Action dated Apr. 3, 2018.
Zhang, et al. Study on Metamorphic Rolling Mechanism for Metal Hybrid Additive Manufacturing. The 24th international SFF symposium-an additive manufacturing conference. Aug. 2013.
U.S. Appl. No. 15/845,843 Office Action dated Mar. 8, 2019.
U.S. Appl. No. 15/587,292 Office Action dated Feb. 6, 2019.
PCT/US2018/030785 International Search Report and Written Opinion dated Sep. 28, 2018.
U.S. Appl. No. 15/845,629 Office Action dated Oct. 19, 2018.
U.S. Appl. No. 15/845,762 Office Action dated Oct. 19, 2018.
U.S. Appl. No. 15/845,843 Office Action dated Oct. 19, 2018.
PCT/US2018/033710 International Search Report and Written Opinion dated Oct. 31, 2018.
U.S. Appl. No. 15/845,629 Office Action dated Apr. 19, 2019.
U.S. Appl. No. 15/845,762 Office Action dated May 3, 2019.
U.S. Appl. No. 15/845,629, USPTO Office action dated Jun. 26, 2020.
U.S. Appl. No. 15/845,762, USPTO Notice of Allowance dated Sep. 8, 2020.
U.S. Appl. No. 15/845,762, USPTO Office action dated May 29, 2020.
U.S. Appl. No. 15/845,843, USPTO Office action dated Dec. 27, 2019.
EP application No. 17807520.6, "Extended European search report," dated Dec. 6, 2019.
U.S. Appl. No. 15/845,762, USPTO Office action dated Nov. 1, 2019.
U.S. Appl. No. 15/845,629, USPTO Notice of Allowance dated Oct. 20, 2020.
U.S. Appl. No. 15/845,843, USPTO Office action dated Nov. 27, 2020.
U.S. Appl. No. 15/845,843, USPTO Office action dated Jun. 25, 2021.
U.S. Appl. No. 15/845,843, USPTO Notice of Allowance dated Sep. 15, 2021.

* cited by examiner

LOCALIZED HEATING TO IMPROVE INTERLAYER BONDING IN 3D PRINTING

CROSS-REFERENCE

The present application is a continuation of International Application No. PCT/US2017/035551, filed Jun. 1, 2017, which claims the benefit of U.S. Provisional Patent Application No. 62/344,250, filed Jun. 1, 2016, each of which is entirely incorporated herein by reference.

BACKGROUND

Additive manufacturing has been utilized for printing three-dimensional parts by depositing successive layers of material in an automated manner. Techniques of additive manufacturing include, without limitation, fused deposition modeling (FDM), fused filament fabrication (FFF), Plastic Jet Printing (PJP), extrusion-based techniques, jetting, selective laser sintering, powder/binder jetting, electron-beam melting, and stereolithographic processes. Using these techniques, a material (e.g., a heated and/or pressurized thermoplastic) may pass through a print head. The print head may be moved in a predefined trajectory (e.g., a tool path) as the material discharges from the print head, such that the material is laid down in a particular pattern and shape of overlapping layers. The material, after exiting the print head, may harden into a final form.

SUMMARY

In an aspect, the present disclosure provides a method for printing at least a portion of a three-dimensional (3D) object, comprising (a) receiving, in computer memory, a model of the 3D object; (b) subsequent to receiving the model of the 3D object, directing at least one filament material from a source of the at least one filament material towards a substrate that is configured to support the 3D object, thereby depositing a first layer corresponding to a portion of the 3D object adjacent to the substrate, which first layer is deposited in accordance with the model of the 3D object; (c) depositing a second layer corresponding to at least a portion of the 3D object, which second layer is deposited in accordance with the model of the 3D object; and (d) using at least a first energy beam from at least one energy source to selectively melt at least a portion of the first layer and/or the second layer, thereby forming at least a portion of the 3D object. In some embodiments, (a)-(c) are performed using fused deposition modeling. In some embodiments, the method for printing at least a portion of a 3D object, further comprises depositing one or more additional layers adjacent to the first layer prior to depositing the second layer. In some embodiments, (b) comprises (i) directing the at least one filament material from the source to an opening, and (ii) directing the at least one filament material from the opening towards the substrate.

In some embodiments, the at least one filament material is a composite material. In some embodiments, the at least one filament material is a continuous fiber composite. In some embodiments, the continuous fiber composite is selected from the group consisting of glass, carbon, aramid, cotton, silicon carbide, polymer, wool, metal, and any combination thereof. In some embodiments, the at least one filament material has a cross sectional shape selected from the group consisting of circle, ellipse, parabola, hyperbola, convex polygon, concave polygon, cyclic polygon, equilateral polygon, equiangular polygon, regular convex polygon, regular star polygon, tape-like geometry, and any combination thereof. In some embodiments, the at least one filament material has a diameter of about 0.1 millimeters to 5 millimeters. In some embodiments, the at least one energy source is a laser and/or source of a hot fluid.

In some embodiments, the at least one energy source is in optical communication with one or more beam splitters, which one or more beam splitters splits the energy beam from the at least one energy source into one or more beamlets that yields the at least the first energy beam. In some embodiments, the one or more beam splitters is selected from the group consisting of prism, glass sheet, plastic sheet, mirror, dielectric mirror, metal-coated mirror, partially reflecting mirror, pellicles, micro-optic beam splitters, waveguide beam splitters, beam splitter cubes, fiber-optic beam splitter, and any combination thereof. In some embodiments, the method for printing at least a portion of a 3D object further comprises one or more optical wedges in optical communication with the one or more beam splitters, which one or more optical wedges form the at least the first energy beam. In some embodiments, the one or more optical wedges form the at least said first energy beam in a uniform orientation. In some embodiments, the one or more beamlets passes through one or more focusing lenses prior to passing through the one or more optical wedges. In some embodiments, the one or more focusing lenses adjust a ratio of a minor axis to a major axis of the one or more beamlets. In some embodiments, the one or more beamlets have an elliptical polarization. In some embodiments, the one or more beamlets comprises a minor axis of at least about 1 millimeter and a major axis of at least about 15 millimeters. In some embodiments, the one or more optical wedges directs an optical path of the at least the first energy beam of a given location, direction, or angle normal to the substrate and/or along the substrate among one or more locations, directions, or angles. In some embodiments, the one or more optical wedges is a Risley prism pair. In some embodiments, the one or more optical wedges has a refractive index of at least about 1.

In some embodiments, the one or more optical wedges comprise a first optical wedge and a second optical wedge. In some embodiments, the one or more optical wedges has a diameter from about 0.1 inches to 1 inch. In some embodiments, the first optical wedge rotates relative to the second optical wedge to change the direction of the at least the first energy beam. In some embodiments, the first optical wedge and the second optical wedge are angled in the same direction increase an angle of the at least the first energy beam with respect to a reference. In some embodiments, the first optical wedge and the second optical wedge rotates in an opposite direction to allow the at least the first energy beam to pass vertically through the one or more optical wedges. In some embodiments, altering an angle of incidence of the first optical wedge and the second optical wedge alters a fluence of the at least the first energy beam. In some embodiments, the at least said first energy beam is incident on the at least one filament material and on the substrate. In some embodiments, the at least said first energy beam covers at least a portion of the at least one filament material. In some embodiments, the at least the first energy beam is directed along a given angle among one or more angles relative to the dispensing route of the at least one filament material.

In some embodiments, (b) of the method for printing at least a portion of the 3D object comprises directing at least one filament material to a compaction unit. In some embodiments, the method for printing at least a portion of the 3D object further comprises compacting the at least one filament material by the compaction unit to form at least one compacted filament material. In some embodiments, the compaction unit comprises a rigid body, one or more idler rollers, at least one freely suspended roller, a coolant unit, or a combination thereof. In some embodiments, the at least one freely suspended roller has a diameter from about 1 millimeter to 10 millimeter. In some embodiments, (b)-(d) of the method for printing at least a portion of the 3D object comprises using one or more sensors to measure one or more temperature(s) along the at least one filament material. In some embodiments, the one or more sensors control intensities of the at least the first energy beam. In some embodiments, the one or more sensors is an optical pyrometer. In some embodiments, a real time simulation provides feedback control of a given location, direction, or angle of the at least the first energy beam normal to the substrate and/or along the substrate among one or more locations, directions, or angles. In some embodiments, the at least the first energy beam heats the at least one filament material without melting a deposited portion of the at least one filament material. In some embodiments, the at least the first energy beam heats and melts a deposited portion of the at least one filament material at a given location among one or more locations. In some embodiments, altering a direction of a major axis of the at least the first energy beam relative to the substrate or the at least one filament material alters a fluence of the at least the first energy beam.

In another aspect, the present disclosure provides a method for printing at least a portion of a three-dimensional (3D) object, comprising (a) receiving, in computer memory, a model of the 3D object; (b) subsequent to receiving the model of the 3D object, directing at least one filament material from a source of the at least one filament material towards a substrate that is configured to support the 3D object, thereby depositing a first layer corresponding to a portion of the 3D object adjacent to the substrate, which first layer is deposited in accordance with the model of the 3D object; (c) using at least a first energy beam from at least one energy source to melt at least a portion of the first layer; and (d) depositing a second layer corresponding to at least a portion of the 3D object, which second layer is deposited in accordance with the model of the 3D object, thereby generating the at least the portion of the 3D object. In some embodiments, (a)-(d) are performed using fused deposition modeling. In some embodiments, the method for printing at least a portion of a 3D object further comprises repeating (b)-(d) one or more times. In some embodiments, (b) comprises (i) directing the at least one filament material from the source to an opening, and (ii) directing the at least one filament material from the opening towards the substrate.

In some embodiments, the at least one filament material is a composite material. In some embodiments, the at least one filament material is a continuous fiber composite. In some embodiments, the continuous fiber composite is selected from the group consisting of glass, carbon, aramid, cotton, silicon carbide, polymer, wool, metal, and any combination thereof. In some embodiments, the at least one filament material has a cross sectional shape selected from the group consisting of circle, ellipse, parabola, hyperbola, convex polygon, concave polygon, cyclic polygon, equilateral polygon, equiangular polygon, regular convex polygon, regular star polygon, tape-like geometry, and any combination thereof. In some embodiments, the at least one filament material has a diameter of about 0.1 millimeters to 5 millimeters. In some embodiments, the at least one energy source is a laser and/or source of a hot fluid. In some embodiments, the at least one energy source is in optical communication with one or more beam splitters, which one or more beam splitters splits the energy beam from the at least one energy source into one or more beamlets that yields the at least the first energy beam. In some embodiments, the one or more beam splitters is selected from the group consisting of prism, glass sheet, plastic sheet, mirror, dielectric mirror, metal-coated mirror, partially reflecting mirror, pellicles, micro-optic beam splitters, waveguide beam splitters, beam splitter cubes, fiber-optic beam splitter, and any combination thereof.

In some embodiments, the method for printing at least a portion of a 3D object further comprises one or more optical wedges in optical communication with the one or more beam splitters, which one or more optical wedges form the at least the first energy beam. In some embodiments, the one or more optical wedges form the at least the first energy beam in a uniform orientation. In some embodiments, the one or more beamlets passes through one or more focusing lenses prior to passing through the one or more optical wedges. In some embodiments, the one or more focusing lenses adjust a ratio of a minor axis to a major axis of the one or more beamlets. In some embodiments, the one or more beamlets have an elliptical polarization. In some embodiments, the one or more beamlets comprises a minor axis of at least about 1 millimeter and a major axis of at least about 15 millimeters. In some embodiments, the one or more optical wedges directs an optical path of the at least the first energy beam of a given location, direction, or angle normal to the substrate and/or along the substrate among one or more locations, directions, or angles. In some embodiments, the one or more optical wedges is a Risley prism pair. In some embodiments, the one or more optical wedges has a refractive index of at least about 1.

In some embodiments, the one or more optical wedges comprise a first optical wedge and a second optical wedge. In some embodiments, the one or more optical wedges has a diameter from about 0.1 inches to 1 inch. In some embodiments, the first optical wedge rotates relative to the second optical wedge to change the direction of the at least the first energy beam. In some embodiments, the first optical wedge and the second optical wedge are angled in the same direction to increase an angle of the at least said first energy beam with respect to a reference. In some embodiments, the first optical wedge and the second optical wedge rotates in an opposite direction to allow the at least the first energy beam to pass vertically through the one or more optical wedges. In some embodiments, altering an angle of incidence of the first optical wedge and the second optical wedge alters a fluence of the at least the first energy beam. In some embodiments, the at least the first energy beam is incident on the at least one filament material and on the substrate. In some embodiments, the at least the first energy beam covers at least a portion of the at least one filament material. In some embodiments, the at least the first energy beam is directed along a given angle among one or more angles relative to the dispensing route of the at least one filament material.

In some embodiments, (b) of the method for printing at least a portion of a 3D object comprises directing the at least one filament material to a compaction unit. In some embodiments, the method for printing at least a portion of a 3D object further comprises compacting the at least one filament material by the compaction unit to form at least one compacted filament material. In some embodiments, the compaction unit comprises a rigid body, one or more idler rollers, at least one freely suspended roller, a coolant unit, or a combination thereof. In some embodiments, the at least one freely suspended roller has a diameter from about 1 millimeter to 10 millimeter. In some embodiments, (b)-(d) of the method for printing at least a portion of a 3D object comprises using one or more sensors to measure one or more temperature(s) along the at least one filament material. In some embodiments, the one or more sensors control intensities of the at least the first energy beam. In some embodiments, the one or more sensors is an optical pyrometer. In some embodiments, a real time simulation provides feedback control of a given location, direction, or angle of the at least the first energy beam normal to the substrate and/or along the substrate among one or more locations, directions, or angles. In some embodiments, the at least the first energy beam heats the at least one filament material without melting a deposited portion of the at least one filament material. In some embodiments, the at least the first energy beam heats and melts a deposited portion of the at least one filament material at a given location among the one or more locations. In some embodiments, altering a direction of a major axis of the at least the first energy beam relative to the substrate or the at least one filament material alters a fluence of the at least the first energy beam.

In another aspect, the present disclosure provides a system for printing at least a portion of a three-dimensional (3D) object, comprising a source of at least one filament material that is configured to supply at least one filament material for generating the 3D object, a substrate for supporting at least the portion of the 3D object, and at least one energy source configured to deliver at least a first energy beam. Such system may further comprise a controller operatively coupled to the at least one energy source, wherein the controller is programmed to (i) receive, in computer memory, a model of the 3D object, (ii) subsequent to receiving the model of the 3D object, direct the at least one filament material from the source of the at least one filament material towards the substrate that is configured to support the 3D object, thereby depositing a first layer corresponding to a portion of the 3D object adjacent to the substrate, which first layer is deposited in accordance with the model of the 3D object, (iii) deposit a second layer corresponding to at least a portion of the 3D object, which second layer is deposited in accordance with the model of the 3D object, and (iv) use at least a first energy beam from at least one energy source to selectively melt at least a portion of the first layer and/or the second layer, thereby forming at least a portion of the 3D object. In some embodiments, the controller is further programmed to perform fused deposition modeling on (i)-(iii). In some embodiments, the controller is further programmed to deposit one or more additional layers adjacent to the first layer prior to depositing the second layer. In some embodiments, the system for printing at least a portion of a three-dimensional (3D) object further comprises an opening that is configured to (i) receive the at least one filament material, and (ii) direct the at least one filament material towards the substrate.

In some embodiments, the system for printing at least a portion of a three-dimensional (3D) object further comprises a compaction unit for compressing the at least one filament material along the substrate. In some embodiments, the compaction unit comprises a rigid body, one or more idler rollers, at least one freely suspended roller, a coolant unit, or any combination thereof. In some embodiments, the at least one freely suspended roller has a diameter from about 1 millimeter to 10 millimeter. In some embodiments, the system for printing at least a portion of a three-dimensional (3D) object further comprises one or more sensors to measure one or more temperature(s) along the at least one filament material. In some embodiments, the one or more sensors is an optical pyrometer. In some embodiments, the substrate comprises a drive unit for moving the substrate.

In some embodiments, the at least one filament material is a composite material. In some embodiments, the least one filament material is a continuous fiber composite. In some embodiments, the continuous fiber composite includes one or more members selected from the group consisting of glass, carbon, aramid, cotton, silicon carbide, polymer, wool, and metal. In some embodiments, the at least one filament material has a diameter from about 0.1 millimeters to 5 millimeters. In some embodiments, the at least one energy source is a laser and/or source of a hot fluid.

In some embodiments, the system for printing at least a portion of a three-dimensional (3D) object further comprises an optical unit in which at least one energy source is in optical communication with one or more beam splitters, which one or more beam splitters splits an energy beam from the at least one energy source into one or more beamlets that yield the at least said first energy beam. In some embodiments, the optical unit comprises one or more elements selected from the group consisting of one or more beam splitters, one or more focusing lenses, and one or more optical wedges. In some embodiments, the one or more beam splitters is selected from the group consisting of prism, glass sheet, plastic sheet, mirror, dielectric mirror, metal-coated mirror, partially reflecting mirror, pellicles, micro-optic beam splitters, waveguide beam splitters, beam splitter cubes, fiber-optic beam splitter, and any combination thereof. In some embodiments, the one or more optical wedges is a Risley prism pair. In some embodiments, the one or more optical wedges have a refractive index of at least about 1. In some embodiments, the one or more optical wedges comprise a first optical wedge and a second optical wedge. In some embodiments, the one or more optical wedges has a diameter from about 0.1 inches to 1 inch. In some embodiments, the controller further comprises a real time simulation program for providing feedback during printing of said 3D object. In some embodiments, the real time simulation program is a feedback control system.

In another aspect, the present disclosure provides a system for printing at least a portion of a three-dimensional (3D) object, comprising a source of at least one filament material that is configured to supply at least one filament material for generating the 3D object, a substrate for supporting at least the portion of the 3D object, and at least one energy source configured to deliver at least a first energy beam. Such system may further comprise a controller operatively coupled to the at least one energy source, wherein the controller is programmed to (i) receive, in computer memory, a model of the 3D object, (ii) subsequent to receiving the model of the 3D object, direct the at least one filament material from the source of the at least one filament material towards the substrate that is configured to support the 3D object, thereby depositing a first layer corresponding to a portion of the 3D object adjacent to the substrate, which first layer is deposited in accordance with the model of the 3D object, (iii) use at least a first energy beam from at least one energy source to melt at least a portion of the first layer, and (iv) deposit a second layer corresponding to at least said portion of the 3D object, which second layer is deposited in accordance with the model of the 3D object, thereby generating at least a portion of the 3D object. In some embodiments, the controller is further programmed to perform fused deposition modeling on (i)-(iv). In some embodiments, the controller is programmed further to repeat (ii)-(iv) one or more times. In some embodiments, system for printing at least a portion of the 3D object further comprises an opening configured to (i) receive the at least one filament material, and (ii) direct the at least one filament material towards the substrate.

In some embodiments, system for printing at least a portion of the 3D object further comprises a compaction unit for compressing the at least one filament material along the substrate. In some embodiments, the compaction unit comprises a rigid body, one or more idler rollers, at least one freely suspended roller, a coolant unit, or any combination thereof. In some embodiments, the at least one freely suspended roller has a diameter from about 1 millimeter to 10 millimeter. In some embodiments, system for printing at least a portion of the 3D object further comprises one or more sensors to measure one or more temperature(s) along the at least one filament material. In some embodiments, the one or more sensors is an optical pyrometer. In some embodiments, the substrate comprises a drive unit for moving the substrate.

In some embodiments, the at least one filament material is a composite material. In some embodiments, the at least one filament material is a continuous fiber composite. In some embodiments, the continuous fiber composite is selected from the group consisting of glass, carbon, aramid, cotton, silicon carbide, polymer, wool, metal, or any combination thereof. In some embodiments, the at least one filament material has a diameter from about 0.1 millimeters to 5 millimeters. In some embodiments, the at least one energy source is a laser and/or source of a hot fluid.

In some embodiments, system for printing at least a portion of the 3D object further comprises an optical unit in which at least one energy source is in optical communication with one or more beam splitters, which one or more beam splitters splits an energy beam from the at least one energy source into one or more beamlets that yield the at least the first energy beam. In some embodiments, the optical unit comprises one or more elements selected from the group consisting of one or more beam splitters, one or more focusing lenses, and one or more optical wedges. In some embodiments, the one or more beam splitters is selected from the group consisting of prism, glass sheet, plastic sheet, mirror, dielectric mirror, metal-coated mirror, partially reflecting mirror, pellicles, micro-optic beam splitters, waveguide beam splitters, beam splitter cubes, fiber-optic beam splitter, and any combination thereof. In some embodiments, the one or more optical wedges is a Risley prism pair. In some embodiments, the one or more optical wedges have a refractive index of at least about 1. In some embodiments, the one or more optical wedges comprise a first optical wedge and a second optical wedge. In some embodiments, the one or more optical wedges has a diameter from about 0.1 inches to 1 inch. In some embodiments, the controller further comprises a real time simulation program for providing feedback during printing of the 3D object. In some embodiments, the real time simulation program is a feedback control unit.

Additional aspects and advantages of the present disclosure may become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

DETAILED DESCRIPTION

Figure 1A:
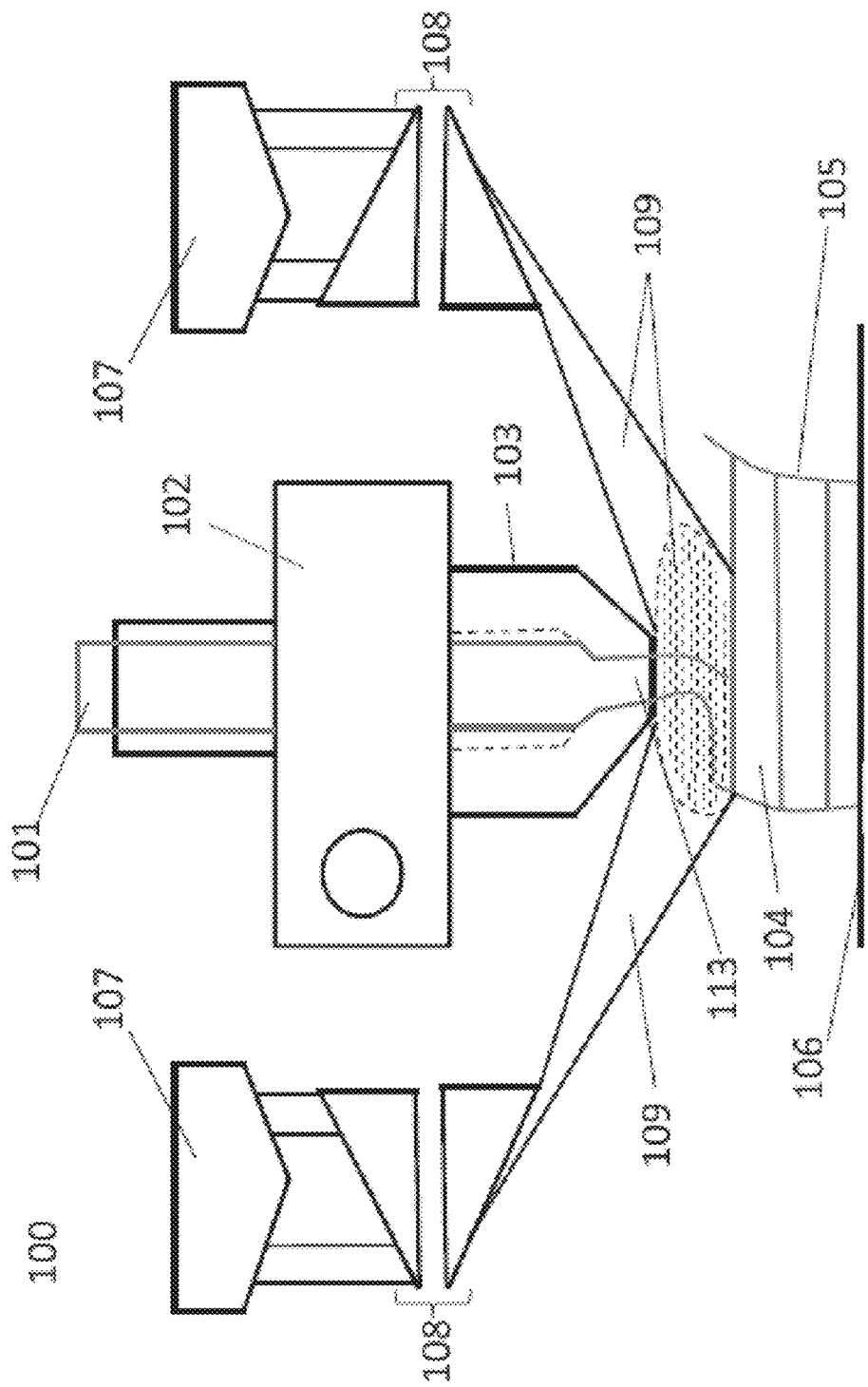
FIG. 1A illustrates an example system that may be used to produce a three-dimensional object with extrusion having any desired shape, size, and structure using a modulated energy beam angled by optical wedges.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "three-dimensional printing" (also "3D printing"), as used herein, generally refers to a process or method for generating a 3D part (or object). For example, 3D printing may refer to sequential addition of material layer or joining of material layers or parts of material layers to form a three-dimensional (3D) part, object, or structure, in a controlled manner (e.g., under automated control). In the 3D printing process, the deposited material can be fused, sintered, melted, bound or otherwise connected to form at least a part of the 3D object. Fusing the material may include melting or sintering the material. Binding can comprise chemical bonding. Chemical bonding can comprise covalent bonding. Examples of 3D printing include additive printing (e.g., layer by layer printing, or additive manufacturing). The 3D printing may further comprise subtractive printing.

The term "part," as used herein, generally refers to an object. A part may be generated using 3D printing methods and systems of the present disclosure. A part may be a portion of a larger part or object, or an entirety of an object. A part may have various form factors, as may be based on a model of such part. Such form factors may be predetermined.

The term "composite material," as used herein, generally refers to a material made from two or more constituent materials with different physical or chemical properties that, when combined, produce a material with characteristics different from the individual components.

The term "fuse", as used herein, generally refers to binding, agglomerating, or polymerizing. Fusing may include melting, softening or sintering. Binding may comprise chemical binding. Chemical binding may include covalent binding. The energy source resulting in fusion may supply energy by a laser, a microwave source, source for resistive heating, an infrared energy (IR) source, a ultraviolet (UV) energy source, hot fluid (e.g., hot air), a chemical reaction, a plasma source, a microwave source, an electromagnetic source, or an electron beam. Resistive heating may be joule heating. A source for resistive heating may be a power supply. The hot fluid can have a temperature greater than 25° C., or greater than or equal to about 40° C., 50° C., 60° C., 70° C., 80° C., 90° C., 100° C., 150° C., 200° C., 250° C., 300° C., 350° C., 400° C., 450° C., 500° C., or higher. The hot fluid may have a temperature that is selected to soften or melt a material used to print an object. The hot fluid may have a temperature that is at or above a melting point or glass transition point of a polymeric material. The hot fluid can be a gas or a liquid. In some examples, the hot fluid is air.

The term "adjacent" or "adjacent to," as used herein, generally refers to 'on,' 'over, 'next to,' 'adjoining,' 'in contact with,' or 'in proximity to.' In some instances, adjacent components are separated from one another by one or more intervening layers. The one or more intervening layers may have a thickness less than about 10 micrometers ("microns"), 1 micron, 500 nanometers ("nm"), 100 nm, 50 nm, 10 nm, 1 nm, 0.5 nm or less. For example, a first layer adjacent to a second layer can be on or in direct contact with the second layer. As another example, a first layer adjacent to a second layer can be separated from the second layer by at least a third layer.

Examples of 3D printing methodologies comprise extrusion, wire, granular, laminated, light polymerization, VAT photopolymerization, material jetting, binder jetting, sheet lamination, directed energy deposition, or power bed and inkjet head 3D printing. Extrusion 3D printing can comprise robo-casting, fused deposition modeling (FDM) or fused filament fabrication (FFF). Wire 3D printing can comprise electron beam freeform fabrication (EBF3). Granular 3D printing can comprise direct metal laser sintering (DMLS), electron beam melting (EBM), selective laser melting (SLM), selective heat sintering (SHS), or selective laser sintering (SLS). Power bed and inkjet head 3D printing can comprise plaster-based 3D printing (PP). Laminated 3D printing can comprise laminated object manufacturing (LOM). Light polymerized 3D printing can comprise stereolithography (SLA), digital light processing (DLP) or laminated object manufacturing (LOM).

Examples of methods, systems and materials that may be used to create or generate objects or parts herein are provided in U.S. Patent Publication Nos. 2014/0232035, 2016/0176118, and U.S. patent application Ser. Nos. 14/297,185, 14/621,205, 14/623,471, 14/682,067, 14/874,963, 15/069, 440, 15/072,270, 15/094,967, each of which is entirely incorporated herein by reference.

Three-dimensional printing may be performed using various materials. The form of the build materials that can be used in embodiments of the invention include, without limitation, filaments, sheets, powders, and inks. In some examples, a material that may be used in 3D printing includes a polymeric material, elemental metal, metal alloy, a ceramic, composite material, an allotrope of elemental carbon, or a combination thereof. The allotrope of elemental carbon may comprise amorphous carbon, graphite, graphene, diamond, or fullerene. The fullerene may be selected from the group consisting of a spherical, elliptical, linear, tubular fullerene, and any combination thereof. The fullerene may comprise a buck ball or a carbon nanotube. The material may comprise an organic material, for example, a polymer or a resin. The material may comprise a solid or a liquid. The material may include one or more strands or filaments. The solid material may comprise powder material. The powder material may be coated by a coating (e.g., organic coating such as the organic material (e.g., plastic coating)). The powder material may comprise sand. The material may be in the form of a powder, wire, pellet, or bead. The material may have one or more layers. The material may comprise at least two materials. In some cases, the material includes a reinforcing material (e.g., that forms a fiber). The reinforcing material may comprise a carbon fiber, Kevlar®, Twaron®, ultra-high-molecular-weight polyethylene, or glass fiber.

Prior to printing the part or object, a computer aided design (CAD) model can be optimized based on specified requirements. For example, the CAD model may comprise a geometry "envelop". A geometry envelop may be an initial shell design of the three-dimensional part comprising design requirements and geometric features. The geometry of the CAD model may be received by way of I/O devices. Design requirements can be selected from the group consisting of strength, structural deflections, stress, strain, tension, shear, load capacity, stiffness, factor-of safety, weight, strength to weight ratio, envelop geometry, minimal print time, thermal performance, electrical performance, porosity, infill, number of shells, layer height, printing temperature, extruder temperature, solid density, melt density, printing speed, print head movement speed, and any combination thereof.

The CAD model may be initially partitioned according to user input and built in tool path generator rules to produce numerical control programming codes of the partitioned computer model. Partitioning can generate one or more parameters for printing the part. The One or more parameters may be selected from the group consisting of filament diameter, layer thickness, infill percentage, infill pattern, raster angle, build orientation, printed material width, extrudate width, layer height, shell number, infill overlap, grid spacing, and any combination thereof. Partitioning can also generate one or more numerical control programming code of the partitioned computer model. The numerical control programming code can comprise G-code files and intermediate files. G-code files may be a numerical control programming language and can be used in computer-aided manufacturing as a way of controlling automated machine tools. The actions controlled by the G-code may comprise rapid movement, controlled feed in an arc or straight line, series of controlled feed movements, switch coordinate systems, and a set of tool information. Intermediate files may comprise supplemental files and tools for a primary build output. Additionally, intermediate files can comprise automatically generated source files or build output from helper tools. The information from the G-code files and the intermediate files may be extracted to determine the geometry of the three-dimensional printed part.

The 3D object may have a 3D solid model created in CAD software. Such 3D object can be sliced using conventional algorithms as are known in the art to generate a series of two dimensional (2D) layers representing individual transverse cross sections of the 3D object, which collectively depict the 3D object. The 2D slice information for the layers may be sent to the controller and stored in memory. Such information can control the process of fusing particles into a dense layer according to the modeling and inputs obtained during the build process.

Prior to printing the three-dimensional object, a model, in computer memory, of the part for three-dimensional printing may be received from a material. The material can comprise a matrix and fiber material. Additionally, in computer memory, one or more properties for the material may be received. Using the model, a print head tool path may be determined for use during the three-dimensional printing of the part. A virtual mesh of analytic elements may be generated within the model of the part and a trajectory of at least one stiffness-contributing portion of the material may be determined based at least in part on the print head tool path, wherein the trajectory of the at least one stiffness-contributing portion is determined through each of the analytic elements in the virtual mesh. Next, one or more computer processors may be used to determine a performance of the part based at least in part on the one or more properties received and the trajectory of the at least one stiffness-contributing portion. The performance of the part may be electronically outputted. The three-dimensional object may then be printed along the print head tool path.

The present invention may provide ways to improve the mechanical, thermal, and electrical properties of additively manufactured parts. All additive manufacturing approaches build up an object in a layer-by-layer fashion. In other words, the layers of build material are deposited one on top of the next, such that a successive layer of build material is deposited upon a previously deposited/constructed layer that has cooled below its melting temperature. The print head may comprise three or more axes or degrees of freedom so that the print head can move in the +X direction, the −X direction, the +Y direction, the −Y direction, the +Z direction, the −Z direction, or any combination thereof. The print head may be configured as a six-axis robotic arm. Alternatively, the print head may be configured as a seven-axis robotic arm. The print head may be placed at any location in the build volume of the 3D object, from any approach angle.

In accordance with embodiments of the invention, a system for additive manufacturing processes provides localized heating to create a "melt pool" in the current layer or segment of deposited build material prior to depositing the next segment or layer. The melt pool can span the entire thickness of the printed segment, thereby increasing the adhesion across segments built in the same layer. The melt pool can span a portion of the thickness of the printed segment. The melt pool may increase the diffusion and mixing of the build material between adjacent layers (across the Z direction) as compared to current methods, which deposit a subsequent layer of build material on top of a layer of build material that is below its melting temperature. The increased diffusion and mixing resulting from the melt pool can increase the chemical chain linkage/bonding and chemical chain interactions between the two layers. This can result in increases in the build-material adhesion in the Z direction, thereby enhancing mechanical, thermal, and electrical properties. The melt pool may also reduce void space and porosity in the build object. Among any other benefits, this decrease in porosity also contributes somewhat to the aforementioned improvement in mechanical, thermal, and electrical properties.

Before depositing a layer of material on an underlying layer in a build object, the portion of the underlying layer on which the subsequent layer is to be deposited may be melted, creating a "melt pool." The melt pool can be created using an energy source, such as, without limitation, by a laser, a microwave source, a resistive heating source, an infrared energy source, a UV energy source, hot fluid, a chemical reaction, a plasma source, a microwave source, an electromagnetic source, or an electron beam. Resistive heating may be joule heating. A source for resistive heating may be a power supply. The applied energy is primarily a function of the chemical composition of the build material, such as the build material's thermal conductivity, heat capacity, latent heat of fusion, melting point, and melt flow viscosity.

Prior to printing the 3D object, a request for production of a requested 3D object may be received from a customer. The method may comprise packaging the three dimensional object. After printing of the 3D object, the printed three dimensional object may be delivered to the customer.

In an aspect, the present disclosure provides for method for printing at least a portion of a 3D object. In computer memory, a model of the 3D object may be received. Subsequent to receiving the model of the 3D object, at least one filament material may be directed from a source of at least one filament material towards a substrate that is configured to support the 3D object, thereby depositing a first layer corresponding to a portion of the 3D object adjacent to the substrate. The first layer may be deposited in accordance with the model of the 3D object. At least one filament material may be directed from the source to an opening. At least one filament material can be directed from the opening towards the substrate. Next, a second layer of at least a portion of the 3D object may be deposited. The second layer can be deposited in accordance with the model of the 3D object. At least a first energy beam may be used from at least one energy source to selectively melt at least a portion of the first layer and/or the second layer, thereby forming at least a portion of the 3D object. One or more additional layers may be further deposited adjacent to the first layer prior to depositing the second layer. In some cases, fused deposition modeling may be performed when printing the 3D object. In other cases, the 3D object may be printed with extrusion. In some cases, the 3D object may be printed without extrusion.

The layered structure can comprise substantially repetitive layers. The layers may have an average layer size of at least about 0.5 μm, 1 μm, 5 μm, 10 μm, 20 μm, 30 μm, 40 μm, 50 μm, 60 μm, 70 μm, 80 μm, 90 μm, 100 μm, 150 μm, 200 μm, 250 μm, 300 μm, 350 μm, 400 μm, 450 μm, 500 μm, 1 mm, 25 mm, 50 mm, 100 mm, 500 mm, or 1 m. The layers may have an average layer size of at most about 50 m, 1 m, 500 mm, 100 mm, 50 mm, 25 mm, 1 mm, 500 μm, 450 μm, 400 μm, 350 μm, 300 μm, 250 m, 200 μm, 150 μm, 100 μm, 90 μm, 80 μm, 70 μm, 60 μm, 50 μm, 40 μm, 30 μm, 20 μm, or 10 μm. The layers may have an average layer size of any value between the aforementioned values of layer size. For example, the substantially repetitive microstructure may have an average layer size from about 0.5 μm to about 500 mm, from about 15 μm to about 100 μm, from about 5 μm to about 300 μm, from about 20 μm to about 90 μm, or from about 10 μm to about 70 μm. The layered structure can be indicative of layered deposition. The layered structure can be indicative of solidification of melt pools formed during a three dimensional printing process. The structure indicative of a three dimensional printing process can comprise substantially repetitive variation comprising: variation in grain orientation, variation in material density, variation in the degree of compound segregation to grain boundaries, variation in the degree of element segregation to grain boundaries, variation in material phase, variation in metallurgical phase, variation in material porosity, variation in crystal phase, or variation in crystal structure. The melt pools may be indicative of an additive manufacturing process comprising stereolithography (SLA), selective laser melting (SLM), selective laser sintering (SLS), digital light processing (DLP), electron beam melting (EBM), laminated object manufacturing (LOM), binder jetting (BM), material jetting/wax casting (MJ), direct metal laser sintering (DMLS), or fused deposition modeling (FDM). The melt pools may be indicative of an additive manufacturing process comprising selective energy melting.

The source of at least one filament material may be configured to supply at least one filament material for generating the three-dimensional object. The at least one filament material may be a composite material, such as a continuous fiber composite. The filament material may be nano milled, short, long, continuous, or a combination thereof. The continuous fiber composite may be a continuous core reinforced filament. The continuous core reinforced filament can comprise a towpreg that is substantially void free and includes a polymer that coats or impregnates an internal continuous core. Depending upon the particular embodiment, the core may be a solid core or it may be a multi-strand core comprising multiple strands. The continuous fiber composite may be selected from the group consisting of glass, carbon, aramid, cotton, silicon carbide, polymer, wool, metal, and any combination thereof.

The filament material may incorporate one or more additional materials, such as resins and polymers. For example, appropriate resins and polymers include, but are not limited to, acrylonitrile butadiene styrene (ABS), epoxy, vinyl, nylon, polyetherimide (PEI), Polyaryletherketone (PAEK), Polyether ether ketone (PEEK), Polyactic Acid (PLA), Liquid Crystal Polymer, polyamide, polyimide, polyphenylene sulfide, polyphenylsulfone, polysulfone, polyether sulfone, polyethylenimine, polytetrafluoroethylene, polyvinylidene, and various other thermoplastics. The core of the continuous fiber composite may be selected to provide any desired property. Appropriate core fiber or strands include those materials which impart a desired property, such as structural, conductive (electrically and/or thermally), insulative (electrically and/or thermally), optical and/or fluidic transport. Such materials include, but are not limited to, carbon fibers, aramid fibers, fiberglass, metals (such as copper, silver, gold, tin, and steel), optical fibers, and flexible tubes. The core fiber or strands may be provided in any appropriate size. Further, multiple types of continuous cores may be used in a single continuous core reinforced filament to provide multiple functionalities such as electrical and optical properties. A single material may be used to provide multiple properties for the core reinforced filament. For example, a steel core may be used to provide both structural properties as well as electrical conductivity properties.

Alternatively, the filament material may comprise metal particles infused into a binder matrix. The metal particles may be metal powder. The binder matrix may include resins or polymers. Additionally, such binder matrix can be used a delivery device for the metal particles. Once the filament material is deposited onto the base, one or more energy sources can heat and melt the binder matrix, leaving the metal particles to melt and fuse into larger metal particles. Such energy sources may be without limitation, by a laser, a microwave source, a resistive heating source, an infrared energy source, a UV energy source, hot fluid, a chemical reaction, a plasma source, a microwave source, an electromagnetic source, or an electron beam. Resistive heating may be joule heating. A source for resistive heating may be a power supply. The at least one filament material may be a metal filament. The at least one filament material may be a metal filament composite. The deposited at least one filament material may be subjected to resistive heating upon flow of an electrical current through the at least one filament material. The resistive heating may be sufficient to melt at least a portion of the deposited at least one filament material. The at least one filament material may be an electrode. The substrate may be another electrode.

The one or more energy sources may also provide localized heating to create a "melt pool" in the current layer or segment of the deposited build material prior to depositing the next segment or layer. The melt pool can increase diffusion and mixing of the build material between adjacent layers (e.g., across a direction orthogonal to the layers) as compared to other methods which deposit a subsequent layer of build material on top of a layer of build material that is below its melting temperature.

The increased diffusion and mixing resulting from the melt pool may increase the chemical chain linkage, bonding, and chemical chain interactions between the two layers. This can result in increasing the build-material adhesion in the Z direction, thereby enhancing mechanical, thermal, and electrical properties of the three-dimensional object. The melt pool can also reduce the void space and porosity in the build object. Among other benefits, this decrease in porosity may also contribute to the aforementioned improvement in mechanical, thermal, and electrical properties.

The at least one filament material may have a cross sectional shape selected from the group consisting of circle, ellipse, parabola, hyperbola, convex polygon, concave polygon, cyclic polygon, equilateral polygon, equiangular polygon, regular convex polygon, regular star polygon, tape-like geometry, and any combination thereof. Such filament material can have a diameter of at most about 0.1 millimeters (mm), at most about 0.2 mm, at most about 0.3 mm, at most about 0.4 mm, at most about 0.5 mm, at most about 0.6 mm, at most about 0.7 mm, at most about 0.8 mm, at most about 0.9 mm, at most about 1 mm, at most about 2 mm, at most about 3 mm, at most about 4 mm, at most about 5 mm, at most about 10 mm, or at most about 20 mm.

Various modifiers within the layers themselves may be used which are selectively printed onto specific regions of the 3D object in order to impart various desirable mechanical, chemical, magnetic, electrical or other properties to the 3D object. Such modifiers may be selected from the group consisting of thermal conductors and insulators, dielectric promoters, electrical conductors and insulators, locally-contained heater traces for multi-zone temperature control, batteries, and sensors. In some embodiments, at least one print head can be may be used for printing such modifiers. As desired, such modifiers can be printed before at least a first energy beam is directed onto at least a portion of the first layer and/or second layer. Alternatively, such modifiers may be printed over a layer that has been melted, before filament material for the next layer is deposited.

For example, when printing a polyimide part from commercially available a filament comprising polyimide, an array of electrically conductive traces may be assimilated as an antenna to selectively absorb radiofrequency (RF) radiation within a specific and predetermined frequency range. The 3D object CAD model and software can designate as a sub-part the layer(s) that comprise the traces for modified properties (high electrical conductivity). Alternatively, if these portions of the layer entail different levels of energy for inducing fusion, compared to other regions having only the primary material, the CAD model and design of the 3D object may be adjusted accordingly.

After deposition of a first layer and/or a second layer of at least a portion of the 3D object, and before fusion is induced, the filament material may be preheated to a temperature sufficient to reduce undesirable shrinkage and/or to minimize the laser energy needed to melt the next layer. For example, the preheating may be accomplished using the infrared heater attached to substrate or through other apparatuses of directing thermal energy within an enclosed space around the substrate. Alternatively, the preheating can be accomplished using energy beam melting by defocusing the energy beam and rapidly scanning it over the deposited first layer and or second layer of at least a portion of the 3D object.

In some embodiments, at least a first energy beam from at least one energy source may be used to selectively heat and/or melt at least a portion of the first layer and/or the second layer, thereby forming at least a portion of the 3D object. The energy source may be selected from the group consisting of a laser, a microwave source, a resistive heating source, an infrared energy source, a UV energy source, hot fluid, a chemical reaction, a plasma source, a microwave source, an electromagnetic source, an electron beam, or any combination thereof. Resistive heating may be joule heating. A source for resistive heating may be a power supply. The at least one filament material may be a metal filament. The at least one filament material may be a metal filament composite. The deposited at least one filament material may be subjected to resistive heating upon flow of an electrical current through the at least one filament material. The resistive heating may be sufficient to melt at least a portion of the deposited at least one filament material. The at least one filament material may be an electrode. The substrate may be another electrode.

The energy source may be a function of the chemical composition of the build material, such as the build material's thermal conductivity, heat capacity, latent heat of fusion, melting point, and melt flow viscosity. The at least one energy source may be a laser. The laser may be selected from the group consisting of gas lasers, chemical lasers, dye lasers, metal-vapor lasers, solid-state lasers, semiconductor lasers, free electron laser, gas dynamic laser, nickel-like samarium laser, Raman laser, nuclear pump laser, and any combination thereof. Gas lasers may comprise one or more of helium-neon laser, argon laser, krypton laser, xenon ion laser, nitrogen laser, carbon dioxide laser, carbon monoxide laser, and excimer laser. Chemical lasers may be selected from the group consisting of hydrogen fluoride laser, deuterium fluoride laser, chemical oxygen-iodine laser, all gasphase iodine laser, and any combination thereof. Metalvapor lasers can comprise one or more of helium-cadmium, helium mercury, helium selenium, helium silver, strontium vapor laser, neon-copper, copper vapor laser, gold vapor laser, and manganese vapor laser. Solid-state lasers may be selected from the group consisting of ruby laser, neodymium-doped yttrium aluminium garnet laser, neodymium and chromium-doped yttrium aluminium garnet laser, erbium-doped yttrium aluminium garnet laser, neodymium-doped yttrium lithium fluoride laser, neodymium doped yttrium othovanadate laser, neodymium doped yttrium calcium oxoborate laser, neodymium glass laser, titanium sapphire laser, thulium yttrium aluminium garnet laser, ytterbium yttrium aluminium garnet laser, ytterbium:$_2O_3$ (glass or ceramics) laser, ytterbium doped glass laser (rod, plate/ chip, and fiber), holmium yttrium aluminium garnet laser, chromium zinc selenium laser, cerium doped lithium strontium (or calcium) aluminum fluoride laser, Promethium 147 doped phosphate glass solid-state laser, chromium doped chrysoberyl (alexandrite) laser, erbium doped and erbiumytterbium codoped glass lasers, trivalent uranium doped calcium fluoride solid-state laser, divalent samarium doped calcium fluoride laser, FARBE center laser, and any combination thereof. Semiconductor laser may comprise one or more of semiconductor laser diode laser, gallium nitride laser, indium gallium nitride laser, aluminium gallium indium phosphide laser, aluminium gallium arsenide laser, indium gallium arsenide phosphide laser, lead salt laser, vertical cavity surface emitting laser, quantum cascade laser, and hybrid silicon laser.

The melting temperature of the at least one filament material can be at least about 150° C., at least about 200° C., at least about 250° C., at least about 300° C., at least about 350° C., at least about 400° C., at least about 450° C. The sintering temperature can be at most about 150° C., at most about 200° C., at most about 250° C., at most about 300° C., at most about 350° C., at most about 400° C. The method may further comprise separating the remainder of the layer that did not fuse and solidify to form at least a portion of the three dimensional object, from the portion.

The at least one energy beam from the energy source may be directed to the at least one portion of the 3D object adjacent to the substrate. Such energy beams may be sufficient to induce fusion of particles of the filament material within the desired cross-sectional geometry of the at least one portion of the 3D object. As the energy dissipates with cooling, atoms from neighboring particles may fuse together. In some embodiments, the at least one energy beam results in the fusion of particles of filament material both within the same layer and in the previously formed and resolidified adjoining layer(s) such that fusion is induced between at least two adjacent layers of the part, such as between at least one filament material in a deposited unfused layer and a previously-fused adjacent layer. This process is then repeated over multiple cycles as each part layer is added, until the full 3D object is formed.

In some cases, to create a melt pool large enough to span the width of the filament material segment, multiple energy sources or a combination of energy sources may be required. When multiple energy sources are used, the energy sources may be the same energy source. Alternatively, the multiple energy sources may be different energy sources. The energy source(s) may be separate from the system for printing at least a portion of the 3D object. In some other embodiments, the energy source(s) may be integrated with such system. For example, in one embodiment, hot fluid may be channeled through the deposition nozzle. Because the material filament can flow in the melt pool, features of the 3D object being built can be altered. In some embodiments, the melt pool may be formed within the build object, such that a melt pool is not formed near the perimeters thereof. To accomplish this, the energy source may be turned off when the perimeters of the object are being built. In such embodiments, the geometrical tolerance of the build object may be maintained while the interior of the object has enhanced interlayer bonding. During printing, the filament material may be printed in the X, Y, and Z directions in one segment or layer.

FIG. 1A illustrates an example system 100, which may be used to produce a three-dimensional object having any desired shape, size, and structure. The example system 100 may be an FDM system. In system 100, at least one filament material 101 from a source of the at least one filament material may be directed to an opening through a passage of a print head 103. Such a filament material can then be directed from the opening towards a substrate 106 that is configured to support the 3D object 105, thereby depositing a first layer corresponding to a portion of the 3D object. Such a filament material can be directed from the opening as an extrudate 113. During deposition of each layer, the print head may move in the X and Y direction in accordance with the model of the 3D object. A second layer of at least a portion of the 3D object may then be deposited. One or more additional layers may be deposited adjacent to the first layer prior to depositing the second layer. The portion of the 3D object may comprise at least one layer 104. The system 100 may comprise heater cartridges 102 with thermal control from proportional-integral-derivative controller (PID controllers) connected to thermocouples. The heater cartridges may function as a temperature control for the system 100. The one or more thermocouples can be situated at one or several locations to provide feedback to a controller, such as a PID controller, and hence maintain temperature set points throughout a build. At least a first energy beam 109 from at least one energy source may be used to selectively melt at least a portion of the first layer and/or the second layer, thereby forming at least a portion of the 3D object. A part of the modulated energy beam 109 may be focused by the focusing system 107, angled by the optical wedges 108, and irradiated along the at least one filament material for three-dimensional printing.

Figure 1B:
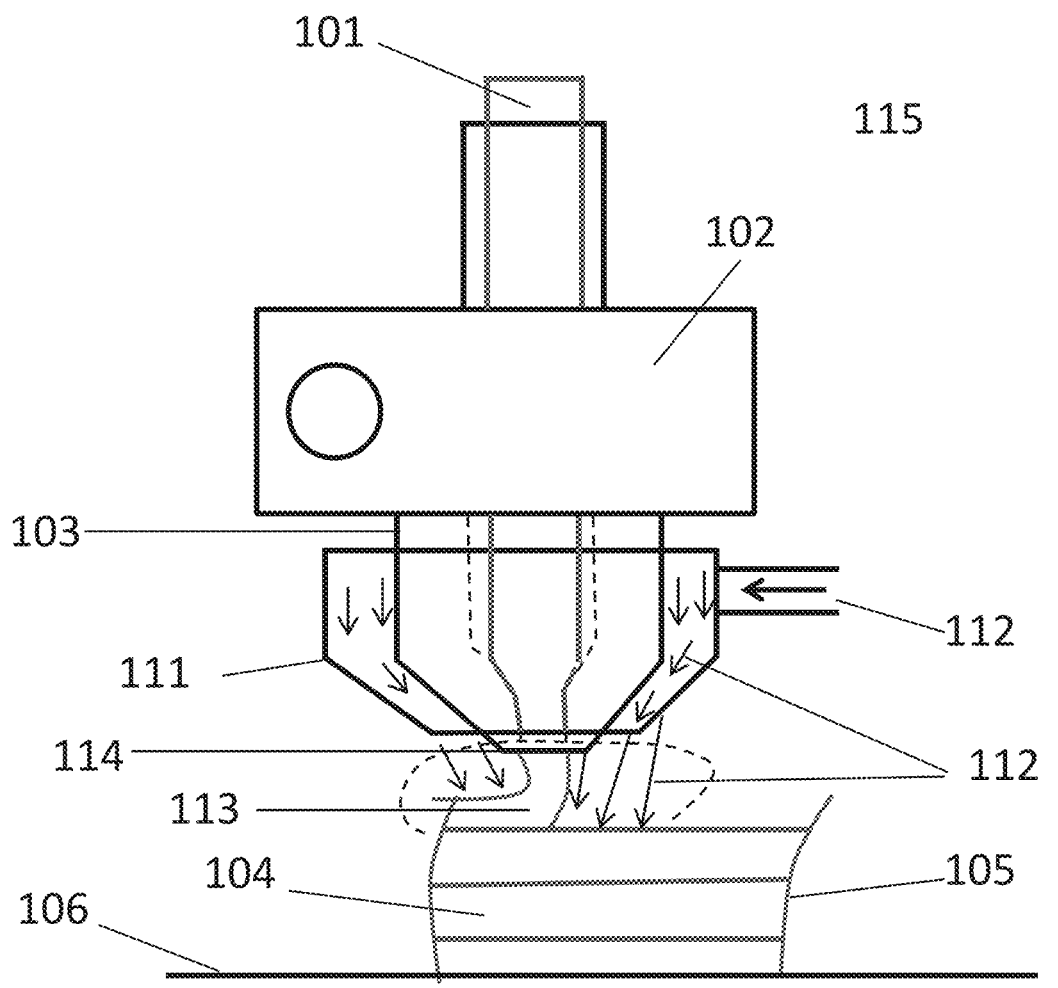
FIG. 1B illustrates an example system that may be used to produce a three-dimensional object with extrusion having any desired shape, size, and structure using a hot fluid (e.g., air) energy source.
Figure 1B:
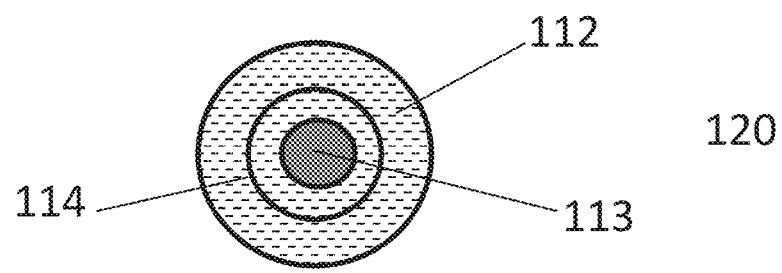

FIG. 1B illustrates another example system 115, which may be used to produce a three-dimensional object having any desired shape, size, and structure. The example system 115 may be an FDM system. In system 115, at least one filament material 101 from a source of the at least one filament material may be directed to an opening through a passage of a print head 103. Such a filament material can then be directed from the opening as an extrudate 113 and deposited as a first layer corresponding to a portion of the 3D object on the substrate 106. The substrate can be configured to support the 3D object 105. During deposition of each layer, the print head may move in the X and Y direction in accordance with the model of the 3D object. Next, a second layer of at least a portion of the 3D object can be deposited. One or more additional layers may be deposited adjacent to the first layer prior to depositing the second layer. The portion of the 3D object may comprise at least one layer 104. The system 115 may comprise heater cartridges 102 with thermal control from PID controllers connected to thermocouples. The heater cartridges may function as a temperature control for the system 115. The one or more thermocouples can be situated at one or several locations to provide feedback to a controller, such as a PID controller, and hence maintain temperature set points throughout a build. At least a first energy beam 112 from at least one energy source may be used to selectively melt at least a portion of the first layer and/or the second layer, thereby forming at least a portion of the 3D object. The energy source may be a convective fluid source. The at least a first energy beam may be at least a first hot fluid (e.g., air) beam. The print head may be protected with a jacket cover 111 to contain and direct the flow of the hot fluid towards the layers of the at least a portion of the 3D object. The top view 120 of the extrudate 113 deposition through the nozzle 114 illustrates the even distribution of the convective hot fluid 112 around the extrudate 113.

Figure 1C:
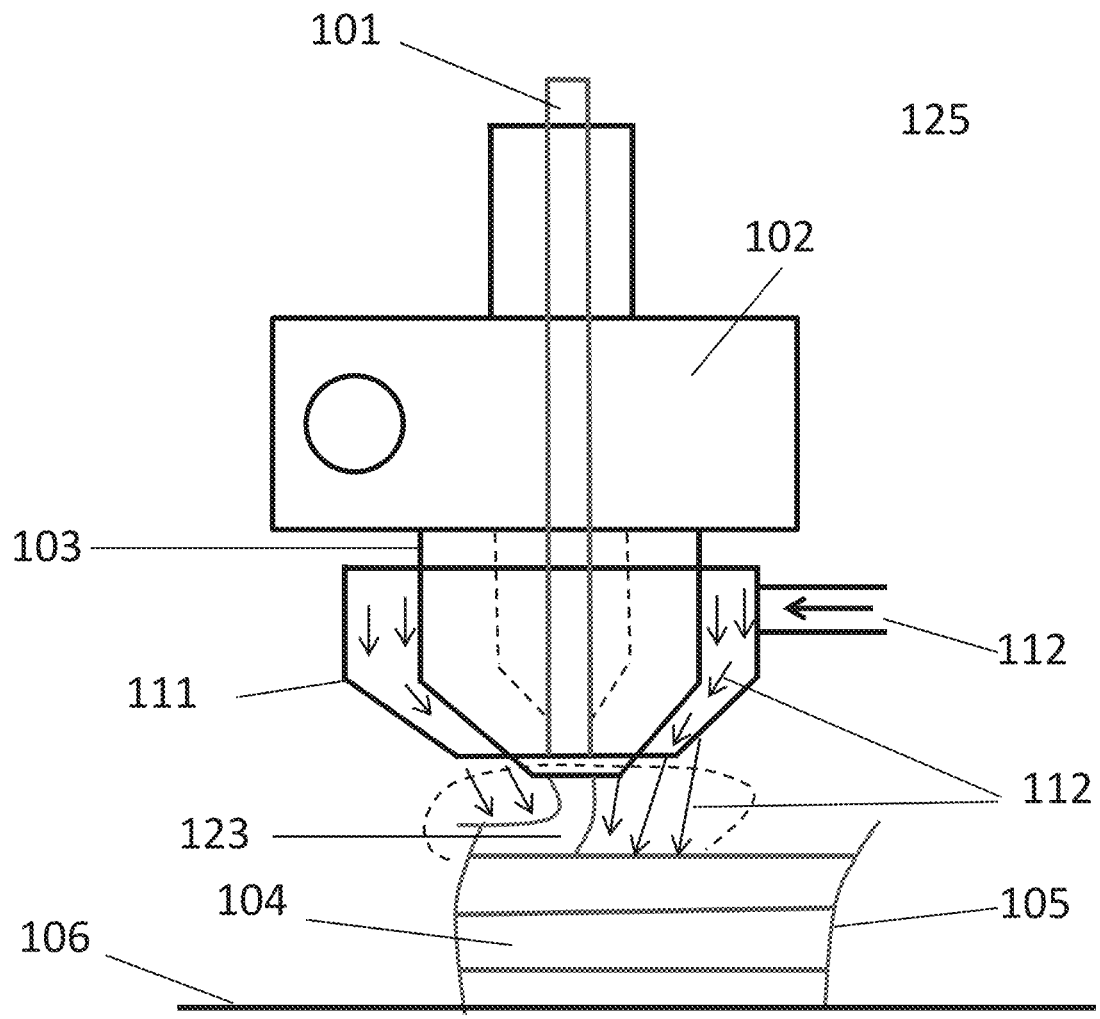
FIG. 1C illustrates an example system that may be used to produce a three-dimensional object without extrusion having any desired shape, size, and structure using a hot fluid (e.g., air) energy source.
Figure 1C:
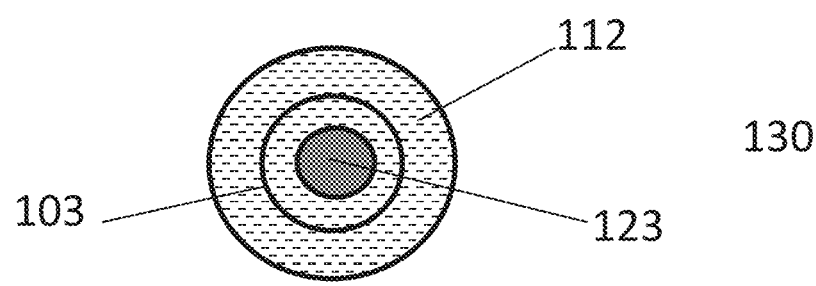

FIG. 1C illustrates another example system 125, which may be used to produce a three-dimensional object having any desired shape, size, and structure. The example system 125 may be a continuous filament pass through system for printing. The continuous filament pass through system may comprise filament material deposition without extrusion. In system 125, at least one filament material 101 from a source of the at least one filament material may be directed to an opening through a passage of a print head 103. Such a filament material can then be directed from the opening as a printed at one filament material 123 without extrusion and deposited as a first layer corresponding to a portion of the 3D object on the substrate 106. The substrate can be configured to support the 3D object 105. During deposition of each layer, the print head may move in the X and Y direction in accordance with the model of the 3D object. Next, a second layer of at least a portion of the 3D object can be deposited without extrusion. One or more additional layers may be deposited without extrusion adjacent to the first layer prior to depositing the second layer. The portion of the 3D object may comprise at least one layer 104. The system 125 may comprise heater cartridges 102 with thermal control from PID controllers connected to thermocouples. The heater cartridges may function as a temperature control for the system 125. The one or more thermocouples can be situated at one or several locations to provide feedback to a controller, such as a PID controller, and hence maintain temperature set points throughout a build. At least a first energy beam 112 from at least one energy source may be used to selectively melt at least a portion of the first layer and/or the second layer, thereby forming at least a portion of the 3D object. The energy source may be a convective fluid source. The at least a first energy beam may be at least a first hot fluid (e.g., air) beam. The print head may be protected with a jacket cover 111 to contain and direct the flow of the hot fluid towards the layers of at least a portion of the 3D object. The top view 130 of the printed at one filament material 123 deposition through the print head 103 illustrates the even distribution of the convective hot fluid 112 around the printed at one filament material 123.

Figure 2:
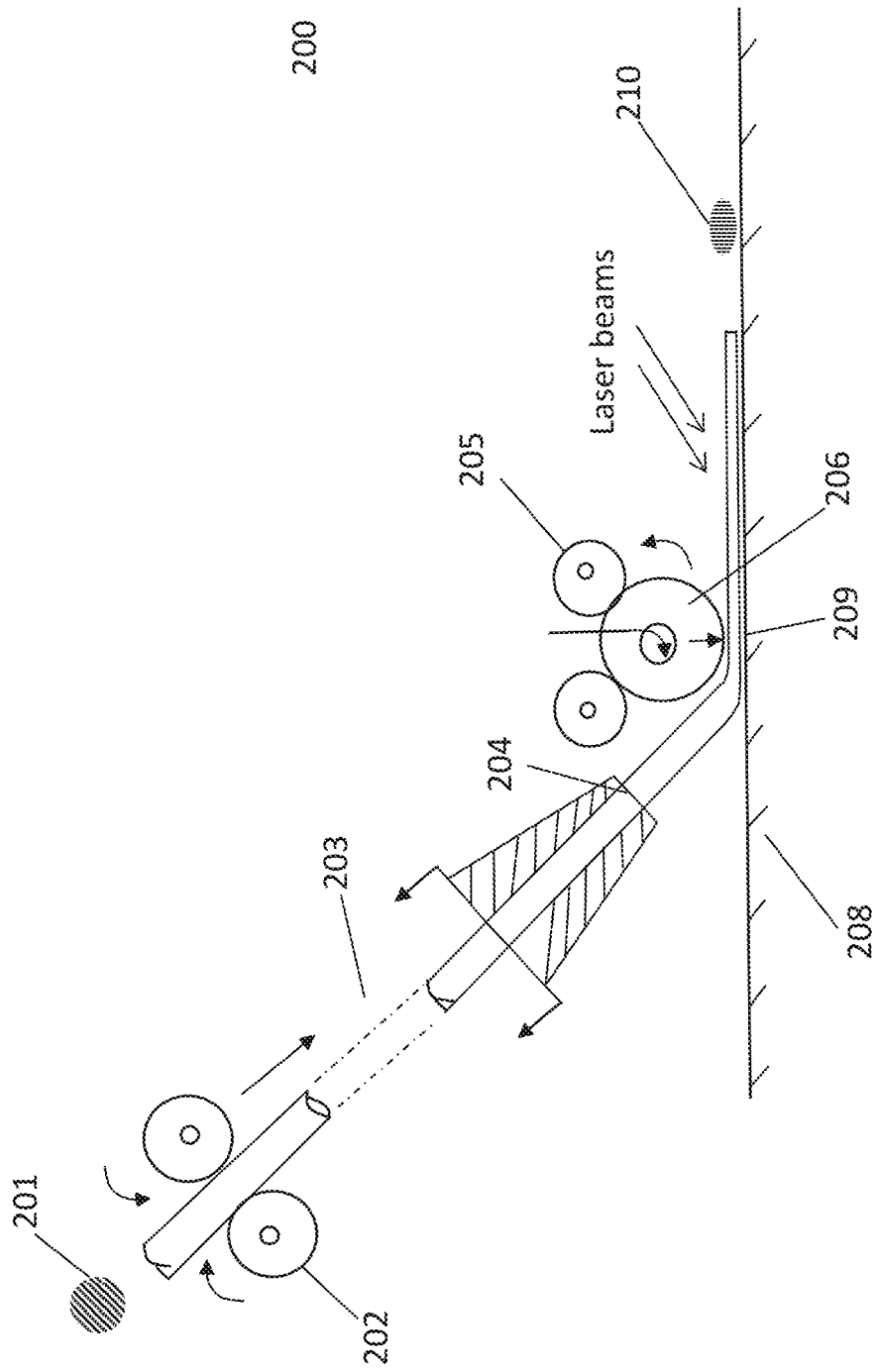
FIG. 2 shows an example system that may be used to produce a three-dimensional object having any desired shape, size, and structure using an energy source and compaction unit.

FIG. 2 illustrates another example system 200, which may be used to produce a three-dimensional object having any desired shape, size, and structure. System 200 may include an extender mechanism (or unit) 202 comprising one or more rollers for directing at least one filament material 203 from a source of at least one filament material towards a substrate 208. Such filament material may initially comprise an uncompressed cross section 201. The extender mechanism can include a motor for dispensing at least one filament material. This filament material may be directed from the source to an opening, such as a nozzle 204, and can also be directed from the opening towards the substrate. The opening may receive at least one filament material, and can direct such filament material towards the substrate. The substrate may be adjacent to which the 3D object is formed. Additionally, the substrate can include a drive mechanism (or unit) for moving the substrate.

Such filament material may also be directed to at least one freely suspended roller 206, thereby depositing a first layer corresponding to a portion of the 3D object on the substrate. Next, the second layer of at least a portion of the 3D object may be deposited. One or more additional layers can be deposited adjacent to the first layer prior to depositing the second layer. At least a first energy beam from at least one energy source may selectively melt at least a portion of the first layer and/or the second layer, thereby forming at least a portion of the 3D object. The energy beam may be a laser beam. The energy source may be a laser head that is mounted on a robot or similar mechanism that swivels around the vertical axis enabling deposition in any direction in the plane of deposition. At least one filament material may be fed into a nozzle at an angle such that it is fed under at least one freely suspended roller at a nip point 209 as the at least one freely suspended roller presses this filament material exiting from the nozzle. The nip point can be the point where such filament material meets the substrate and is pressed by the at least one freely suspended roller resulting in a compressed cross section 210.

The compaction unit may comprise at least one freely suspended roller that is supported by one or more idler rollers 205. The at least one freely suspended roller may be designed to control the bend radii of such filament material. At least a portion of the three-dimensional object may be generated from such filament material continuously upon subjecting such deposited filament material to heating along the one or more locations. The system 200 may further comprise a controller operatively coupled to at least one light source.

Figure 3:
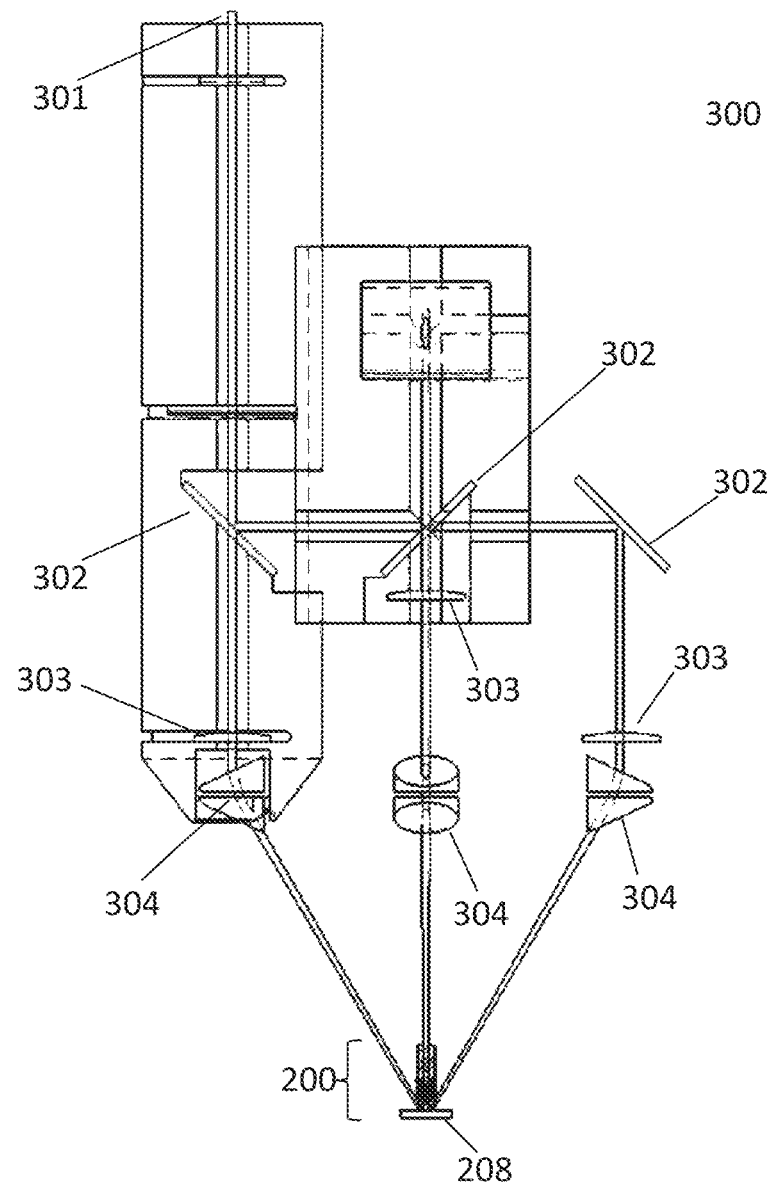
FIG. 3 shows an example optical system for splitting and directing light beams at various angles to the plane of the substrate.

The at least one energy source may be in optical communication with one or more beam splitters, which one or more beam splitters can split an energy beam from at least one light source into one or more beamlets (or beams) that yields at least the first energy beam. FIG. 3 illustrates an example optical system 300 capable of receiving in an opening 301, splitting, and directing such energy beams at various angles to the plane of the substrate 208 of system 200. System 300 can comprise one or more beam splitters 302, one or more focusing lenses 303, one or more optical wedges 304, and any combination thereof. The optical system 300 may allow the energy beams to be aligned at any angle in the plane of deposition. The optical system may further comprise a beam expanding system and a spatial light modulator. At least the first energy beam may be emitted by at least one light source and expanded by the beam expanding system into parallel light beams having a large diameter by the beam expanding system. Then, such parallel energy beams may irradiate onto the one or more beam splitters. A part of the expanded energy beams may reach a spatial modulator for modulation after passing through the beam splitter and the modulated energy beams can be reflected to the beam splitter. A part of the modulated energy beam may be focused by the focusing system, angled by the optical wedges, and irradiated along the at least one filament material for three-dimensional printing. The beam expanding system may comprise a negative lens and a positive lens. Furthermore, the spatial light modulator can be a reflector type digital micro-mirror device or a phase type liquid crystal spatial light modulator.

One or more beam splitters may be selected from the group consisting of prism, glass sheet, plastic sheet, mirror, dielectric mirror, metal-coated mirror, partially reflecting mirror, pellicles, micro-optic beam splitters, waveguide beam splitters, beam splitter cubes, fiber-optic beam splitter, and any combination thereof. One or more optical wedges may be in optical communication with one or more beam splitters, which one or more optical wedges form at least the first light beam. Such optical wedges can form at least the first light beam in a uniform orientation. The one or more beamlets may pass through one or more focusing lenses prior to passing through at least one or more optical wedges. Such beamlets may have an elliptical polarization. The one or more beamlets may comprise a minor axis of at least about 0.5 mm, at least about 1 mm, at least about 2 mm, at least about 3 mm, at least about 4 mm, at least about 5 mm, at least about 6 mm, at least about 7 mm, at least about 8 mm, at least about 9 mm, at least about 10 mm, or at least about 15 mm. The one or more beamlets may also comprise a major axis of at least about 5 mm, at least about 10 mm, at least about 15 mm, at least about 20 mm, at least about 25 mm, at least about 30 mm, at least about 35 mm, at least about 40 mm, at least about 45 mm, or at least about 50 mm. Such light beams can cover at least a portion of at least one filament material. The one or more focusing lenses may be used to adjust a ratio of the minor axis to the major axis of the one or more beamlets.

Optical wedges may alter the path of the beam from vertical to any angle for uniform heating of the filament material. The one or more optical wedges can also direct an optical path of at least the first light beam of a given location, direction, or angle normal to the substrate and/or along the substrate among one or more locations, directions, or angles. Such a direction of one or more optical wedges can allow for control of the heat from the light beam along the at least one filament material.

The one or more optical wedges can be used in combination with one or more of dispersive prism, reflective prism, beam-splitting prism, polarizing prism, or deflecting prisms. Dispersive prisms may be used to break up light into its constituent spectral colors because the refractive index depends on frequency. Examples of dispersive prisms include Triangular prism, Abbe prism, Pellin-Broca prism, Amici prism, Compound prism, or Grism prism. Reflective prisms can be used to reflect light, in order to flip, invert, rotate, deviate or displace the light beam. Examples of reflective prisms include Porro prism, Porro-Abbe prism, Amici roof prism, Pentaprism, Roof Pentaprism, Abbe-Koenig prism, Schmidt-Pechan prism, Bauernfeind prism, Dove prism, or Retroreflector prism. Some reflective prisms may be used for splitting a beam into two or more beams. Beam-splitting prisms may be a beam splitter cube or a dichronic prism. Polarizing prisms can split a beam of light into components of varying polarization. Examples of polarizing prisms may be Nicol prism, Wollaston prism, Nomarski prism, Rochon prism, Senarmont prism, Glan-Foucault prism, Glan-Taylor prism, or Glan-Thompson prism. Deflecting prisms may be one or more of a Risley prism pair, Rhomboid prisms, or Deck prisms. Wedge prisms may be used to deflect a beam of light by a fixed angle. A pair of such prisms can be used for beam steering; by rotating the prisms the beam can be deflected into any desired angle. The deflecting prism may be a Risley prism pair. Two wedge prisms can also be used as an anamorphic pair to change the shape of a beam. For example, this may be used to generate a round beam from the elliptical output of a laser diode.

One or more optical wedges can have a refractive index of at least about 0.5, at least about 1, at least about 1.1, at least about 1.2, at least about 1.3, at least about 1.4, at least about 1.5, at least about 1.6, at least about 1.7, at least about 1.8, at least about 1.9, at least about 2.5, at least about 3, at least about 4, or at least about 5. Such optical wedges can have a diameter of at most about 0.1 inches (in), at most about 0.2 in, at most about 0.3 in, at most about 0.4 in, at most about 0.5 in, at most about 0.6 in, at most about 0.7 in, at most about 0.8 in, at most about 0.9 in, at most about 1 in, at most about 2 in, at most about 3 in, at most about 4 in, or at most about 5 in.

In some embodiments, at least the first energy beam may be incident on at least one filament material and on the substrate. Such energy beams may be directed along a given angle among one or more angles relative to the dispensing route of at least one filament material. The one or more optical wedges can comprise a first optical wedge and a second optical wedge. The first optical wedge may be the top wedge and the second optical wedge may be the bottom wedge. Through choosing the wedge angle, the energy beams can be made incident on the filament at an angle to the plane of the substrate. By rotating the bottom optical wedge, the incident angle can be varied. By rotating both the optical wedges, the angle of the line beam in the plane of deposition can be varied. For example, the first optical wedge may rotate relative to the second optical wedge to change the direction of at least the first light beam. The first optical wedge and the second optical wedge can be angled in the same direction to increase an angle of at least the first energy beam with respect to a reference. The first optical wedge and the second optical wedge may rotate in opposite directions to allow the at least the first energy beam to pass vertically through the one or more optical wedges. When altering an angle of incidence of the first optical wedge and the second optical wedge, or when altering a direction of the major axis of at least the first energy beam relative to the substrate or at least one filament material, the fluence of at least the first light beam may be altered. The fluence may be a stream of particles crossing a unit area. The fluence may be expressed as the number of particles per second. As a result, such light beams may heat at least one filament material without melting a deposited portion of the at least one filament material. In some instances, at least the first energy beam can heat and melt a deposited portion of at least one filament material at a given location among one or more locations.

In some embodiments, at least one filament material may be directed to a compaction unit. Such filament material may be compacted by the compaction unit to form at least one compacted filament material. The compaction unit may comprise a rigid body, one or more idler rollers, at least one freely suspended roller, a coolant unit, or any combination thereof. The at least one freely suspended roller may be a compaction roller. The rigid body and one or more idler rollers may secure the at least one freely suspended roller. Such freely suspended rollers may have a diameter of at most about 1 mm, at most about 2 mm, at most about 3 mm, at most about 4 mm, at most about 5 mm, at most about 6 mm, at most about 7 mm, at most about 8 mm, at most about 9 mm, at most about 10 mm, or at most about 15 mm. The coolant may be used to cool the compaction unit so the at least one filament material does not stick to the roller and adheres only to the previously deposited layer of the three-dimensional object.

The system for printing at least a portion of the 3D object may further comprise one or more cooling components. Such cooling components may be in proximity to the deposited filament material layer. Such cooling components can be located between the deposited filament material layer and the energy source. Such cooling components may be movable to or from a location that may be positioned between the filament material and the energy source. Such cooling components may assist in the process of cooling of the fused portion of the filament material layer. Such cooling components may also assist in the cooling of the filament material layer remainder that did not fuse to subsequently form at least a portion of the 3D object. Such cooling components can assist in the cooling of the at least a portion of the 3D object and the remainder at considerably the same rate. Such cooling components may be separated from the filament material layer and/or from the substrate by a gap. The gap may comprise a gas. The gap can have a cross-section that is at most about 0.1 mm, at most about 0.5 mm, at most about 1 mm, at most about 5 mm, or at most about 10 mm. The gap can be adjustable. The controller may be operatively connected to such cooling components and may be able to adjust the gap distance from the substrate. Such cooling components can track an energy that may be applied to the portion of the filament material layer by the energy source. Such cooling components may comprise a heat sink. Such cooling components may be a cooling fan. The controller may be operatively coupled to such cooling components and controls the tracing of such cooling components. Such cooling components may include at least one opening though which at least one energy beam from the energy source can be directed to the portion of the filament layer. The system for printing at least a portion of the 3D object can further comprise an additional energy source that provides energy to a remainder of the filament material layer that did not fuse to subsequently form at least a portion of the 3D object.

During printing of the three-dimensional object, certain parameters may be critical to printing high quality parts. One or more sensors can be used to measure one or more temperature(s) along at least one filament material. Such sensors can control intensities, positions, and/or angles of at least the first energy beam. The one or more sensors may be an optical pyrometer. Optical pyrometers may be aimed the substrate to detect the temperature of the at least one filament materials as they are deposited. Optical pyrometers may be aimed at the nip points and one or more points before and/or after the compaction unit to detect the temperature of the at least one filament materials as they are deposited. The temperature may vary from region to region of the filament material layer. Factors that affect temperature variance can include variable heater irradiance, variations in absorptivity of the composition, substrate temperature, filament material temperature, unfused filament material temperature, and the use of modifiers and additives. Accordingly, image and temperature measurement inputs based upon layer temperature patterns captured by the one or more sensors may be used. The real time temperature inputs and the sintering model may be factors determining an energy requirement pattern for any one or more subsequent layers.

Figure 4:
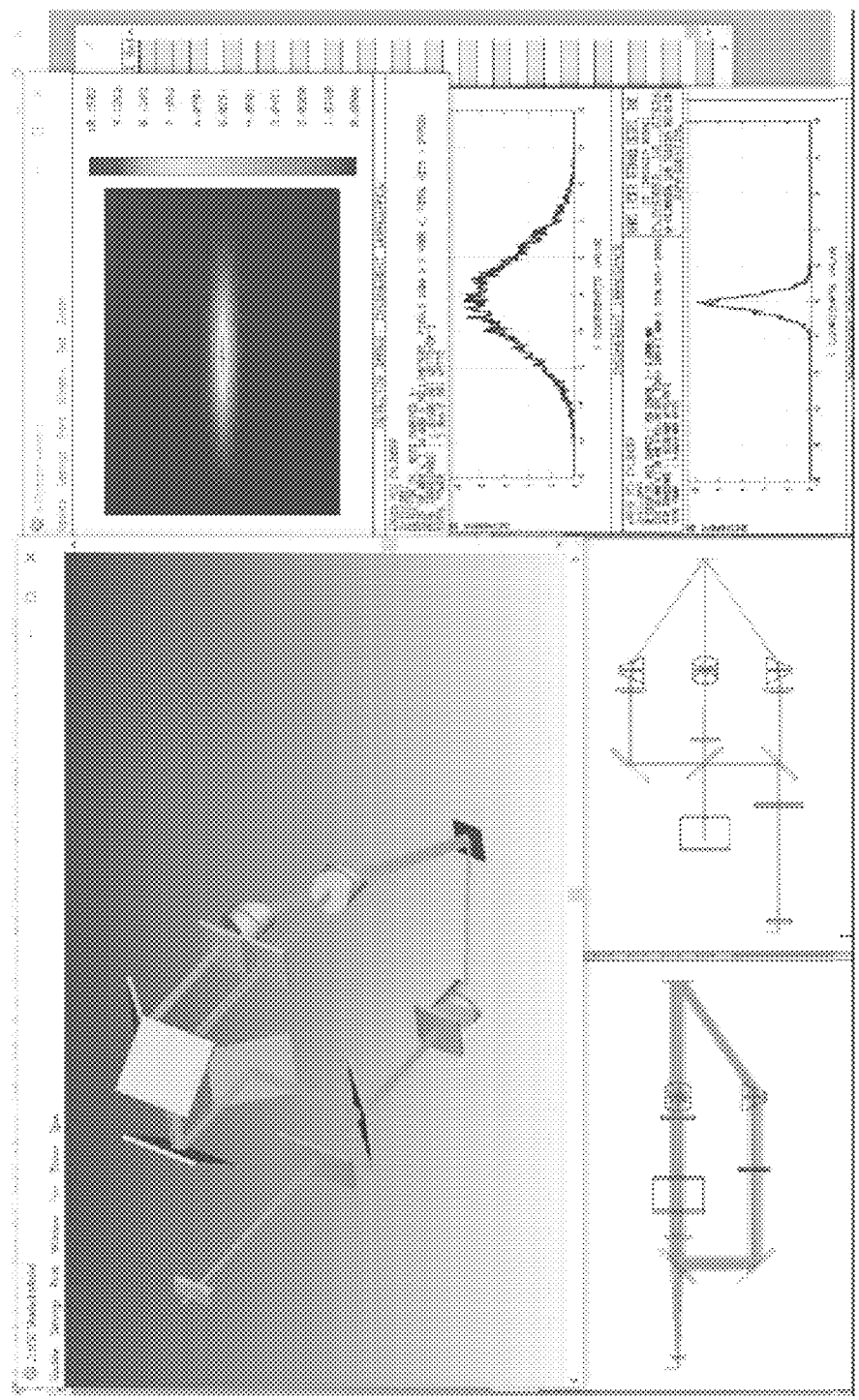
FIG. 4 illustrates a real time simulation feedback program for propagation of the energy beams.

Additionally, the system may comprise a real time simulation program, a sample as shown in FIG. 4, to provide feedback control of a given location, direction, or angle of at least the first energy beam normal to the substrate and/or along the substrate among one or more locations, directions, or angles. The sample real time simulation of the optical beam path illustrates that choosing the appropriate wedge angle and energy beam orientation may result in the elliptical beam profile in FIG. 4. The real time simulation program may be a feedback control system. The feedback control system may be a Zemax simulation of the beam propagation.

Other parameters critical to printing high quality parts can include substrate temperature, melt zone temperature, as-built geometry, surface roughness and texture and density. Other critical visible or non-visible metrics include characterization of chemistry, bonding or adhesion strength. Measuring one or more structural or internal properties of the part can comprise one or more methods selected from the group consisting of scattered and reflected or absorbed radiation, x-ray imaging, sound waves, scatterometry techniques, ultrasonic techniques, X-ray Photoelectron Spectroscopy (XPS), Four Transform Infrared Spectroscopy (FTIR), Raman Spectroscopy, Laser-Microprobe Mass Spectrometry (LMMS), and any combination thereof. Specific metrology beneficial to the end goals of characterizing the critical process parameters can be used. This in-situ metrology coupled with fast processing of data can enable open or closed loop control of the manufacturing process. Sensors appropriate to the key parameters of interest can be selected and utilized during the part printing process. The sensors may also comprise a camera for detecting light in the infrared or visible portion of the electromagnetic spectrum. Sensors such as IR cameras may be used to measure temperature fields. An image processing algorithm may be used to evaluate data generated by one or more sensors, to extract one or more structural or internal properties of the part. Visual (e.g., high magnification) microscopy from digital camera(s) can be used with proper software processing to detect voids, defects, and surface roughness. In order to utilize this technique, potentially large quantities of data may need to be interrogated using image processing algorithms in order to extract features of interest. Scatterometry techniques may be adapted to provide roughness or other data.

Ultrasonic techniques can be used to measure solid density and fiber and particle density which in turn may be useful in characterizing bond strength and fiber dispersion. The characterization can affect material strength. Ultrasonic techniques can also be used to measure thickness of features. Chemical bonding characterization, which may be useful for understanding fiber and/or matrix adhesion and layer-to-layer bonding, can be performed by multiple techniques such as XPS (X-ray Photoelectron Spectroscopy), FTIR (Four Transform Infrared Spectroscopy) and Raman Spectroscopy and Laser-Microprobe Mass Spectrometry (LMMS). One or more of these techniques may be utilized as part of the in-situ metrology for 3D printing. Ex-situ techniques may also be utilized in order to help provide appropriate calibration data for the in-situ techniques.

Sensors may be positioned on the robot end-effector of the three-dimensional printer in order to provide a sensor moving along with the deposited material. A robot end-effector may be a device positioned at the end of a robotic arm. The robot end-effector may be programmed to interact with its surrounding environment. Sensors may be also located at other various positions. The positions can be on-board the robot, on the effector, or deployed in the environment. Sensors may be in communication with the system. The system can further comprise one or more processors, a communication unit, memory, power supply, and storage. The communications unit can comprise an input and an output. The communication unit can be wired or wireless. The sensor measurements may or may not be stored in a database, and may or may not be used in future simulation and optimization operations. In-situ measurements may also be made using alternative methods with sensors in a cell but not directly attached to the robot end-effector.

In another aspect, the present disclosure provides for method for printing at least a portion of a three-dimensional (3D) object. At least one filament material may be directed from a source of at least one filament material towards a substrate that is configured to support the 3D object, thereby depositing a first layer corresponding to a portion of the 3D object adjacent to the substrate, which first layer is deposited in accordance with the model of the 3D object. At least one filament material from the source may be deposited to an opening. Such filament material may then be directed from the opening towards the substrate. At least a first energy beam from at least one energy source may be used to melt at least a portion of the first layer. A second layer of at least a portion of the 3D object may be deposited, which second layer is deposited in accordance with the model of the 3D object, thereby generating at least a portion of the 3D object. In some embodiments, such method may be repeated one or more times. Prior to directing at least one filament material from a source of the at least one filament material towards a substrate that is configured to support the 3D object, thereby depositing a first layer corresponding to a portion of the 3D object adjacent to the substrate, a model of the 3D object may be received in computer memory. In some cases, fused deposition modeling may be performed when printing the 3D object. In other cases, the 3D object may be printed with extrusion. In some cases, the 3D object may be printed without extrusion.

The layered structure can comprise substantially repetitive layers. The layers may have an average layer size of at least about 0.5 µm, 1 µm, 5 µm, 10 µm, 20 m, 30 m, 40 µm, 50 µm, 60 µm, 70 µm, 80 µm, 90 µm, 100 µm, 150 µm, 200 µm, 250 µm, 300 µm, 350 µm, 400 µm, 450 µm, 500 µm, 1 mm, 25 mm, 50 mm, 100 mm, 500 mm, or 1 m. The layers may have an average layer size of at most about 50 m, 1 m, 500 mm, 100 mm, 50 mm, 25 mm, 1 mm, 500 µm, 450 µm, 400 µm, 350 µm, 300 µm, 250 µm, 200 µm, 150 µm, 100 µm, 90 µm, 80 µm, 70 µm, 60 µm, 50 µm, 40 µm, 30 µm, 20 µm, or 10 µm. The layers may have an average layer size of any value between the aforementioned values of layer size. For example, the layers may have an average layer size from about 0.5 µm to about 500 mm, from about 15 µm to about 100 µm, from about 5 µm to about 300 µm, from about 20 µm to about 90 µm, or from about 10 µm to about 70 µm. The layered structure can be indicative of layered deposition. The layered structure can be indicative of solidification of melt pools formed during a three dimensional printing process. The structure indicative of a three dimensional printing process can comprise substantially repetitive variation comprising: variation in grain orientation, variation in material density, variation in the degree of compound segregation to grain boundaries, variation in the degree of element segregation to grain boundaries, variation in material phase, variation in metallurgical phase, variation in material porosity, variation in crystal phase, or variation in crystal structure. The melt pools may be indicative of an additive manufacturing process comprising stereolithography (SLA), selective laser melting (SLM), selective laser sintering (SLS), digital light processing (DLP), electron beam melting (EBM), laminated object manufacturing (LOM), binder jetting (BM), material jetting/wax casting (MJ), direct metal laser sintering (DMLS), or fused deposition modeling (FDM). The melt pools may be indicative of an additive manufacturing process comprising selective energy melting.

The source of at least one filament material may be configured to supply at least one filament material for generating the three-dimensional object. The at least one filament material may be a composite material, such as a continuous fiber composite. The filament material may be nano milled, short, long, continuous, or a combination thereof. The continuous fiber composite may be a continuous core reinforced filament. The continuous core reinforced filament can comprise a towpreg that is substantially void free and includes a polymer that coats or impregnates an internal continuous core. Depending upon the particular embodiment, the core may be a solid core or it may be a multi-strand core comprising multiple strands. The continuous fiber composite may be selected from the group consisting of glass, carbon, aramid, cotton, silicon carbide, polymer, wool, metal, and any combination thereof.

The filament material may incorporate one or more additional materials, such as resins and polymers. For example, appropriate resins and polymers include, but are not limited to, acrylonitrile butadiene styrene (ABS), epoxy, vinyl, nylon, polyetherimide (PEI), Polyaryletherketone (PAEK), Polyether ether ketone (PEEK), Polyactic Acid (PLA), Liquid Crystal Polymer, polyamide, polyimide, polyphenylene sulfide, polyphenylsulfone, polysulfone, polyether sulfone, polyethylenimine, polytetrafluoroethylene, polyvinylidene, and various other thermoplastics. The core of the continuous fiber composite may be selected to provide any desired property. Appropriate core fiber or strands include those materials which impart a desired property, such as structural, conductive (electrically and/or thermally), insulative (electrically and/or thermally), optical and/or fluidic transport. Such materials include, but are not limited to, carbon fibers, aramid fibers, fiberglass, metals (such as copper, silver, gold, tin, and steel), optical fibers, and flexible tubes. The core fiber or strands may be provided in any appropriate size. Further, multiple types of continuous cores may be used in a single continuous core reinforced filament to provide multiple functionalities such as electrical and optical properties. A single material may be used to provide multiple properties for the core reinforced filament. For example, a steel core may be used to provide both structural properties as well as electrical conductivity properties.

Alternatively, the filament material may comprise metal particles infused into a binder matrix. The metal particles may be metal powder. The binder matrix may include resins or polymers. Additionally, such binder matrix can be used a delivery device for the metal particles. Once the filament material is deposited onto the base, one or more energy sources can heat and melt the binder matrix, leaving the metal particles to melt and fuse into larger metal particles. Such energy sources may be without limitation, by a laser, a microwave source, a resistive heating source, an infrared energy source, a UV energy source, a hot fluid, a chemical reaction, a plasma source, a microwave source, an electromagnetic source, or an electron beam. Resistive heating may be joule heating. A source for resistive heating may be a power supply. The at least one filament material may be a metal filament. The at least one filament material may be a metal filament composite. The deposited at least one filament material may be subjected to resistive heating upon flow of an electrical current through the at least one filament material. The resistive heating may be sufficient to melt at least a portion of the deposited at least one filament material. The at least one filament material may be an electrode. The substrate may be another electrode.

The one or more energy sources may also provide localized heating to create a "melt pool" in the current layer or segment of the deposited build material prior to depositing the next segment or layer. The melt pool can increase diffusion and mixing of the build material between adjacent layers (e.g., across a direction orthogonal to the layers) as compared to other methods which deposit a subsequent layer of build material on top of a layer of build material that is below its melting temperature.

The increased diffusion and mixing resulting from the melt pool may increase the chemical chain linkage, bonding, and chemical chain interactions between the two layers. This can result in increasing the build-material adhesion in the Z direction, thereby enhancing mechanical, thermal, and electrical properties of the three-dimensional object. The melt pool can also reduce the void space and porosity in the build object. Among other benefits, this decrease in porosity may also contribute to the aforementioned improvement in mechanical, thermal, and electrical properties.

The at least one filament material may have a cross sectional shape selected from the group consisting of circle, ellipse, parabola, hyperbola, convex polygon, concave polygon, cyclic polygon, equilateral polygon, equiangular polygon, regular convex polygon, regular star polygon, tape-like geometry, and any combination thereof. Such filament material can have a diameter of at most about 0.1 millimeters (mm), at most about 0.2 mm, at most about 0.3 mm, at most about 0.4 mm, at most about 0.5 mm, at most about 0.6 mm, at most about 0.7 mm, at most about 0.8 mm, at most about 0.9 mm, at most about 1 mm, at most about 2 mm, at most about 3 mm, at most about 4 mm, at most about 5 mm, at most about 10 mm, or at most about 20 mm.

Various modifiers within the layers themselves may be used which are selectively printed onto specific regions of the 3D object in order to impart various desirable mechanical, chemical, magnetic, electrical or other properties to the 3D object. Such modifiers may be selected from the group consisting of thermal conductors and insulators, dielectric promoters, electrical conductors and insulators, locally-contained heater traces for multi-zone temperature control, batteries, and sensors. In some embodiments, at least one print head can be may be used for printing such modifiers. As desired, such modifiers can be printed before at least a first energy beam is directed onto at least a portion of the first layer and/or second layer. Alternatively, such modifiers may be printed over a layer that has been melted, before filament material for the next layer is deposited.

For example, when printing a polyimide part from commercially available a filament comprising polyimide, an array of electrically conductive traces may be assimilated as an antenna to selectively absorb radiofrequency (RF) radiation within a specific and predetermined frequency range. The 3D object CAD model and software can designate as a sub-part the layer(s) that comprise the traces for modified properties (high electrical conductivity). Alternatively, if these portions of the layer entail different levels of energy for inducing fusion, compared to other regions having only the primary material, the CAD model and design of the 3D object may be adjusted accordingly.

After deposition of a first layer and/or a second layer of at least a portion of the 3D object, and before fusion is induced, the filament material may be preheated to a temperature sufficient to reduce undesirable shrinkage and/or to minimize the laser energy needed to melt the next layer. For example, the preheating may be accomplished using the infrared heater attached to substrate or through other apparatuses of directing thermal energy within an enclosed space around the substrate. Alternatively, the preheating can be accomplished using energy beam melting by defocusing the energy beam and rapidly scanning it over the deposited first layer and or second layer of at least a portion of the 3D object.

In some embodiments, at least a first energy beam from at least one energy source may be used to selectively heat and/or melt at least a portion of the first layer and/or the second layer, thereby forming at least a portion of the 3D object. The energy source may be selected from the group consisting of a laser, a microwave source, a resistive heating source, an infrared energy source, a UV energy source, a hot fluid, a chemical reaction, a plasma source, a microwave source, an electromagnetic source, an electron beam, or any combination thereof. Resistive heating may be joule heating. A source for resistive heating may be a power supply. The at least one filament material may be a metal filament. The at least one filament material may be a metal filament composite. The deposited at least one filament material may be subjected to resistive heating upon flow of an electrical current through the at least one filament material. The resistive heating may be sufficient to melt at least a portion of the deposited at least one filament material. The at least one filament material may be an electrode. The substrate may be another electrode.

The energy source may be a function of the chemical composition of the build material, such as the build material's thermal conductivity, heat capacity, latent heat of fusion, melting point, and melt flow viscosity. The at least one energy source may be a laser. The laser may be selected from the group consisting of gas lasers, chemical lasers, dye lasers, metal-vapor lasers, solid-state lasers, semiconductor lasers, free electron laser, gas dynamic laser, nickel-like samarium laser, Raman laser, nuclear pump laser, and any combination thereof. Gas lasers may comprise one or more of helium-neon laser, argon laser, krypton laser, xenon ion laser, nitrogen laser, carbon dioxide laser, carbon monoxide laser, and excimer laser. Chemical lasers may be selected from the group consisting of hydrogen fluoride laser, deuterium fluoride laser, chemical oxygen-iodine laser, all gas-phase iodine laser, and any combination thereof. Metal-vapor lasers can comprise one or more of helium-cadmium, helium mercury, helium selenium, helium silver, strontium vapor laser, neon-copper, copper vapor laser, gold vapor laser, and manganese vapor laser. Solid-state lasers may be selected from the group consisting of ruby laser, neodymium-doped yttrium aluminium garnet laser, neodymium and chromium-doped yttrium aluminium garnet laser, erbium-doped yttrium aluminium garnet laser, neodymium-doped yttrium lithium fluoride laser, neodymium doped yttrium othovanadate laser, neodymium doped yttrium calcium oxoborate laser, neodymium glass laser, titanium sapphire laser, thulium yttrium aluminium garnet laser, ytterbium yttrium aluminium garnet laser, ytterbium:$_2$O$_3$ (glass or ceramics) laser, ytterbium doped glass laser (rod, plate/chip, and fiber), holmium yttrium aluminium garnet laser, chromium zinc selenium laser, cerium doped lithium strontium (or calcium) aluminum fluoride laser, Promethium 147 doped phosphate glass solid-state laser, chromium doped chrysoberyl (alexandrite) laser, erbium doped and erbium-ytterbium codoped glass lasers, trivalent uranium doped calcium fluoride solid-state laser, divalent samarium doped calcium fluoride laser, FARBE center laser, and any combination thereof. Semiconductor laser may comprise one or more of semiconductor laser diode laser, gallium nitride laser, indium gallium nitride laser, aluminium gallium indium phosphide laser, aluminium gallium arsenide laser, indium gallium arsenide phosphide laser, lead salt laser, vertical cavity surface emitting laser, quantum cascade laser, and hybrid silicon laser.

The melting temperature of the at least one filament material can be at least about 150° C., at least about 200° C., at least about 250° C., at least about 300° C., at least about 350° C., at least about 400° C., at least about 450° C. The sintering temperature can be at most about 150° C., at most about 200° C., at most about 250° C., at most about 300° C., at most about 350° C., at most about 400° C. The method may further comprise separating the remainder of the layer that did not fuse and solidify to form at least a portion of the three dimensional object, from the portion.

The at least one energy beam from the energy source may be directed to the at least one portion of the 3D object adjacent to the substrate. Such energy beams may be sufficient to induce fusion of particles of the filament material within the desired cross-sectional geometry of the at least one portion of the 3D object. As the energy dissipates with cooling, atoms from neighboring particles may fuse together. In some embodiments, the at least one energy beam results in the fusion of particles of filament material both within the same layer and in the previously formed and resolidified adjoining layer(s) such that fusion is induced between at least two adjacent layers of the part, such as between at least one filament material in a deposited unfused layer and a previously-fused adjacent layer. This process is then repeated over multiple cycles as each part layer is added, until the full 3D object is formed.

In some cases, to create a melt pool large enough to span the width of the filament material segment, multiple energy sources or a combination of energy sources may be required. When multiple energy sources are used, the energy sources may be the same energy source. Alternatively, the multiple energy sources may be different energy sources. The energy source(s) may be separate from the system for printing at least a portion of the 3D object. In other embodiments, the energy source(s) may be integrated with such system. For example, in one embodiment, a hot fluid (e.g., hot air) may be channeled through the deposition nozzle. Because the material filament can flow in the melt pool, features of the 3D object being built can be altered. In some embodiments, the melt pool may be formed within the build object, such that a melt pool is not formed near the perimeters thereof. To accomplish this, the energy source may be turned off when the perimeters of the object are being built. In such embodiments, the geometrical tolerance of the build object may be maintained while the interior of the object has enhanced interlayer bonding. During printing, the filament material may be printed in the X, Y, and Z directions in one segment or layer.

The at least one energy source may be in optical communication with one or more beam splitters, which one or more beam splitters can split an energy beam from at least one light source into one or more beamlets that yields at least the first energy beam. The example optical system in FIG. 3 may be capable of receiving in an opening 301, splitting, and directing such energy beams at various angles to the plane of the substrate 208 of system 200. System 300 can comprise one or more beam splitters 302, one or more focusing lenses 303, one or more optical wedges 304, and any combination thereof. The optical system 300 may allow the energy beams to be aligned at any angle in the plane of deposition. The optical system may further comprise a beam expanding system and a spatial light modulator. At least the first energy beam may be emitted by at least one light source and expanded by the beam expanding system into parallel light beams having a large diameter by the beam expanding system. Then, such parallel energy beams may irradiate onto the one or more beam splitters. A part of the expanded energy beams may reach a spatial modulator for modulation after passing through the beam splitter and the modulated energy beams can be reflected to the beam splitter. A part of the modulated energy beam may be focused by the focusing system, angled by the optical wedges, and irradiated along the at least one filament material for three-dimensional printing. The beam expanding system may comprise a negative lens and a positive lens. Furthermore, the spatial light modulator can be a reflector type digital micro-mirror device or a phase type liquid crystal spatial light modulator.

One or more beam splitters may be selected from the group consisting of prism, glass sheet, plastic sheet, mirror, dielectric mirror, metal-coated mirror, partially reflecting mirror, pellicles, micro-optic beam splitters, waveguide beam splitters, beam splitter cubes, fiber-optic beam splitter, and any combination thereof. One or more optical wedges may be in optical communication with one or more beam splitters, which one or more optical wedges form at least the first light beam. Such optical wedges can form at least the first light beam in a uniform orientation. The one or more beamlets may pass through one or more focusing lenses prior to passing through at least one or more optical wedges. Such beamlets may have an elliptical polarization. The one or more beamlets may comprise a minor axis of at least about 0.5 mm, at least about 1 mm, at least about 2 mm, at least about 3 mm, at least about 4 mm, at least about 5 mm, at least about 6 mm, at least about 7 mm, at least about 8 mm, at least about 9 mm, at least about 10 mm, or at least about 15 mm. The one or more beamlets may also comprise a major axis of at least about 5 mm, at least about 10 mm, at least about 15 mm, at least about 20 mm, at least about 25 mm, at least about 30 mm, at least about 35 mm, at least about 40 mm, at least about 45 mm, or at least about 50 mm. Such energy beams can cover at least a portion of at least one filament material. The one or more focusing lenses may be used to adjust a ratio of the minor axis to the major axis of the one or more beamlets.

Optical wedges may alter the path of the beam from vertical to any angle for uniform heating of the filament material. The one or more optical wedges can also direct an optical path of at least the first light beam of a given location, direction, or angle normal to the substrate and/or along the substrate among one or more locations, directions, or angles. Such a direction of one or more optical wedges can allow for control of the heat from the light beam along the at least one filament material.

The one or more optical wedges can be used in combination with one or more of dispersive prism, reflective prism, beam-splitting prism, polarizing prism, or deflecting prisms. Dispersive prisms may be used to break up light into its constituent spectral colors because the refractive index depends on frequency. Examples of dispersive prisms include Triangular prism, Abbe prism, Pellin-Broca prism, Amici prism, Compound prism, or Grism prism. Reflective prisms can be used to reflect light, in order to flip, invert, rotate, deviate or displace the light beam. Examples of reflective prisms include Porro prism, Porro-Abbe prism, Amici roof prism, Pentaprism, Roof Pentaprism, Abbe-Koenig prism, Schmidt-Pechan prism, Bauernfeind prism, Dove prism, or Retroreflector prism. Some reflective prisms may be used for splitting a beam into two or more beams. Beam-splitting prisms may be a beam splitter cube or a dichronic prism. Polarizing prisms can split a beam of light into components of varying polarization. Examples of polarizing prisms may be Nicol prism, Wollaston prism, Nomarski prism, Rochon prism, Senarmont prism, Glan-Foucault prism, Glan-Taylor prism, or Glan-Thompson prism. Deflecting prisms may be one or more of a Risley prism pair, Rhomboid prisms, or Deck prisms. Wedge prisms may be used to deflect a beam of light by a fixed angle. A pair of such prisms can be used for beam steering; by rotating the prisms the beam can be deflected into any desired angle. The deflecting prism may be a Risley prism pair. Two wedge prisms can also be used as an anamorphic pair to change the shape of a beam. For example, this may be used to generate a round beam from the elliptical output of a laser diode.

One or more optical wedges can have a refractive index of at least about 0.5, at least about 1, at least about 1.1, at least about 1.2, at least about 1.3, at least about 1.4, at least about 1.5, at least about 1.6, at least about 1.7, at least about 1.8, at least about 1.9, at least about 2.5, at least about 3, at least about 4, or at least about 5. Such optical wedges can have a diameter of at most about 0.1 inches (in), at most about 0.2 in, at most about 0.3 in, at most about 0.4 in, at most about 0.5 in, at most about 0.6 in, at most about 0.7 in, at most about 0.8 in, at most about 0.9 in, at most about 1 in, at most about 2 in, at most about 3 in, at most about 4 in, or at most about 5 in.

In some embodiments, at least the first energy beam may be incident on at least one filament material and on the substrate. Such energy beams may be directed along a given angle among one or more angles relative to the dispensing route of at least one filament material. The one or more optical wedges can comprise a first optical wedge and a second optical wedge. The first optical wedge may be the top wedge and the second optical wedge may be the bottom wedge. Through choosing the wedge angle, the energy beams can be made incident on the filament at an angle to the plane of the substrate. By rotating the bottom optical wedge, the incident angle can be varied. By rotating both the optical wedges, the angle of the line beam in the plane of deposition can be varied. For example, the first optical wedge may rotate relative to the second optical wedge to change the direction of at least the first light beam. The first optical wedge and the second optical wedge can be angled in the same direction to increase an angle of at least the first energy beam with respect to a reference. The energy beam may be a light beam. The first optical wedge and the second optical wedge may rotate in opposite directions to allow the at least the first energy beam to pass vertically through the one or more optical wedges. When altering an angle of incidence of the first optical wedge and the second optical wedge, or when altering a direction of the major axis of at least the first energy beam relative to the substrate or at least one filament material, the fluence of at least the first light beam may be altered. As a result, such light beams may heat at least one filament material without melting a deposited portion of the at least one filament material. In some instances, at least the first energy beam can heat and melt a deposited portion of at least one filament material at a given location among one or more locations.

In some embodiments, at least one filament material may be directed to a compaction unit. Such filament material may be compacted by such a compaction unit to form at least one compacted filament material. The compaction unit may comprise a rigid body, one or more idler rollers, at least one freely suspended roller, a coolant unit, or any combination thereof. The at least one freely suspended roller may be a compaction roller. The rigid body and one or more idler rollers may secure the at least one freely suspended roller. Such freely suspended rollers may have a diameter of at most about 1 mm, at most about 2 mm, at most about 3 mm, at most about 4 mm, at most about 5 mm, at most about 6 mm, at most about 7 mm, at most about 8 mm, at most about 9 mm, at most about 10 mm, or at most about 15 mm. The coolant may be used to cool the compaction unit so the at least one filament material does not stick to the roller and adheres only to the previously deposited layer of the three-dimensional object.

The system for printing at least a portion of the 3D object may further comprise one or more cooling components. Such cooling components may be in proximity to the deposited filament material layer. Such cooling components can be located between the deposited filament material layer and the energy source. Such cooling components may be movable to or from a location that may be positioned between the filament material and the energy source. Such cooling components may assist in the process of cooling of the fused portion of the filament material layer. Such cooling components may also assist in the cooling of the filament material layer remainder that did not fuse to subsequently form at least a portion of the 3D object. Such cooling components can assist in the cooling of the at least a portion of the 3D object and the remainder at considerably the same rate. Such cooling components may be separated from the filament material layer and/or from the substrate by a gap. The gap may comprise a gas. The gap can have a cross-section that is at most about 0.1 mm, at most about 0.5 mm, at most about 1 mm, at most about 5 mm, or at most about 10 mm. The gap can be adjustable. The controller may be operatively connected to such cooling components and may be able to adjust the gap distance from the substrate. Such cooling components can track an energy that may be applied to the portion of the filament material layer by the energy source. Such cooling components may comprise a heat sink. Such cooling components may be a cooling fan. The controller may be operatively coupled to such cooling components and controls the tracing of such cooling components. Such cooling components may include at least one opening though which at least one energy beam from the energy source can be directed to the portion of the filament layer. The system for printing at least a portion of the 3D object can further comprise an additional energy source that provides energy to a remainder of the filament material layer that did not fuse to subsequently form at least a portion of the 3D object.

During printing of the three-dimensional object, certain parameters may be critical to printing high quality parts. One or more sensors can be used to measure one or more temperature(s) along at least one filament material. Such sensors can control intensities, positions, and/or angles of at least the first energy beam. The one or more sensors may be an optical pyrometer. Optical pyrometers may be aimed the substrate to detect the temperature of the at least one filament materials as they are deposited. Optical pyrometers may be aimed at the nip points and one or more points before and/or after the compaction unit to detect the temperature of the at least one filament materials as they are deposited. The temperature may vary from region to region of the filament material layer. Factors that affect temperature variance can include variable heater irradiance, variations in absorptivity of the composition, substrate temperature, filament material temperature, unfused filament material temperature, and the use of modifiers and additives. Accordingly, image and temperature measurement inputs based upon layer temperature patterns captured by the one or more sensors may be used. The real time temperature inputs and the sintering model may be factors determining an energy requirement pattern for any one or more subsequent layers.

Additionally, the system may comprise a real time simulation program, a sample as shown in FIG. 4, to provide feedback control of a given location, direction, or angle of at least the first energy beam normal to the substrate and/or along the substrate among one or more locations, directions, or angles. The sample real time simulation of the optical beam path illustrates that choosing the appropriate wedge angle and energy beam orientation may result in the elliptical beam profile in FIG. 4. The real time simulation program may be a feedback control system. The feedback control system may be a Zemax simulation of the beam propagation.

Other parameters critical to printing high quality parts can include substrate temperature, melt zone temperature, as-built geometry, surface roughness and texture and density. Other critical visible or non-visible metrics include characterization of chemistry, bonding or adhesion strength. Measuring one or more structural or internal properties of the part can comprise one or more methods selected from the group consisting of scattered and reflected or absorbed radiation, x-ray imaging, sound waves, scatterometry techniques, ultrasonic techniques, X-ray Photoelectron Spectroscopy (XPS), Four Transform Infrared Spectroscopy (FTIR), Raman Spectroscopy, Laser-Microprobe Mass Spectrometry (LMMS), and any combination thereof. Specific metrology beneficial to the end goals of characterizing the critical process parameters can be used. This in-situ metrology coupled with fast processing of data can enable open or closed loop control of the manufacturing process. Sensors appropriate to the key parameters of interest can be selected and utilized during the part printing process. The sensors may also comprise a camera for detecting light in the infrared or visible portion of the electromagnetic spectrum. Sensors such as IR cameras may be used to measure temperature fields. An image processing algorithm may be used to evaluate data generated by one or more sensors, to extract one or more structural or internal properties of the part. Visual (e.g., high magnification) microscopy from digital camera(s) can be used with proper software processing to detect voids, defects, and surface roughness. In order to utilize this technique, potentially large quantities of data may need to be interrogated using image processing algorithms in order to extract features of interest. Scatterometry techniques may be adapted to provide roughness or other data.

Ultrasonic techniques can be used to measure solid density and fiber and particle density which in turn may be useful in characterizing bond strength and fiber dispersion. The characterization can affect material strength. Ultrasonic techniques can also be used to measure thickness of features. Chemical bonding characterization, which may be useful for understanding fiber and/or matrix adhesion and layer-to-layer bonding, can be performed by multiple techniques such as XPS (X-ray Photoelectron Spectroscopy), FTIR (Four Transform Infrared Spectroscopy) and Raman Spectroscopy and Laser-Microprobe Mass Spectrometry (LMMS). One or more of these techniques may be utilized as part of the in-situ metrology for 3D printing. Ex-situ techniques may also be utilized in order to help provide appropriate calibration data for the in-situ techniques.

Sensors may be positioned on the robot end-effector of the three-dimensional printer in order to provide a sensor moving along with the deposited material. A robot end-effector may be a device positioned at the end of a robotic arm. The robot end-effector may be programmed to interact with its surrounding environment. Sensors may be also located at other various positions. The positions can be on-board the robot, on the effector, or deployed in the environment. Sensors may be in communication with the system. The system can further comprise one or more processors, a communication unit, memory, power supply, and storage. The communications unit can comprise an input and an output. The communication unit can be wired or wireless. The sensor measurements may or may not be stored in a database, and may or may not be used in future simulation and optimization operations. In-situ measurements may also be made using alternative methods with sensors in a cell but not directly attached to the robot end-effector.

In another aspect, the present disclosure provides a system for printing at least a portion of a three-dimensional (3D) object. The system may comprise a source of at least one filament material that is configured to supply at least one filament material for generating the 3D object. The system may comprise a substrate for supporting at least a portion of the 3D object. The system may additionally comprise at least one energy source configured to deliver at least a first energy beam. The system can comprise a controller operatively coupled to the at least one energy source, wherein the controller is programmed to (i) receive, in computer memory, a model of the 3D object, (ii) subsequent to receiving the model of the 3D object, direct the at least one filament material from the source of the at least one filament material towards the substrate that is configured to support the 3D object, thereby depositing a first layer corresponding to a portion of the 3D object adjacent to the substrate, which first layer is deposited in accordance with the model of the 3D object, (iii) deposit a second layer corresponding to at least a portion of the 3D object, which second layer is deposited in accordance with the model of the 3D object, and (iv) use at least a first energy beam from at least one energy source to selectively melt at least a portion of the first layer and/or the second layer, thereby forming at least a portion of the 3D object.

In some cases, the controller may be programmed to perform fused deposition modeling when printing the 3D object. In other cases, the controller may be programmed to print the 3D object with extrusion. In some cases, the controller may be programmed to print the 3D object without extrusion. The controller can be further programmed to deposit one or more additional layers adjacent to the first layer prior to depositing the second layer. The system may further comprise an opening for (i) receiving at least one filament material, and (ii) directing at least one filament material towards the substrate.

The layered structure can comprise substantially repetitive layers. The layers may have an average layer size of at least about 0.01 µm, 0.1 µm, 0.5 µm, 1 µm, 5 am, 10 µm, 20 µm, 30 µm, 40 µm, 50 µm, 60 µm, 70 µm, 80 µm, 90 µm, 100 µm, 150 µm, 200 µm, 250 µm, 300 µm, 350 µm, 400 µm, 450 µm, 500 m, 1 mm, 25 mm, 50 mm, 100 mm, 500 mm, or 1 m. The layers may have an average layer size of at most about 50 m, 1 m, 500 mm, 100 mm, 50 mm, 25 mm, 1 mm, 500 µm, 450 µm, 400 µm, 350 µm, 300 µm, 250 µm, 200 µm, 150 µm, 100 µm, 90 µm, 80 µm, 70 µm, 60 µm, 50 µm, 40 µm, 30 µm, 20 µm, or 10 µm. The layers may have an average layer size of any value between the aforementioned values of layer size. For example, the layers may have an average layer size from about 0.5 µm to about 500 mm, from about 15 gam to about 100 µm, from about 5 µm to about 300 µm, from about 20 µm to about 90 µm, or from about 10 µm to about 70 µm. The layered structure can be indicative of layered deposition. The layered structure can be indicative of solidification of melt pools formed during a three dimensional printing process. The structure indicative of a three dimensional printing process can comprise substantially repetitive variation comprising: variation in grain orientation, variation in material density, variation in the degree of compound segregation to grain boundaries, variation in the degree of element segregation to grain boundaries, variation in material phase, variation in metallurgical phase, variation in material porosity, variation in crystal phase, or variation in crystal structure. The melt pools may be indicative of an additive manufacturing process comprising stereolithography (SLA), selective laser melting (SLM), selective laser sintering (SLS), digital light processing (DLP), electron beam melting (EBM), laminated object manufacturing (LOM), binder jetting (BM), material jetting/wax casting (MJ), direct metal laser sintering (DMLS), or fused deposition modeling (FDM). The melt pools may be indicative of an additive manufacturing process comprising selective energy melting.

The source of at least one filament material may be configured to supply at least one filament material for generating the three-dimensional object. The at least one filament material may be stored on one or more spools or cartridges. The spools and/or cartridges may be replaceable. The at least one filament material may be a composite material, such as a continuous fiber composite. The filament material may be nano milled, short, long, continuous, or a combination thereof. The continuous fiber composite may be a continuous core reinforced filament. The continuous core reinforced filament can comprise a towpreg that is substantially void free and includes a polymer that coats or impregnates an internal continuous core. Depending upon the particular embodiment, the core may be a solid core or it may be a multi-strand core comprising multiple strands. The continuous fiber composite may be selected from the group consisting of glass, carbon, aramid, cotton, silicon carbide, polymer, wool, metal, and any combination thereof.

The filament material may incorporate one or more additional materials, such as resins and polymers. For example, appropriate resins and polymers include, but are not limited to, acrylonitrile butadiene styrene (ABS), epoxy, vinyl, nylon, polyetherimide (PEI), Polyaryletherketone (PAEK), Polyether ether ketone (PEEK), Polyactic Acid (PLA), Liquid Crystal Polymer, polyamide, polyimide, polyphenylene sulfide, polyphenylsulfone, polysulfone, polyether sulfone, polyethylenimine, polytetrafluoroethylene, polyvinylidene, and various other thermoplastics. The core of the continuous fiber composite may be selected to provide any desired property. Appropriate core fiber or strands include those materials which impart a desired property, such as structural, conductive (electrically and/or thermally), insulative (electrically and/or thermally), optical and/or fluidic transport. Such materials include, but are not limited to, carbon fibers, aramid fibers, fiberglass, metals (such as copper, silver, gold, tin, and steel), optical fibers, and flexible tubes. The core fiber or strands may be provided in any appropriate size. Further, multiple types of continuous cores may be used in a single continuous core reinforced filament to provide multiple functionalities such as electrical and optical properties. A single material may be used to provide multiple properties for the core reinforced filament. For example, a steel core may be used to provide both structural properties as well as electrical conductivity properties.

Alternatively, the filament material may comprise metal particles infused into a binder matrix. The metal particles may be metal powder. The binder matrix may include resins or polymers. Additionally, such binder matrix can be used a delivery device for the metal particles. Once the filament material is deposited onto the base, one or more energy sources can heat and melt the binder matrix, leaving the metal particles to melt and fuse into larger metal particles. Such energy sources may be without limitation, by a laser, a microwave source, a resistive heating source, an infrared energy source, a UV energy source, a hot fluid, a chemical reaction, a plasma source, a microwave source, an electromagnetic source, or an electron beam. Resistive heating may be joule heating. A source for resistive heating may be a power supply. The at least one filament material may be a metal filament. The at least one filament material may be a metal filament composite. The deposited at least one filament material may be subjected to resistive heating upon flow of an electrical current through the at least one filament material. The resistive heating may be sufficient to melt at least a portion of the deposited at least one filament material. The at least one filament material may be an electrode. The substrate may be another electrode.

The one or more energy sources may also provide localized heating to create a "melt pool" in the current layer or segment of the deposited build material prior to depositing the next segment or layer. The melt pool can increase diffusion and mixing of the build material between adjacent layers (e.g., across a direction orthogonal to the layers) as compared to other methods which deposit a subsequent layer of build material on top of a layer of build material that is below its melting temperature.

The hot fluid can have a temperature greater than 25° C., or greater than or equal to about 40° C., 50° C., 60° C., 70° C., 80° C., 90° C., 100° C., 150° C., 200° C., 250° C., 300° C., 350° C., 400° C., 450° C., 500° C., or higher. The hot fluid may have a temperature that is selected to soften or melt a material used to print an object. The hot fluid may have a temperature that is at or above a melting point or glass transition point of a polymeric material. The hot fluid can be a gas or a liquid. In some examples, the hot fluid is air.

The increased diffusion and mixing resulting from the melt pool may increase the chemical chain linkage, bonding, and chemical chain interactions between the two layers. This can result in increasing the build-material adhesion in the Z direction, thereby enhancing mechanical, thermal, and electrical properties of the three-dimensional object. The melt pool can also reduce the void space and porosity in the build object. Among other benefits, this decrease in porosity may also contribute to the aforementioned improvement in mechanical, thermal, and electrical properties.

The at least one filament material may have a cross sectional shape selected from the group consisting of circle, ellipse, parabola, hyperbola, convex polygon, concave polygon, cyclic polygon, equilateral polygon, equiangular polygon, regular convex polygon, regular star polygon, tape-like geometry, and any combination thereof. Such filament material can have a diameter of at most about 0.1 millimeters (mm), at most about 0.2 mm, at most about 0.3 mm, at most about 0.4 mm, at most about 0.5 mm, at most about 0.6 mm, at most about 0.7 mm, at most about 0.8 mm, at most about 0.9 mm, at most about 1 mm, at most about 2 mm, at most about 3 mm, at most about 4 mm, at most about 5 mm, at most about 10 mm, or at most about 20 mm.

Various modifiers within the layers themselves may be used which are selectively printed onto specific regions of the 3D object in order to impart various desirable mechanical, chemical, magnetic, electrical or other properties to the 3D object. Such modifiers may be selected from the group consisting of thermal conductors and insulators, dielectric promoters, electrical conductors and insulators, locally-contained heater traces for multi-zone temperature control, batteries, and sensors. In some embodiments, at least one print head can be may be used for printing such modifiers. As desired, such modifiers can be printed before at least a first energy beam is directed onto at least a portion of the first layer and/or second layer. Alternatively, such modifiers may be printed over a layer that has been melted, before filament material for the next layer is deposited.

For example, when printing a polyimide part from commercially available a filament comprising polyimide, an array of electrically conductive traces may be assimilated as an antenna to selectively absorb radiofrequency (RF) radiation within a specific and predetermined frequency range. The 3D object CAD model and software can designate as a sub-part the layer(s) that comprise the traces for modified properties (high electrical conductivity). Alternatively, if these portions of the layer entail different levels of energy for inducing fusion, compared to other regions having only the primary material, the CAD model and design of the 3D object may be adjusted accordingly.

In some embodiments, the system for printing at least a portion of a three-dimensional object may comprise at least one print head. The at least one print head may comprise one or more dies for extrusion. The at least one print head also deposit printed material without extrusion.

In some embodiments, the system for printing at least a portion of a three-dimensional object may comprise a build plate form. The system may also comprise a substrate. The substrate may be able to withstand high temperatures. The substrate may have high thermal tolerances, and able to withstand high temperatures, such as at least about 50° C., at least about 100° C., at least about 150° C., at least about 200° C., at least about 250° C., at least about 300° C., at least about 350° C., or at least about 400° C.

The substrate may be a non-removable. The substrate may be a removable plate secured over the build platform. In an embodiment, guiding legs/rails may be used to slide the removable plate into multiple grooves and multiple set screws and fasteners to secure the plate onto the build platform. In another embodiment, the spring/latch quick-release mechanism may be used to secure in place and remove the plate. The method to secure the plate may also be vacuum suction of the plate onto build platform. The method to secure the plate can be magnets and/or electro-magnets.

The substrate may be thermally conductive in nature, so that it can be heated. The substrate can be heated from the heated build platform by the temperature control components, such as heater cartridges. Further, the substrate can be made of a material having a low coefficient of thermal expansion (CTE), to avoid expansion of the plate as it is heated up due to the heated build platform. In an embodiment, the material for the substrate may be aluminum, steel, brass, ceramic, glass, or alloys similar with low coefficient of thermal expansion (CTE). Also, the substrate can have a thickness of at most about 0.1 inches (in), at most about 0.2 in, at most about 0.3 in, at most about 0.4 in, at most about 0.5 in, at most about 0.6 in, at most about 0.7 in, at most about 0.8 in, at most about 0.9 in, at most about 1 in, or at most about 5 in. Further, the thickness of the substrate may also depend on the flexural character of the material. The substrate may be thin enough to allow for minor flexing for the removal of the 3D object. Additionally, the substrate may not be too thin such that heating of the substrate results in rippling, bowing, or warping and resulting in a print surface that is uneven or not consistently level. Furthermore, the substrate may be able to withstand high temperatures, such as at least about 50° C., at least about 100° C., at least about 150° C., at least about 200° C., at least about 250° C., at least about 300° C., at least about 350° C., or at least about 400° C.

A high temperature polymer coating may be applied directly over the surface of the substrate. The high temperature polymer may be selected from the group consisting of polyether ether ketone, polyamide, polyimide, polyphenylene sulfide, polyphenylsulfone, polysulfone, polyether sulfone, polyethylenimine, polyetherimide, polytetrafluoroethylene, polyvinylidene, or any combination thereof. The high temperature used for coating may be a polyimide. In an embodiment, the high temperature polymer coating may be spray coated over the substrate. The thickness of the polymer coating may be at most about 0.005 in, at most about 0.01 in, at most about 0.05 in, at most about 0.1 in, at most about 0.5 in, or at most about 0.1 in. The high temperature polymer coating may not wear away and thus may not need to be replaced after every build under high temperature. Advantageously, the high temperature polymer coating can operate at temperatures of at least about 50° C., at least about 100° C., at least about 150° C., at least about 200° C., at least about 250° C., at least about 300° C., at least about 350° C., or at least about 400° C. The high temperature polymer coating may additionally be roughened or treated. The surface of the high temperature polymer coating may comprise a regular or an irregular patterned feature. In an embodiment, the surface of the high temperature polymer coating 106 may be roughened at the nano-, micro-, or milli-meter scale using methods like and not limited to sand blasting, bead blasting, and/or metal wire brushing to increase polymer adhesion to the coated surface.

The substrate may possess flexibility owing to the type of material it is made of. The flexibility of the substrate may allow for easier dissociation between the 3D object and the substrate upon cooling. Further, this flexibility can also reduce the possibility of damage to the high temperature polymer coating or the 3D object during object removal since a blade or wedge is no longer needed to pry off the object. Once the printing of the 3D object is completed, the 3D object may pop off the substrate when the substrate and 3D object has cooled.

In some embodiments, the system for printing at least a portion of a 3D object may comprise one or more heater cartridges with thermal control from PID controllers connected to thermocouples. The heater cartridges may function as a temperature control for the system. The one or more thermocouples can be situated at one or several locations to provide feedback to a controller, such as a PID controller, and hence maintain temperature set points throughout a build. The system may comprise a jacket cover outside of the print head to contain and direct the flow of the hot fluid (e.g., hot air) towards the layers of the deposited portion of the 3D object.

The controller may be configured after deposition of a first layer and/or a second layer of at least a portion of the 3D object, and before fusion is induced, to preheat the filament material to a temperature sufficient to reduce undesirable shrinkage and/or to minimize the laser energy needed to melt the next layer. For example, the preheating may be accomplished using the infrared heater attached to substrate or through other apparatuses of directing thermal energy within an enclosed space around the substrate. Alternatively, the preheating can be accomplished using energy beam melting by defocusing the energy beam and rapidly scanning it over the deposited first layer and or second layer of at least a portion of the 3D object.

In some embodiments, the controller may be configured using at least a first energy beam from at least one energy source to selectively heat and/or melt at least a portion of the first layer and/or the second layer, thereby forming at least a portion of the 3D object. The energy source may be selected from the group consisting of a laser, a microwave source, a resistive heating source, an infrared energy source, a UV energy source, a hot fluid, a chemical reaction, a plasma source, a microwave source, an electromagnetic source, an electron beam, or any combination thereof. Resistive heating may be joule heating. A source for resistive heating may be a power supply. The at least one filament material may be a metal filament. The at least one filament material may be a metal filament composite. The deposited at least one filament material may be subjected to resistive heating upon flow of an electrical current through the at least one filament material. The resistive heating may be sufficient to melt at least a portion of the deposited at least one filament material. The at least one filament material may be an electrode. The substrate may be another electrode.

The energy source may be a function of the chemical composition of the build material, such as the build material's thermal conductivity, heat capacity, latent heat of fusion, melting point, and melt flow viscosity. The at least one energy source may be a laser. The laser may be selected from the group consisting of gas lasers, chemical lasers, dye lasers, metal-vapor lasers, solid-state lasers, semiconductor lasers, free electron laser, gas dynamic laser, nickel-like samarium laser, Raman laser, nuclear pump laser, and any combination thereof. Gas lasers may comprise one or more of helium-neon laser, argon laser, krypton laser, xenon ion laser, nitrogen laser, carbon dioxide laser, carbon monoxide laser, and excimer laser. Chemical lasers may be selected from the group consisting of hydrogen fluoride laser, deuterium fluoride laser, chemical oxygen-iodine laser, all gas-phase iodine laser, and any combination thereof. Metal-vapor lasers can comprise one or more of helium-cadmium, helium mercury, helium selenium, helium silver, strontium vapor laser, neon-copper, copper vapor laser, gold vapor laser, and manganese vapor laser. Solid-state lasers may be selected from the group consisting of ruby laser, neodymium-doped yttrium aluminium garnet laser, neodymium and chromium-doped yttrium aluminium garnet laser, erbium-doped yttrium aluminium garnet laser, neodymium-doped yttrium lithium fluoride laser, neodymium doped yttrium othovanadate laser, neodymium doped yttrium calcium oxoborate laser, neodymium glass laser, titanium sapphire laser, thulium yttrium aluminium garnet laser, ytterbium yttrium aluminium garnet laser, ytterbium:$_2O_3$ (glass or ceramics) laser, ytterbium doped glass laser (rod, plate/chip, and fiber), holmium yttrium aluminium garnet laser, chromium zinc selenium laser, cerium doped lithium strontium (or calcium) aluminum fluoride laser, Promethium 147 doped phosphate glass solid-state laser, chromium doped chrysoberyl (alexandrite) laser, erbium doped and erbium-ytterbium codoped glass lasers, trivalent uranium doped calcium fluoride solid-state laser, divalent samarium doped calcium fluoride laser, FARBE center laser, and any combination thereof. Semiconductor laser may comprise one or more of semiconductor laser diode laser, gallium nitride laser, indium gallium nitride laser, aluminium gallium indium phosphide laser, aluminium gallium arsenide laser, indium gallium arsenide phosphide laser, lead salt laser, vertical cavity surface emitting laser, quantum cascade laser, and hybrid silicon laser.

The melting temperature of the at least one filament material can be at least about 150° C., at least about 200° C., at least about 250° C., at least about 300° C., at least about 350° C., at least about 400° C., at least about 450° C. The sintering temperature can be at most about 150° C., at most about 200° C., at most about 250° C., at most about 300° C., at most about 350° C., at most about 400° C. The controller may further be programmed to separate the remainder of the layer that did not fuse and solidify to form at least a portion of the three dimensional object, from the portion. The controller may be programmed to direct delivery of the three dimensional object to a customer. The controller may be programmed to direct packaging the three dimensional object.

The controller may be programmed to direct at least one energy beam from the energy source may be directed to the at least one portion of the 3D object adjacent to the substrate. Such energy beams may be sufficient to induce fusion of particles of the filament material within the desired cross-sectional geometry of the at least one portion of the 3D object. As the energy dissipates with cooling, atoms from neighboring particles may fuse together. In some embodiments, the at least one energy beam results in the fusion of particles of filament material both within the same layer and in the previously formed and resolidified adjoining layer(s) such that fusion is induced between at least two adjacent layers of the part, such as between at least one filament material in a deposited unfused layer and a previously-fused adjacent layer. The controller may be further programmed to repeat such process over multiple cycles as each part layer is added, until the full 3D object is formed.

In some cases, to create a melt pool large enough to span the width of the filament material segment, multiple energy sources or a combination of energy sources may be required. When multiple energy sources are used, the energy sources may be the same energy source. Alternatively, the multiple energy sources may be different energy sources. The energy source(s) may be separate from the system for printing at least a portion of the 3D object. In some other embodiments, the energy source(s) may be integrated with such system. For example, in one embodiment, a hot fluid may be channeled through the deposition nozzle. Because the material filament can flow in the melt pool, features of the 3D object being built can be altered. In some embodiments, the melt pool may be formed within the build object, such that a melt pool is not formed near the perimeters thereof. To accomplish this, the energy source may be turned off when the perimeters of the object are being built. In such embodiments, the geometrical tolerance of the build object may be maintained while the interior of the object has enhanced interlayer bonding. During printing, the filament material may be printed in the X, Y, and Z directions in one segment or layer.

The controller may be programmed to direct the processes of optical communication between at least one energy source and one or more beam splitters, which one or more beam splitters can split an energy beam from at least one light source into one or more beamlets that yields at least the first energy beam. The controller can be programmed to direct the example optical system of FIG. 3 to receive in an opening 301, split, and direct such energy beams at various angles to the plane of the substrate 208 of system 200. System 300 can comprise one or more beam splitters 302, one or more focusing lenses 303, one or more optical wedges 304, and any combination thereof. The optical system 300 may allow the energy beams to be aligned at any angle in the plane of deposition. The optical system may further comprise a beam expanding system and a spatial light modulator. At least the first energy beam may be emitted by at least one light source and expanded by the beam expanding system into parallel light beams having a large diameter by the beam expanding system. Then, such parallel energy beams may irradiate onto the one or more beam splitters. A part of the expanded energy beams may reach a spatial modulator for modulation after passing through the beam splitter and the modulated energy beams can be reflected to the beam splitter. A part of the modulated energy beam may be focused by the focusing system, angled by the optical wedges, and irradiated along the at least one filament material for three-dimensional printing. The beam expanding system may comprise a negative lens and a positive lens. Furthermore, the spatial light modulator can be a reflector type digital micro-mirror device or a phase type liquid crystal spatial light modulator.

One or more beam splitters may be selected from the group consisting of prism, glass sheet, plastic sheet, mirror, dielectric mirror, metal-coated mirror, partially reflecting mirror, pellicles, micro-optic beam splitters, waveguide beam splitters, beam splitter cubes, fiber-optic beam splitter, and any combination thereof. The controller may be programmed so that one or more optical wedges may be in optical communication with one or more beam splitters, which one or more optical wedges form at least the first light beam. Such optical wedges can form at least the first light beam in a uniform orientation. The one or more beamlets may pass through one or more focusing lenses prior to passing through at least one or more optical wedges. Such beamlets may have an elliptical polarization. The one or more beamlets may comprise a minor axis of at least about 0.5 mm, at least about 1 mm, at least about 2 mm, at least about 3 mm, at least about 4 mm, at least about 5 mm, at least about 6 mm, at least about 7 mm, at least about 8 mm, at least about 9 mm, at least about 10 mm, or at least about 15 mm. The one or more beamlets may also comprise a major axis of at least about 5 mm, at least about 10 mm, at least about 15 mm, at least about 20 mm, at least about 25 mm, at least about 30 mm, at least about 35 mm, at least about 40 mm, at least about 45 mm, or at least about 50 mm. Such energy beams can cover at least a portion of at least one filament material. The one or more focusing lenses may be used to adjust a ratio of the minor axis to the major axis of the one or more beamlets.

The controller can further be programmed so that the optical wedges may alter the path of the beam from vertical to any angle for uniform heating of the filament material. The controller may be programmed so that one or more optical wedges can further direct an optical path of at least the first light beam of a given location, direction, or angle normal to the substrate and/or along the substrate among one or more locations, directions, or angles. Such a direction of one or more optical wedges can allow for control of the heat from the light beam along the at least one filament material.

The system for printing at least a portion of a three-dimensional (3D) object may further comprise one or more optical wedges in combination with one or more of dispersive prism, reflective prism, beam-splitting prism, polarizing prism, or deflecting prisms. Dispersive prisms may be used to break up light into its constituent spectral colors because the refractive index depends on frequency. Examples of dispersive prisms include Triangular prism, Abbe prism, Pellin-Broca prism, Amici prism, Compound prism, or Grism prism. Reflective prisms can be used to reflect light, in order to flip, invert, rotate, deviate or displace the light beam. Examples of reflective prisms include Porro prism, Porro-Abbe prism, Amici roof prism, Pentaprism, Roof Pentaprism, Abbe-Koenig prism, Schmidt-Pechan prism, Bauernfeind prism, Dove prism, or Retroreflector prism. Some reflective prisms may be used for splitting a beam into two or more beams. Beam-splitting prisms may be a beam splitter cube or a dichronic prism. Polarizing prisms can split a beam of light into components of varying polarization. Examples of polarizing prisms may be Nicol prism, Wollaston prism, Nomarski prism, Rochon prism, Senarmont prism, Glan-Foucault prism, Glan-Taylor prism, or Glan-Thompson prism. Deflecting prisms may be one or more of a Risley prism pair, Rhomboid prisms, or Deck prisms. Wedge prisms may be used to deflect a beam of light by a fixed angle. A pair of such prisms can be used for beam steering; by rotating the prisms the beam can be deflected into any desired angle. The deflecting prism may be a Risley prism pair. Two wedge prisms can also be used as an anamorphic pair to change the shape of a beam. For example, this may be used to generate a round beam from the elliptical output of a laser diode.

The one or more optical wedges can have a refractive index of at least about 0.5, at least about 1, at least about 1.1, at least about 1.2, at least about 1.3, at least about 1.4, at least about 1.5, at least about 1.6, at least about 1.7, at least about 1.8, at least about 1.9, at least about 2.5, at least about 3, at least about 4, or at least about 5. Such optical wedges can have a diameter of at most about 0.1 inches (in), at most about 0.2 in, at most about 0.3 in, at most about 0.4 in, at most about 0.5 in, at most about 0.6 in, at most about 0.7 in, at most about 0.8 in, at most about 0.9 in, at most about 1 in, at most about 2 in, at most about 3 in, at most about 4 in, or at most about 5 in.

In some embodiments, the controller can be programmed so that at least the first energy beam may be incident on at least one filament material and on the substrate. Such energy beams may be directed along a given angle among one or more angles relative to the dispensing route of at least one filament material. The one or more optical wedges can comprise a first optical wedge and a second optical wedge. The first optical wedge may be the top wedge and the second optical wedge may be the bottom wedge. Through choosing the wedge angle, the energy beams can be made incident on the filament at an angle to the plane of the substrate. By directing the controller to rotate the bottom optical wedge, the incident angle can be varied. By directing the controller to rotate both the optical wedges, the angle of the line beam in the plane of deposition can be varied. For example, the controller may be programmed to direct the first optical wedge to rotate relative to the second optical wedge to change the direction of at least the first light beam. The controller may direct the first optical wedge and the second optical wedge to be angled in the same direction to increase an angle of at least the first energy beam with respect to a reference. The energy beam may be a light beam. The controller may direct the first optical wedge and the second optical wedge to rotate in opposite directions to allow at least the first energy beam to pass vertically through the one or more optical wedges. When altering an angle of incidence of the first optical wedge and the second optical wedge, or when altering a direction of the major axis of at least the first energy beam relative to the substrate or at least one filament material, the controller may direct the fluence of at least the first light beam to be altered. As a result, such light beams may heat at least one filament material without melting a deposited portion of the at least one filament material. In some instances, the controller may direct the at least the first energy beam to heat and melt a deposited portion of at least one filament material at a given location among one or more locations.

In other instances, the controller may program the at least one filament material to be directed to a compaction unit. Such filament material may be compacted by such a compaction unit to form at least one compacted filament material. The compaction unit may comprise a rigid body, one or more idler rollers, at least one freely suspended roller, a coolant unit, or any combination thereof. The at least one freely suspended roller may be a compaction roller. The controller may direct the rigid body and one or more idler rollers to secure the at least one freely suspended roller. Such freely suspended rollers may have a diameter of at most about 1 mm, at most about 2 mm, at most about 3 mm, at most about 4 mm, at most about 5 mm, at most about 6 mm, at most about 7 mm, at most about 8 mm, at most about 9 mm, at most about 10 mm, or at most about 15 mm. The controller may direct the coolant to cool the compaction unit so the at least one filament material does not stick to the roller and adheres to the previously deposited layer of the three-dimensional object.

The system for printing at least a portion of the 3D object may further comprise one or more cooling components. Such cooling components may be in proximity to the deposited filament material layer. Such cooling components can be located between the deposited filament material layer and the energy source. Such cooling components may be movable to or from a location that may be positioned between the filament material and the energy source. Such cooling components may assist in the process of cooling of the fused portion of the filament material layer. Such cooling components may also assist in the cooling of the filament material layer remainder that did not fuse to subsequently form at least a portion of the 3D object. Such cooling components can assist in the cooling of the at least a portion of the 3D object and the remainder at considerably the same rate. Such cooling components may be separated from the filament material layer and/or from the substrate by a gap. The gap may comprise a gas. The gap can have a cross-section that is at most about 0.1 mm, at most about 0.5 mm, at most about 1 mm, at most about 5 mm, or at most about 10 mm. The gap can be adjustable. The controller may be operatively connected to such cooling components and may be able to adjust the gap distance from the substrate. Such cooling components can track an energy that may be applied to the portion of the filament material layer by the energy source. Such cooling components may comprise a heat sink. Such cooling components may be a cooling fan. The controller may be operatively coupled to such cooling components and controls the tracing of such cooling components. Such cooling components may include at least one opening though which at least one energy beam from the energy source can be directed to the portion of the filament layer. The system for printing at least a portion of the 3D object can further comprise an additional energy source that provides energy to a remainder of the filament material layer that did not fuse to subsequently form at least a portion of the 3D object.

During printing of the three-dimensional object, certain parameters may be critical to printing high quality parts. One or more sensors can be used to measure one or more temperature(s) along at least one filament material. Such sensors can control intensities, positions, and/or angles of at least the first energy beam. The one or more sensors may be an optical pyrometer. The controller may direct the optical pyrometers to be aimed at the nip points and one or more points before and/or after the compaction unit to detect the temperature of the at least one filament materials as they are deposited. The temperature may vary from region to region of the filament material layer. Factors that affect temperature variance can include variable heater irradiance, variations in absorptivity of the composition, substrate temperature, filament material temperature, unfused filament material temperature, and the use of modifiers and additives. Accordingly, the controller may be programmed so that the image and temperature measurement inputs based upon layer temperature patterns captured by the one or more sensors may be used. The real time temperature inputs and the sintering model may be factors determining an energy requirement pattern for any one or more subsequent layers.

Additionally, the system may comprise a real time simulation program, a sample as shown in FIG. 4, to provide feedback control of a given location, direction, or angle of at least the first energy beam normal to the substrate and/or along the substrate among one or more locations, directions, or angles. The sample real time simulation of the optical beam path illustrates that choosing the appropriate wedge angle and energy beam orientation may result in the elliptical beam profile in FIG. 4. The real time simulation program may be a feedback control system. The feedback control system may be a Zemax simulation of the beam propagation.

Other parameters critical to printing high quality parts can include substrate temperature, melt zone temperature, as-built geometry, surface roughness and texture and density. Other critical visible or non-visible metrics include characterization of chemistry, bonding or adhesion strength. Measuring one or more structural or internal properties of the part can comprise one or more methods selected from the group consisting of scattered and reflected or absorbed radiation, x-ray imaging, sound waves, scatterometry techniques, ultrasonic techniques, X-ray Photoelectron Spectroscopy (XPS), Four Transform Infrared Spectroscopy (FTIR), Raman Spectroscopy, Laser-Microprobe Mass Spectrometry (LMMS), and any combination thereof. Specific metrology beneficial to the end goals of characterizing the critical process parameters can be used. This in-situ metrology coupled with fast processing of data can enable open or closed loop control of the manufacturing process. Sensors appropriate to the key parameters of interest can be selected and utilized during the part printing process. The sensors may also comprise a camera for detecting light in the infrared or visible portion of the electromagnetic spectrum. Sensors such as IR cameras may be used to measure temperature fields. An image processing algorithm may be used to evaluate data generated by one or more sensors, to extract one or more structural or internal properties of the part. Visual (e.g., high magnification) microscopy from digital camera(s) can be used with proper software processing to detect voids, defects, and surface roughness. In order to utilize this technique, potentially large quantities of data may need to be interrogated using image processing algorithms in order to extract features of interest. Scatterometry techniques may be adapted to provide roughness or other data.

Ultrasonic techniques can be used to measure solid density and fiber and particle density which in turn may be useful in characterizing bond strength and fiber dispersion. The characterization can affect material strength. Ultrasonic techniques can also be used to measure thickness of features. Chemical bonding characterization, which may be useful for understanding fiber and/or matrix adhesion and layer-to-layer bonding, can be performed by multiple techniques such as XPS (X-ray Photoelectron Spectroscopy), FTIR (Four Transform Infrared Spectroscopy) and Raman Spectroscopy and Laser-Microprobe Mass Spectrometry (LMMS). One or more of these techniques may be utilized as part of the in-situ metrology for 3D printing. Ex-situ techniques may also be utilized in order to help provide appropriate calibration data for the in-situ techniques.

Sensors may be positioned on the robot end-effector of the three-dimensional printer in order to provide a sensor moving along with the deposited material. A robot end-effector may be a device positioned at the end of a robotic arm. The robot end-effector may be programmed to interact with its surrounding environment. Sensors may be also located at other various positions. The positions can be on-board the robot, on the effector, or deployed in the environment. Sensors may be in communication with the system. The system can further comprise one or more processors, a communication unit, memory, power supply, and storage.

The communications unit can comprise an input and an output. The communication unit can be wired or wireless. The sensor measurements may or may not be stored in a database, and may or may not be used in future simulation and optimization operations. In-situ measurements may also be made using alternative methods with sensors in a cell but not directly attached to the robot end-effector.

In another aspect, the present disclosure provides a system for printing at least a portion of a 3D object. The system may comprise a source of at least one filament material that is configured to supply at least one filament material for generating the 3D object. The system may comprise a substrate for supporting at least a portion of the 3D object. The system may additionally comprise at least one energy source configured to deliver at least a first energy beam. The system can comprise a controller operatively coupled to at least one energy source, wherein the controller is programmed to (i) receive, in computer memory, a model of the 3D object, (ii) subsequent to receiving the model of the 3D object, direct at least one filament material from the source of at least one filament material towards the substrate that is configured to support the 3D object, thereby depositing a first layer corresponding to a portion of the 3D object adjacent to the substrate, which first layer is deposited in accordance with the model of the 3D object, (iii) use at least a first energy beam from at least one energy source to melt at least a portion of the first layer, and (iv) deposit a second layer corresponding to at least a portion of the 3D object, which second layer is deposited in accordance with a model of the 3D object, thereby generating at least a portion of the 3D object. In some cases, the controller may be programmed to perform fused deposition modeling when printing the 3D object. In other cases, the controller may be programmed to print the 3D object with extrusion. In some cases, the controller may be programmed to print the 3D object without extrusion. The controller can be further programmed to repeat (ii)-(iv) one or more times.

The system may further comprise an opening for (i) receiving at least one filament material, and (ii) directing at least one filament material towards the substrate.

The layered structure can comprise substantially repetitive layers. The layers may have an average layer size of at least about 0.5 µm, 1 µm, 5 µm, 10 µm, 20 µm, 30 µm, 40 µm, 50 µm, 60 µm, 70 µm, 80 µm, 90 µm, 100 µm, 150 µm, 200 µm, 250 µm, 300 m, 350 µm, 400 µm, 450 µm, 500 µm, 1 mm, 25 mm, 50 mm, 100 mm, 500 mm, or 1 µm. The layers may have an average layer size of at most about 50 m, 1 m, 500 mm, 100 mm, 50 mm, 25 mm, 1 mm, 500 µm, 450 m, 400 µm, 350 µm, 300 µm, 250 µm, 200 µm, 150 µm, 100 m, 90 µm, 80 µm, 70 µm, 60 µm, 50 µm, 40 µm, 30 µm, 20 µm, or 10 µm. The layers may have an average layer size of any value between the aforementioned values of layer size. For example, the layers may have an average layer size from about 0.5 µm to about 500 mm, from about 15 µm to about 100 µm, from about 5 µm to about 300 µm, from about 20 µm to about 90 µm, or from about 10 µm to about 70 µm. The layered structure can be indicative of layered deposition. The layered structure can be indicative of solidification of melt pools formed during a three dimensional printing process. The structure indicative of a three dimensional printing process can comprise substantially repetitive variation comprising: variation in grain orientation, variation in material density, variation in the degree of compound segregation to grain boundaries, variation in the degree of element segregation to grain boundaries, variation in material phase, variation in metallurgical phase, variation in material porosity, variation in crystal phase, or variation in crystal structure. The melt pools may be indicative of an additive manufacturing process comprising stereolithography (SLA), selective laser melting (SLM), selective laser sintering (SLS), digital light processing (DLP), electron beam melting (EBM), laminated object manufacturing (LOM), binder jetting (BM), material jetting/wax casting (MJ), direct metal laser sintering (DMLS), or fused deposition modeling (FDM). The melt pools may be indicative of an additive manufacturing process comprising selective energy melting.

The source of at least one filament material may be configured to supply at least one filament material for generating the three-dimensional object. The at least one filament material may be stored on one or more spools or cartridges. The spools and/or cartridges may be replaceable. The at least one filament material may be a composite material, such as a continuous fiber composite. The filament material may be nano milled, short, long, continuous, or a combination thereof. The continuous fiber composite may be a continuous core reinforced filament. The continuous core reinforced filament can comprise a towpreg that is substantially void free and includes a polymer that coats or impregnates an internal continuous core. Depending upon the particular embodiment, the core may be a solid core or it may be a multi-strand core comprising multiple strands. The continuous fiber composite may be selected from the group consisting of glass, carbon, aramid, cotton, silicon carbide, polymer, wool, metal, and any combination thereof.

The filament material may incorporate one or more additional materials, such as resins and polymers. For example, appropriate resins and polymers include, but are not limited to, acrylonitrile butadiene styrene (ABS), epoxy, vinyl, nylon, polyetherimide (PEI), Polyaryletherketone (PAEK), Polyether ether ketone (PEEK), Polyactic Acid (PLA), Liquid Crystal Polymer, polyamide, polyimide, polyphenylene sulfide, polyphenylsulfone, polysulfone, polyether sulfone, polyethylenimine, polytetrafluoroethylene, polyvinylidene, and various other thermoplastics. The core of the continuous fiber composite may be selected to provide any desired property. Appropriate core fiber or strands include those materials which impart a desired property, such as structural, conductive (electrically and/or thermally), insulative (electrically and/or thermally), optical and/or fluidic transport. Such materials include, but are not limited to, carbon fibers, aramid fibers, fiberglass, metals (such as copper, silver, gold, tin, and steel), optical fibers, and flexible tubes. The core fiber or strands may be provided in any appropriate size. Further, multiple types of continuous cores may be used in a single continuous core reinforced filament to provide multiple functionalities such as electrical and optical properties. A single material may be used to provide multiple properties for the core reinforced filament. For example, a steel core may be used to provide both structural properties as well as electrical conductivity properties.

Alternatively, the filament material may comprise metal particles infused into a binder matrix. The metal particles may be metal powder. The binder matrix may include resins or polymers. Additionally, such binder matrix can be used a delivery device for the metal particles. Once the filament material is deposited onto the base, one or more energy sources can heat and melt the binder matrix, leaving the metal particles to melt and fuse into larger metal particles. Such energy sources may be without limitation, a laser, a microwave source, a resistive heating source, an infrared energy source, a UV energy source, a hot fluid, a chemical reaction, a plasma source, a microwave source, an electromagnetic source, or an electron beam. Resistive heating may be joule heating. A source for resistive heating may be a power supply. The at least one filament material may be a metal filament. The at least one filament material may be a metal filament composite. The deposited at least one filament material may be subjected to resistive heating upon flow of an electrical current through the at least one filament material. The resistive heating may be sufficient to melt at least a portion of the deposited at least one filament material. The at least one filament material may be an electrode. The substrate may be another electrode.

The one or more energy sources may also provide localized heating to create a "melt pool" in the current layer or segment of the deposited build material prior to depositing the next segment or layer. The melt pool can increase diffusion and mixing of the build material between adjacent layers (e.g., across a direction orthogonal to the layers) as compared to other methods which deposit a subsequent layer of build material on top of a layer of build material that is below its melting temperature.

The increased diffusion and mixing resulting from the melt pool may increase the chemical chain linkage, bonding, and chemical chain interactions between the two layers. This can result in increasing the build-material adhesion in the Z direction, thereby enhancing mechanical, thermal, and electrical properties of the three-dimensional object. The melt pool can also reduce the void space and porosity in the build object. Among other benefits, this decrease in porosity may also contribute to the aforementioned improvement in mechanical, thermal, and electrical properties.

The at least one filament material may have a cross sectional shape selected from the group consisting of circle, ellipse, parabola, hyperbola, convex polygon, concave polygon, cyclic polygon, equilateral polygon, equiangular polygon, regular convex polygon, regular star polygon, tape-like geometry, and any combination thereof. Such filament material can have a diameter of at most about 0.1 millimeters (mm), at most about 0.2 mm, at most about 0.3 mm, at most about 0.4 mm, at most about 0.5 mm, at most about 0.6 mm, at most about 0.7 mm, at most about 0.8 mm, at most about 0.9 mm, at most about 1 mm, at most about 2 mm, at most about 3 mm, at most about 4 mm, at most about 5 mm, at most about 10 mm, or at most about 20 mm.

Various modifiers within the layers themselves may be used which are selectively printed onto specific regions of the 3D object in order to impart various desirable mechanical, chemical, magnetic, electrical or other properties to the 3D object. Such modifiers may be selected from the group consisting of thermal conductors and insulators, dielectric promoters, electrical conductors and insulators, locally-contained heater traces for multi-zone temperature control, batteries, and sensors. In some embodiments, at least one print head can be may be used for printing such modifiers. As desired, such modifiers can be printed before at least a first energy beam is directed onto at least a portion of the first layer and/or second layer. Alternatively, such modifiers may be printed over a layer that has been melted, before filament material for the next layer is deposited.

For example, when printing a polyimide part from commercially available a filament comprising polyimide, an array of electrically conductive traces may be assimilated as an antenna to selectively absorb radiofrequency (RF) radiation within a specific and predetermined frequency range. The 3D object CAD model and software can designate as a sub-part the layer(s) that comprise the traces for modified properties (high electrical conductivity). Alternatively, if these portions of the layer entail different levels of energy for inducing fusion, compared to other regions having only the primary material, the CAD model and design of the 3D object may be adjusted accordingly.

In some embodiments, the system for printing at least a portion of a three-dimensional object may comprise at least one print head. The at least one print head may comprise one or more dies for extrusion. The at least one print head also deposit printed material without extrusion.

In some embodiments, the system for printing at least a portion of a three-dimensional object may comprise a build plate form. The system may also comprise a substrate. The substrate may be able to withstand high temperatures. The substrate may have high thermal tolerances, and able to withstand high temperatures, such as at least about 50° C., at least about 100° C., at least about 150° C., at least about 200° C., at least about 250° C., at least about 300° C., at least about 350° C., or at least about 400° C.

The substrate may be a non-removable. The substrate may be a removable plate secured over the build platform. In an embodiment, guiding legs/rails may be used to slide the removable plate into multiple grooves and multiple set screws and fasteners to secure the plate onto the build platform. In another embodiment, the spring/latch quick-release mechanism may be used to secure in place and remove the plate. The method to secure the plate may also be vacuum suction of the plate onto build platform. The method to secure the plate can be magnets and/or electromagnets.

The substrate may be thermally conductive in nature, so that it can be heated. The substrate can be heated from the heated build platform by the temperature control components, such as heater cartridges. Further, the substrate can be made of a material having a low coefficient of thermal expansion (CTE), to avoid expansion of the plate as it is heated up due to the heated build platform. In an embodiment, the material for the substrate may be aluminum, steel, brass, ceramic, glass, or alloys similar with low coefficient of thermal expansion (CTE). Also, the substrate can have a thickness of at most about 0.1 inches (in), at most about 0.2 in, at most about 0.3 in, at most about 0.4 in, at most about 0.5 in, at most about 0.6 in, at most about 0.7 in, at most about 0.8 in, at most about 0.9 in, at most about 1 in, or at most about 5 in. Further, the thickness of the substrate may also depend on the flexural character of the material. The substrate may be thin enough to allow for minor flexing for the removal of the 3D object. Additionally, the substrate may not be too thin such that heating of the substrate results in rippling, bowing, or warping and resulting in a print surface that is uneven or not consistently level. Furthermore, the substrate may be able to withstand high temperatures, such as at least about 50° C., at least about 100° C., at least about 150° C., at least about 200° C., at least about 250° C., at least about 300° C., at least about 350° C., or at least about 400° C.

A high temperature polymer coating may be applied directly over the surface of the substrate. The high temperature polymer may be selected from the group consisting of polyether ether ketone, polyamide, polyimide, polyphenylene sulfide, polyphenylsulfone, polysulfone, polyether sulfone, polyethylenimine, polyetherimide, polytetrafluoroethylene, polyvinylidene, or any combination thereof. The high temperature used for coating may be a polyimide. In an embodiment, the high temperature polymer coating may be spray coated over the substrate. The thickness of the polymer coating may be at most about 0.005 in, at most about 0.01 in, at most about 0.05 in, at most about 0.1 in, at most about 0.5 in, or at most about 0.1 in. The high temperature polymer coating may not wear away and thus may not need to be replaced after every build under high temperature. Advantageously, the high temperature polymer coating can operate at temperatures of at least about 50° C., at least about 100° C., at least about 150° C., at least about 200° C., at least about 250° C., at least about 300° C., at least about 350° C., or at least about 400° C. The high temperature polymer coating may additionally be roughened or treated. The surface of the high temperature polymer coating may comprise a regular or an irregular patterned feature. In an embodiment, the surface of the high temperature polymer coating 106 may be roughened at the nano-, micro-, or milli-meter scale using methods like and not limited to sand blasting, bead blasting, and/or metal wire brushing to increase polymer adhesion to the coated surface.

The substrate may possess flexibility owing to the type of material it is made of. The flexibility of the substrate may allow for easier dissociation between the 3D object and the substrate upon cooling. Further, this flexibility can also reduce the possibility of damage to the high temperature polymer coating or the 3D object during object removal since a blade or wedge is no longer needed to pry off the object. Once the printing of the 3D object is completed, the 3D object may pop off the substrate when the substrate and 3D object has cooled.

In some embodiments, the system for printing at least a portion of a 3D object may comprise one or more heater cartridges with thermal control from PID controllers connected to thermocouples. The heater cartridges may function as a temperature control for the system. The one or more thermocouples can be situated at one or several locations to provide feedback to a controller, such as a PID controller, and hence maintain temperature set points throughout a build. The system may comprise a jacket cover outside of the print head to contain and direct the flow of the hot fluid (e.g., hot air) towards the layers of the deposited portion of the 3D object.

The controller may be configured after deposition of a first layer and/or a second layer of at least a portion of the 3D object, and before fusion is induced, to preheat the filament material to a temperature sufficient to reduce undesirable shrinkage and/or to minimize the laser energy needed to melt the next layer. For example, the preheating may be accomplished using the infrared heater attached to substrate or through other apparatuses of directing thermal energy within an enclosed space around the substrate. Alternatively, the preheating can be accomplished using energy beam melting by defocusing the energy beam and rapidly scanning it over the deposited first layer and or second layer of at least a portion of the 3D object.

In some embodiments, the controller may be configured using at least a first energy beam from at least one energy source to selectively heat and/or melt at least a portion of the first layer and/or the second layer, thereby forming at least a portion of the 3D object. The energy source may be selected from the group consisting of a laser, a microwave source, a resistive heating source, an infrared energy source, a UV energy source, a hot fluid, a chemical reaction, a plasma source, a microwave source, an electromagnetic source, an electron beam, or any combination thereof. Resistive heating may be joule heating. A source for resistive heating may be a power supply. The at least one filament material may be a metal filament. The at least one filament material may be a metal filament composite. The deposited at least one filament material may be subjected to resistive heating upon flow of an electrical current through the at least one filament material. The resistive heating may be sufficient to melt at least a portion of the deposited at least one filament material. The at least one filament material may be an electrode. The substrate may be another electrode.

The energy source may be a function of the chemical composition of the build material, such as the build material's thermal conductivity, heat capacity, latent heat of fusion, melting point, and melt flow viscosity. The at least one energy source may be a laser. The laser may be selected from the group consisting of gas lasers, chemical lasers, dye lasers, metal-vapor lasers, solid-state lasers, semiconductor lasers, free electron laser, gas dynamic laser, nickel-like samarium laser, Raman laser, nuclear pump laser, and any combination thereof. Gas lasers may comprise one or more of helium-neon laser, argon laser, krypton laser, xenon ion laser, nitrogen laser, carbon dioxide laser, carbon monoxide laser, and excimer laser. Chemical lasers may be selected from the group consisting of hydrogen fluoride laser, deuterium fluoride laser, chemical oxygen-iodine laser, all gas-phase iodine laser, and any combination thereof. Metal-vapor lasers can comprise one or more of helium-cadmium, helium mercury, helium selenium, helium silver, strontium vapor laser, neon-copper, copper vapor laser, gold vapor laser, and manganese vapor laser. Solid-state lasers may be selected from the group consisting of ruby laser, neodymium-doped yttrium aluminium garnet laser, neodymium and chromium-doped yttrium aluminium garnet laser, erbium-doped yttrium aluminium garnet laser, neodymium-doped yttrium lithium fluoride laser, neodymium doped yttrium othovanadate laser, neodymium doped yttrium calcium oxoborate laser, neodymium glass laser, titanium sapphire laser, thulium yttrium aluminium garnet laser, ytterbium yttrium aluminium garnet laser, ytterbium:$_2$O$_3$ (glass or ceramics) laser, ytterbium doped glass laser (rod, plate/chip, and fiber), holmium yttrium aluminium garnet laser, chromium zinc selenium laser, cerium doped lithium strontium (or calcium) aluminum fluoride laser, Promethium 147 doped phosphate glass solid-state laser, chromium doped chrysoberyl (alexandrite) laser, erbium doped and erbium-ytterbium codoped glass lasers, trivalent uranium doped calcium fluoride solid-state laser, divalent samarium doped calcium fluoride laser, FARBE center laser, and any combination thereof. Semiconductor laser may comprise one or more of semiconductor laser diode laser, gallium nitride laser, indium gallium nitride laser, aluminium gallium indium phosphide laser, aluminium gallium arsenide laser, indium gallium arsenide phosphide laser, lead salt laser, vertical cavity surface emitting laser, quantum cascade laser, and hybrid silicon laser.

The melting temperature of the at least one filament material can be at least about 150° C., at least about 200° C., at least about 250° C., at least about 300° C., at least about 350° C., at least about 400° C., at least about 450° C. The sintering temperature can be at most about 150° C., at most about 200° C., at most about 250° C., at most about 300° C., at most about 350° C., at most about 400° C. The controller may further be programmed to separate the remainder of the layer that did not fuse and solidify to form at least a portion of the three dimensional object, from the portion. The controller may be programmed to direct delivery of the three dimensional object to a customer. The controller may be programmed to direct packaging the three dimensional object.

The controller may be programmed to direct at least one energy beam from the energy source may be directed to the at least one portion of the 3D object adjacent to the substrate. Such energy beams may be sufficient to induce fusion of particles of the filament material within the desired cross-sectional geometry of the at least one portion of the 3D object. As the energy dissipates with cooling, atoms from neighboring particles may fuse together. In some embodiments, the at least one energy beam results in the fusion of particles of filament material both within the same layer and in the previously formed and resolidified adjoining layer(s) such that fusion is induced between at least two adjacent layers of the part, such as between at least one filament material in a deposited unfused layer and a previously-fused adjacent layer. The controller may be further programmed to repeat such process over multiple cycles as each part layer is added, until the full 3D object is formed.

In some cases, to create a melt pool large enough to span the width of the filament material segment, multiple energy sources or a combination of energy sources may be required. When multiple energy sources are used, the energy sources may be the same energy source. Alternatively, the multiple energy sources may be different energy sources. The energy source(s) may be separate from the system for printing at least a portion of the 3D object. In some other embodiments, the energy source(s) may be integrated with such system. For example, in one embodiment, a hot fluid may be channeled through the deposition nozzle. Because the material filament can flow in the melt pool, features of the 3D object being built can be altered. In some embodiments, the melt pool may be formed within the build object, such that a melt pool is not formed near the perimeters thereof. To accomplish this, the energy source may be turned off when the perimeters of the object are being built. In such embodiments, the geometrical tolerance of the build object may be maintained while the interior of the object has enhanced interlayer bonding. During printing, the filament material may be printed in the X, Y, and Z directions in one segment or layer.

The controller may be programmed to direct the processes of optical communication between at least one energy source and one or more beam splitters, which one or more beam splitters can split an energy beam from at least one light source into one or more beamlets that yields at least the first energy beam. The controller can be programmed to direct the example optical system of FIG. 3 to receive in an opening 301, split, and direct such energy beams at various angles to the plane of the substrate 208 of system 200. System 300 can comprise one or more beam splitters 302, one or more focusing lenses 303, one or more optical wedges 304, and any combination thereof. The optical system 300 may allow the energy beams to be aligned at any angle in the plane of deposition. The optical system may further comprise a beam expanding system and a spatial light modulator. At least the first energy beam may be emitted by at least one light source and expanded by the beam expanding system into parallel light beams having a large diameter by the beam expanding system. Then, such parallel energy beams may irradiate onto the one or more beam splitters. A part of the expanded energy beams may reach a spatial modulator for modulation after passing through the beam splitter and the modulated energy beams can be reflected to the beam splitter. A part of the modulated energy beam may be focused by the focusing system, angled by the optical wedges, and irradiated along the at least one filament material for three-dimensional printing. The beam expanding system may comprise a negative lens and a positive lens. Furthermore, the spatial light modulator can be a reflector type digital micro-mirror device or a phase type liquid crystal spatial light modulator.

One or more beam splitters may be selected from the group consisting of prism, glass sheet, plastic sheet, mirror, dielectric mirror, metal-coated mirror, partially reflecting mirror, pellicles, micro-optic beam splitters, waveguide beam splitters, beam splitter cubes, fiber-optic beam splitter, and any combination thereof. The controller may be programmed so that one or more optical wedges may be in optical communication with one or more beam splitters, which one or more optical wedges form at least the first light beam. Such optical wedges can form at least the first light beam in a uniform orientation. The one or more beamlets may pass through one or more focusing lenses prior to passing through at least one or more optical wedges. Such beamlets may have an elliptical polarization. The one or more beamlets may comprise a minor axis of at least about 0.5 mm, at least about 1 mm, at least about 2 mm, at least about 3 mm, at least about 4 mm, at least about 5 mm, at least about 6 mm, at least about 7 mm, at least about 8 mm, at least about 9 mm, at least about 10 mm, or at least about 15 mm. The one or more beamlets may also comprise a major axis of at least about 5 mm, at least about 10 mm, at least about 15 mm, at least about 20 mm, at least about 25 mm, at least about 30 mm, at least about 35 mm, at least about 40 mm, at least about 45 mm, or at least about 50 mm. Such energy beams can cover at least a portion of at least one filament material. The one or more focusing lenses may be used to adjust a ratio of the minor axis to the major axis of the one or more beamlets.

The controller can further be programmed so that the optical wedges may alter the path of the beam from vertical to any angle for uniform heating of the filament material. The controller may be programmed so that one or more optical wedges can further direct an optical path of at least the first light beam of a given location, direction, or angle normal to the substrate and/or along the substrate among one or more locations, directions, or angles. Such a direction of one or more optical wedges can allow for control of the heat from the light beam along the at least one filament material.

The system for printing at least a portion of a three-dimensional (3D) object may further comprise one or more optical wedges in combination with one or more of dispersive prism, reflective prism, beam-splitting prism, polarizing prism, or deflecting prisms. Dispersive prisms may be used to break up light into its constituent spectral colors because the refractive index depends on frequency. Examples of dispersive prisms include Triangular prism, Abbe prism, Pellin-Broca prism, Amici prism, Compound prism, or Grism prism. Reflective prisms can be used to reflect light, in order to flip, invert, rotate, deviate or displace the light beam. Examples of reflective prisms include Porro prism, Porro-Abbe prism, Amici roof prism, Pentaprism, Roof Pentaprism, Abbe-Koenig prism, Schmidt-Pechan prism, Bauernfeind prism, Dove prism, or Retroreflector prism. Some reflective prisms may be used for splitting a beam into two or more beams. Beam-splitting prisms may be a beam splitter cube or a dichronic prism. Polarizing prisms can split a beam of light into components of varying polarization. Examples of polarizing prisms may be Nicol prism, Wollaston prism, Nomarski prism, Rochon prism, Senarmont prism, Glan-Foucault prism, Glan-Taylor prism, or Glan-Thompson prism. Deflecting prisms may be one or more of a Risley prism pair, Rhomboid prisms, or Deck prisms. Wedge prisms may be used to deflect a beam of light by a fixed angle. A pair of such prisms can be used for beam steering; by rotating the prisms the beam can be deflected into any desired angle. The deflecting prism may be a Risley prism pair. Two wedge prisms can also be used as an anamorphic pair to change the shape of a beam. For example, this may be used to generate a round beam from the elliptical output of a laser diode.

The one or more optical wedges can have a refractive index of at least about 0.5, at least about 1, at least about 1.1, at least about 1.2, at least about 1.3, at least about 1.4, at least about 1.5, at least about 1.6, at least about 1.7, at least about 1.8, at least about 1.9, at least about 2.5, at least about 3, at least about 4, or at least about 5. Such optical wedges can have a diameter of at most about 0.1 inches (in), at most about 0.2 in, at most about 0.3 in, at most about 0.4 in, at most about 0.5 in, at most about 0.6 in, at most about 0.7 in, at most about 0.8 in, at most about 0.9 in, at most about 1 in, at most about 2 in, at most about 3 in, at most about 4 in, or at most about 5 in.

In some embodiments, the controller can be programmed so that at least the first energy beam may be incident on at least one filament material and on the substrate. Such energy beams may be directed along a given angle among one or more angles relative to the dispensing route of at least one filament material. The one or more optical wedges can comprise a first optical wedge and a second optical wedge. The first optical wedge may be the top wedge and the second optical wedge may be the bottom wedge. Through choosing the wedge angle, the energy beams can be made incident on the filament at an angle to the plane of the substrate. By directing the controller to rotate the bottom optical wedge, the incident angle can be varied. By directing the controller to rotate both the optical wedges, the angle of the line beam in the plane of deposition can be varied. For example, the controller may be programmed to direct the first optical wedge to rotate relative to the second optical wedge to change the direction of at least the first light beam. The controller may direct the first optical wedge and the second optical wedge to be angled in the same direction to increase an angle of at least the first energy beam with respect to the reference. The energy beam may be a light beam. The controller may direct the first optical wedge and the second optical wedge to rotate in opposite directions to allow at least the first energy beam to pass vertically through the one or more optical wedges. When altering an angle of incidence of the first optical wedge and the second optical wedge, or when altering a direction of the major axis of at least the first energy beam relative to the substrate or at least one filament material, the controller may direct the fluence of at least the first light beam to be altered. As a result, such light beams may heat at least one filament material without melting a deposited portion of the at least one filament material. In some instances, the controller may direct the at least the first energy beam to heat and melt a deposited portion of at least one filament material at a given location among one or more locations.

In other instances, the controller may program the at least one filament material to be directed to a compaction unit. Such filament material may be compacted by such a compaction unit to form at least one compacted filament material. The compaction unit may comprise a rigid body, one or more idler rollers, at least one freely suspended roller, a coolant unit, or any combination thereof. The at least one freely suspended roller may be a compaction roller. The controller may direct the rigid body and one or more idler rollers to secure the at least one freely suspended roller. Such freely suspended rollers may have a diameter of at most about 1 mm, at most about 2 mm, at most about 3 mm, at most about 4 mm, at most about 5 mm, at most about 6 mm, at most about 7 mm, at most about 8 mm, at most about 9 mm, at most about 10 mm, or at most about 15 mm. The controller may direct the coolant to cool the compaction unit so the at least one filament material does not stick to the roller and adheres to the previously deposited layer of the three-dimensional object.

The system for printing at least a portion of the 3D object may further comprise one or more cooling components. Such cooling components may be in proximity to the deposited filament material layer. Such cooling components can be located between the deposited filament material layer and the energy source. Such cooling components may be movable to or from a location that may be positioned between the filament material and the energy source. Such cooling components may assist in the process of cooling of the fused portion of the filament material layer. Such cooling components may also assist in the cooling of the filament material layer remainder that did not fuse to subsequently form at least a portion of the 3D object. Such cooling components can assist in the cooling of the at least a portion of the 3D object and the remainder at considerably the same rate. Such cooling components may be separated from the filament material layer and/or from the substrate by a gap. The gap may comprise a gas. The gap can have a cross-section that is at most about 0.1 mm, at most about 0.5 mm, at most about 1 mm, at most about 5 mm, or at most about 10 mm. The gap can be adjustable. The controller may be operatively connected to such cooling components and may be able to adjust the gap distance from the substrate. Such cooling components can track an energy that may be applied to the portion of the filament material layer by the energy source. Such cooling components may comprise a heat sink. Such cooling components may be a cooling fan. The controller may be operatively coupled to such cooling components and controls the tracing of such cooling components. Such cooling components may include at least one opening though which at least one energy beam from the energy source can be directed to the portion of the filament layer. The system for printing at least a portion of the 3D object can further comprise an additional energy source that provides energy to a remainder of the filament material layer that did not fuse to subsequently form at least a portion of the 3D object.

During printing of the three-dimensional object, certain parameters may be critical to printing high quality parts. One or more sensors can be used to measure one or more temperature(s) along at least one filament material. Such sensors can control intensities, positions, and/or angles of at least the first energy beam. The one or more sensors may be an optical pyrometer. The controller may direct the optical pyrometers to be aimed at the nip points and one or more points before and/or after the compaction unit to detect the temperature of the at least one filament materials as they are deposited. The temperature may vary from region to region of the filament material layer. Factors that affect temperature variance can include variable heater irradiance, variations in absorptivity of the composition, substrate temperature, filament material temperature, unfused filament material temperature, and the use of modifiers and additives. Accordingly, the controller may be programmed so that the image and temperature measurement inputs based upon layer temperature patterns captured by the one or more sensors may be used. The real time temperature inputs and the sintering model may be factors determining an energy requirement pattern for any one or more subsequent layers.

Additionally, the system may comprise a real time simulation program, a sample as shown in FIG. 4, to provide feedback control of a given location, direction, or angle of at least the first energy beam normal to the substrate and/or along the substrate among one or more locations, directions, or angles. The sample real time simulation of the optical beam path illustrates that choosing the appropriate wedge angle and energy beam orientation may result in the elliptical beam profile in FIG. 4. The real time simulation program may be a feedback control system. The feedback control system may be a Zemax simulation of the beam propagation.

Other parameters critical to printing high quality parts can include substrate temperature, melt zone temperature, as-built geometry, surface roughness and texture and density. Other critical visible or non-visible metrics include characterization of chemistry, bonding or adhesion strength. Measuring one or more structural or internal properties of the part can comprise one or more methods selected from the group consisting of scattered and reflected or absorbed radiation, x-ray imaging, sound waves, scatterometry techniques, ultrasonic techniques, X-ray Photoelectron Spectroscopy (XPS), Four Transform Infrared Spectroscopy (FTIR), Raman Spectroscopy, Laser-Microprobe Mass Spectrometry (LMMS), and any combination thereof. Specific metrology beneficial to the end goals of characterizing the critical process parameters can be used. This in-situ metrology coupled with fast processing of data can enable open or closed loop control of the manufacturing process. Sensors appropriate to the key parameters of interest can be selected and utilized during the part printing process. The sensors may also comprise a camera for detecting light in the infrared or visible portion of the electromagnetic spectrum. Sensors such as IR cameras may be used to measure temperature fields. An image processing algorithm may be used to evaluate data generated by one or more sensors, to extract one or more structural or internal properties of the part. Visual (e.g., high magnification) microscopy from digital camera(s) can be used with proper software processing to detect voids, defects, and surface roughness. In order to utilize this technique, potentially large quantities of data may need to be interrogated using image processing algorithms in order to extract features of interest. Scatterometry techniques may be adapted to provide roughness or other data.

Ultrasonic techniques can be used to measure solid density and fiber and particle density which in turn may be useful in characterizing bond strength and fiber dispersion. The characterization can affect material strength. Ultrasonic techniques can also be used to measure thickness of features. Chemical bonding characterization, which may be useful for understanding fiber and/or matrix adhesion and layer-to-layer bonding, can be performed by multiple techniques such as X-ray Photoelectron Spectroscopy (XPS), Four Transform Infrared Spectroscopy (FTIR) and Raman Spectroscopy and Laser-Microprobe Mass Spectrometry (LMMS). One or more of these techniques may be utilized as part of the in-situ metrology for 3D printing. Ex-situ techniques may also be utilized in order to help provide appropriate calibration data for the in-situ techniques.

Sensors may be positioned on the robot end-effector of the three-dimensional printer in order to provide a sensor moving along with the deposited material. A robot end-effector may be a device positioned at the end of a robotic arm. The robot end-effector may be programmed to interact with its surrounding environment. Sensors may be also located at other various positions. The positions can be on-board the robot, on the effector, or deployed in the environment. Sensors may be in communication with the system. The system can further comprise one or more processors, a communication unit, memory, power supply, and storage. The communications unit can comprise an input and an output. The communication unit can be wired or wireless. The sensor measurements may or may not be stored in a database, and may or may not be used in future simulation and optimization operations. In-situ measurements may also be made using alternative methods with sensors in a cell but not directly attached to the robot end-effector.

Computer Control Systems

Figure 5:
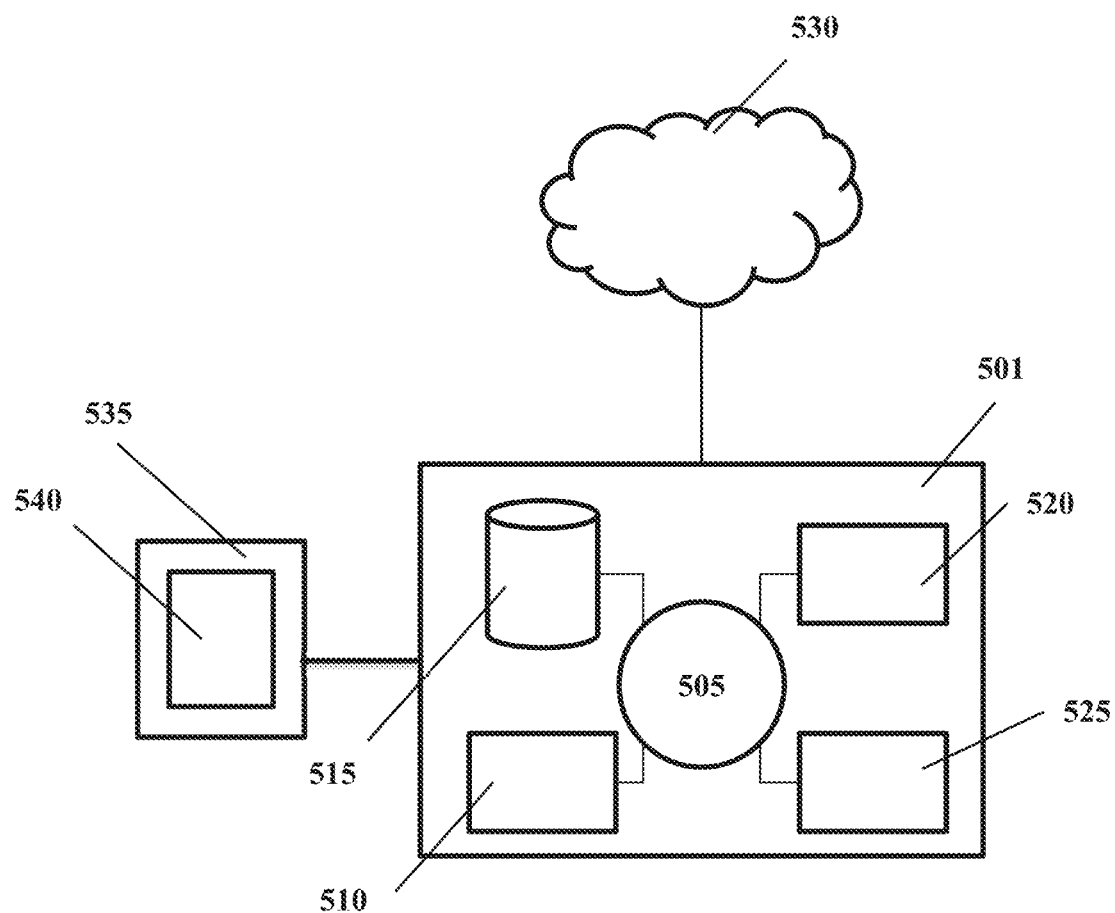
FIG. 5 illustrates a computer control system that is programmed or otherwise configured to implement methods provided herein.

The present disclosure provides computer control systems that are programmed to implement methods of the disclosure. FIG. 5 shows a computer system 501 that is programmed or otherwise configured to implement 3D printing methods and systems of the present disclosure. The computer system 501 can regulate various aspects of methods the present disclosure, such as, for example, partitioning a computer model of a part and generating a mesh array from the computer model.

The computer system 501 includes a central processing unit (CPU, also "processor" and "computer processor" herein) 505, which can be a single core or multi core processor, or a plurality of processors for parallel processing. The computer system 501 also includes memory or memory location 510 (e.g., random-access memory, read-only memory, flash memory), electronic storage unit 515 (e.g., hard disk), communication interface 520 (e.g., network adapter) for communicating with one or more other systems, and peripheral devices 525, such as cache, other memory, data storage and/or electronic display adapters. The memory 510, storage unit 515, interface 520 and peripheral devices 525 are in communication with the CPU 505 through a communication bus (solid lines), such as a motherboard. The storage unit 515 can be a data storage unit (or data repository) for storing data. The computer system 501 can be operatively coupled to a computer network ("network") 530 with the aid of the communication interface 520. The network 530 can be the Internet, an internet and/or extranet, or an intranet and/or extranet that is in communication with the Internet. The network 530 in some cases is a telecommunication and/or data network. The network 530 can include one or more computer servers, which can enable distributed computing, such as cloud computing. The network 530, in some cases with the aid of the computer system 501, can implement a peer-to-peer network, which may enable devices coupled to the computer system 501 to behave as a client or a server.

The CPU 505 can execute a sequence of machine-readable instructions, which can be embodied in a program or software. The instructions may be stored in a memory location, such as the memory 510. The instructions can be directed to the CPU 505, which can subsequently program or otherwise configure the CPU 505 to implement methods of the present disclosure. Examples of operations performed by the CPU 505 can include fetch, decode, execute, and writeback.

The CPU 505 can be part of a circuit, such as an integrated circuit. One or more other components of the system 501 can be included in the circuit. In some cases, the circuit is an application specific integrated circuit (ASIC).

The storage unit 515 can store files, such as drivers, libraries and saved programs. The storage unit 515 can store user data, e.g., user preferences and user programs. The computer system 501 in some cases can include one or more additional data storage units that are external to the computer system 501, such as located on a remote server that is in communication with the computer system 501 through an intranet or the Internet.

The computer system 501 can communicate with one or more remote computer systems through the network 530.

For instance, the computer system 501 can communicate with a remote computer system of a user (e.g., customer or operator of a 3D printing system). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 501 via the network 530.

Methods as described herein can be implemented by way of machine (e.g., computer processor) executable code stored on an electronic storage location of the computer system 501, such as, for example, on the memory 510 or electronic storage unit 515. The machine executable or machine readable code can be provided in the form of software. During use, the code can be executed by the processor 505. In some cases, the code can be retrieved from the storage unit 515 and stored on the memory 510 for ready access by the processor 505. In some situations, the electronic storage unit 515 can be precluded, and machine-executable instructions are stored on memory 510.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 1801, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 501 can include or be in communication with an electronic display 535 that comprises a user interface (UI) 540 for providing, for example, a print head tool path to a user. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 505. The algorithm can, for example, partition a computer model of a part and generate a mesh array from the computer model.

The computer system 501 can include a 3D printing system. The 3D printing system may include one or more 3D printers. A 3D printer may be, for example, a fused filament fabrication (FFF) printer. Alternatively or in addition to, the computer system 501 may be in remote communication with the 3D printing system, such as through the network 530.

EXAMPLES

Example 1

In an example, prior to printing the 3D object, a request for production of a requested 3D object is received from a user (e.g., customer). At least a portion of a 3D object may be printed without extrusion by first receiving, in computer memory, a model of the 3D object. Next, a composite filament material may be directed from a spool toward a channel of the print head. The filament material may then be directed through a nozzle towards a substrate that is configured to support the 3D object. A first layer may be deposited corresponding to a portion of the 3D object adjacent to the substrate. The first layer in the X and Y direction may be deposited in accordance with the model of the 3D object. Additional layers may be deposited onto the first layer in the Z direction. A final layer of at filament material may be deposited. The system may comprise a heater cartridge with thermal control from PID controllers connected to thermocouples. During deposition, the heater cartridges may control the temperature for the system in accordance with the parameters for building the model of the 3D object. The thermocouples may provide feedback to the PID controller and may maintain temperature set points throughout the build process. A laser beam may then be used to selectively melt several portions of the first and last deposited layer, thereby increasing adherence and fusion between adjacent layers. A part of the modulated laser beam may be focused by the focusing system, angled by a pair of optical wedges, and irradiated along the filament material for three-dimensional printing. The 3D object may be allowed to cool prior to removing the object from the substrate. The 3D object may be packaged and then delivered to the customer.

Example 2

In an example, prior to printing the 3D object, a request for production of a requested 3D object is received from a user (e.g., customer). At least a portion of a 3D object may be printed without extrusion by first receiving, in computer memory, a model of the 3D object. Next, a composite filament material may be directed from a spool toward a channel of the print head. The filament material may then be directed through a nozzle towards a substrate that is configured to support the 3D object. A first layer may be deposited corresponding to a portion of the 3D object adjacent to the substrate. The first layer in the X and Y direction may be deposited in accordance with the model of the 3D object. Additional layers may be deposited onto the first layer in the Z direction. A final layer of at filament material may be deposited. The system may comprise a heater cartridge with thermal control from PID controllers connected to thermocouples. During deposition, the heater cartridges may control the temperature for the system in accordance with the parameters for building the model of the 3D object. The thermocouples may provide feedback to the PID controller and may maintain temperature set points throughout the build process. A hot fluid may then be used to selectively melt several portions of the first and last deposited layer, thereby increasing adherence and fusion between adjacent layers. The 3D object may be allowed to cool prior to removing the object from the substrate. The 3D object may be packaged and then delivered to the customer.

Example 3

In an example, prior to printing the 3D object, a request for production of a requested 3D object is received from a user (e.g., customer). At least a portion of a 3D object may be printed without extrusion by first receiving in computer memory, a model of the 3D object. Next, a composite filament material may be directed from a spool toward a channel of the print head. The filament material may then be directed through a nozzle towards a substrate that is configured to support the 3D object. A first layer can be deposited corresponding to a portion of the 3D object adjacent to the substrate, in accordance with the model of the 3D object. A laser beam may then be used to selectively melt several portions of the first layer. Specifically, the laser beam may be directed to the section of the build object where the subsequent segment may be deposited. A part of the modulated laser beam may be focused by the focusing system, angled by a pair of optical wedges, and irradiated along the filament material for three-dimensional printing. The melt pool can span the entire thickness of the printed segment, thereby increasing the adhesion across segments built in the same layer. Next, a second layer of at least a portion of the 3D object may be deposited. This process may be repeated until the 3D object is built. The system may comprise a heater cartridge with thermal control from PID controllers connected to thermocouples. During deposition, the heater cartridges may control the temperature for the system in accordance with the parameters for building the model of the 3D object. The thermocouples may provide feedback to the PID controller and may maintain temperature set points throughout the build process. Upon completion of the build, the 3D object may be allowed to cool prior to removing the object from the substrate. The 3D object may be packaged and then delivered to the customer.

Example 4

In an example, prior to printing the 3D object, a request for production of a requested 3D object is received from a user (e.g., customer). At least a portion of a 3D object may be printed without extrusion by first receiving in computer memory, a model of the 3D object. Next, a composite filament material may be directed from a spool toward a channel of the print head. The filament material may then be directed through a nozzle towards a substrate that is configured to support the 3D object. A first layer can be deposited corresponding to a portion of the 3D object adjacent to the substrate, in accordance with the model of the 3D object. A convective hot fluid (e.g., hot air) may then be used to selectively melt several portions of the first layer. Specifically, the convective hot fluid may be directed to the section of the build object where the subsequent segment may be deposited. The melt pool can span the entire thickness of the printed segment, thereby increasing the adhesion across segments built in the same layer. Next, a second layer of at least a portion of the 3D object may be deposited. This process may be repeated until the 3D object is built. The system may comprise a heater cartridge with thermal control from PID controllers connected to thermocouples. During deposition, the heater cartridges may control the temperature for the system in accordance with the parameters for building the model of the 3D object. The thermocouples may provide feedback to the PID controller and may maintain temperature set points throughout the build process. Upon completion of the build, the 3D object may be allowed to cool prior to removing the object from the substrate. The 3D object may be packaged and then delivered to the customer.

Example 5

In an example, prior to printing the 3D object, a request for production of a requested 3D object may be received from a user (e.g., customer). At least a portion of a 3D object may be printed without extrusion by first receiving in computer memory, a model of the 3D object. Next, a composite filament material may be directed from a spool through an extender mechanism toward a channel of the print head. The extender mechanism can include a motor for dispensing at least one filament material. This composite filament material may be directed from the spool to a channel of the print head through a nozzle towards the substrate. Additionally, the substrate can include a drive mechanism for moving the substrate as each layer is deposited onto the substrate.

From the nozzle, the composite filament material may be directed to at least one freely suspended roller, thereby depositing a first layer corresponding to a portion of the 3D object on the substrate. The composite filament may be fed into a nozzle at an angle such that it is fed under at least one freely suspended roller at a nip point as the freely suspended roller presses the filament material exiting from the nozzle. The freely suspended roller may be designed to control the bend radii of the composite filament material.

Next, the second layer of the 3D object may be deposited. One or more additional layers can be deposited adjacent to the first layer prior to depositing the second layer. At least a first energy beam from at least one energy source may be used to selectively melt at least a portion of the first layer and/or the second layer, thereby forming at least a portion of the 3D object. The energy beam may be a laser beam. The energy source may be in optical communication with one or more beam splitters, which one or more beam splitters can split an energy beam from at least one light source into one or more beamlets that yields at least the first energy beam.

The energy source may be a laser head that is mounted on a robot or similar mechanism that swivels around the vertical axis enabling deposition in any direction in the plane of deposition. During deposition, optical pyrometers may be aimed at the substrate to detect the temperature of the composite filament materials as they are deposited. A real time simulation program (FIG. 4) may also be used to provide feedback control of a given location, direction, or angle of the laser beam normal to the substrate and/or along the substrate among one or more locations, directions, or angles. The sample real time simulation of the optical beam path illustrates that choosing the appropriate wedge angle and energy beam orientation may result in the elliptical beam profile in FIG. 4. The real time simulation program may be a feedback control system. The feedback control system may be a Zemax simulation of the beam propagation. Upon completion of the build, the 3D object may be allowed to cool prior to removing the object from the substrate. The 3D object may be packaged and then delivered to the customer.

Example 6

In an example, prior to printing the 3D object, a request for production of a requested 3D object is received from a user (e.g., customer). At least a portion of a 3D object may be printed with extrusion by first receiving, in computer memory, a model of the 3D object. Next, a composite filament material may be directed from a spool toward a channel of the print head. The filament material may then be directed and extruded through a nozzle towards a substrate that is configured to support the 3D object. A first layer may be deposited corresponding to a portion of the 3D object adjacent to the substrate. The first layer in the X and Y direction may be deposited in accordance with the model of the 3D object. Additional layers may be deposited onto the first layer in the Z direction. A final layer of at filament material may be deposited. The system may comprise a heater cartridge with thermal control from PID controllers connected to thermocouples. During deposition, the heater cartridges may control the temperature for the system in accordance with the parameters for building the model of the 3D object. The thermocouples may provide feedback to the PID controller and may maintain temperature set points throughout the build process. A laser beam may then be used to selectively melt several portions of the first and last deposited layer, thereby increasing adherence and fusion between adjacent layers. A part of the modulated laser beam may be focused by the focusing system, angled by a pair of optical wedges, and irradiated along the filament material for three-dimensional printing. The 3D object may be allowed to cool prior to removing the object from the substrate. The 3D object may be packaged and then delivered to the customer.

Example 7

In an example, prior to printing the 3D object, a request for production of a requested 3D object is received from a user (e.g., customer). At least a portion of a 3D object may be printed with extrusion by first receiving, in computer memory, a model of the 3D object. Next, a composite filament material may be directed from a spool toward a channel of the print head. The filament material may then be directed and extruded through a nozzle towards a substrate that is configured to support the 3D object. A first layer may be deposited corresponding to a portion of the 3D object adjacent to the substrate. The first layer in the X and Y direction may be deposited in accordance with the model of the 3D object. Additional layers may be deposited onto the first layer in the Z direction. A final layer of at filament material may be deposited. The system may comprise a heater cartridge with thermal control from PID controllers connected to thermocouples. During deposition, the heater cartridges may control the temperature for the system in accordance with the parameters for building the model of the 3D object. The thermocouples may provide feedback to the PID controller and may maintain temperature set points throughout the build process. A hot fluid may then be used to selectively melt several portions of the first and last deposited layer, thereby increasing adherence and fusion between adjacent layers. The 3D object may be allowed to cool prior to removing the object from the substrate. The 3D object may be packaged and then delivered to the customer.

Example 8

In an example, prior to printing the 3D object, a request for production of a requested 3D object is received from a user (e.g., customer). At least a portion of a 3D object may be printed with extrusion by first receiving in computer memory, a model of the 3D object. Next, a composite filament material may be directed from a spool toward a channel of the print head. The filament material may then be directed and extruded through a nozzle towards a substrate that is configured to support the 3D object. A first layer can be deposited corresponding to a portion of the 3D object adjacent to the substrate, in accordance with the model of the 3D object. A laser beam may then be used to selectively melt several portions of the first layer. Specifically, the laser beam may be directed to the section of the build object where the subsequent segment may be deposited. A part of the modulated laser beam may be focused by the focusing system, angled by a pair of optical wedges, and irradiated along the filament material for three-dimensional printing. The melt pool can span the entire thickness of the printed segment, thereby increasing the adhesion across segments built in the same layer. Next, a second layer of at least a portion of the 3D object may be deposited. This process may be repeated until the 3D object is built. The system may comprise a heater cartridge with thermal control from PID controllers connected to thermocouples. During deposition, the heater cartridges may control the temperature for the system in accordance with the parameters for building the model of the 3D object. The thermocouples may provide feedback to the PID controller and may maintain temperature set points throughout the build process. Upon completion of the build, the 3D object may be allowed to cool prior to removing the object from the substrate. The 3D object may be packaged and then delivered to the customer.

Example 9

In an example, prior to printing the 3D object, a request for production of a requested 3D object is received from a user (e.g., customer). At least a portion of a 3D object may be printed with extrusion by first receiving in computer memory, a model of the 3D object. Next, a composite filament material may be directed from a spool toward a channel of the print head. The filament material may then be directed and extruded through a nozzle towards a substrate that is configured to support the 3D object. A first layer can be deposited corresponding to a portion of the 3D object adjacent to the substrate, in accordance with the model of the 3D object. A convective hot fluid (e.g., hot air) may then be used to selectively melt several portions of the first layer. Specifically, the convective hot fluid may be directed to the section of the build object where the subsequent segment may be deposited. The melt pool can span the entire thickness of the printed segment, thereby increasing the adhesion across segments built in the same layer. Next, a second layer of at least a portion of the 3D object may be deposited. This process may be repeated until the 3D object is built. The system may comprise a heater cartridge with thermal control from PID controllers connected to thermocouples. During deposition, the heater cartridges may control the temperature for the system in accordance with the parameters for building the model of the 3D object. The thermocouples may provide feedback to the PID controller and may maintain temperature set points throughout the build process. Upon completion of the build, the 3D object may be allowed to cool prior to removing the object from the substrate. The 3D object may be packaged and then delivered to the customer.

Example 10

In an example, prior to printing the 3D object, a request for production of a requested 3D object may be received from a user (e.g., customer). At least a portion of a 3D object may be printed with extrusion by first receiving in computer memory, a model of the 3D object. Next, a composite filament material may be directed from a spool through an extender mechanism toward a channel of the print head. The composite filament material may be extruded from the nozzle of the print heat. The extender mechanism can include a motor for dispensing at least one filament material. This composite filament material may be directed from the spool to a channel of the print head through a nozzle towards the substrate. Additionally, the substrate can include a drive mechanism for moving the substrate as each layer is deposited onto the substrate.

From the nozzle, the composite filament material may be directed to at least one freely suspended roller, thereby depositing a first layer corresponding to a portion of the 3D object on the substrate. The composite filament may be fed into a nozzle at an angle such that it is fed under at least one freely suspended roller at a nip point as the freely suspended roller presses the filament material exiting from the nozzle. The freely suspended roller may be designed to control the bend radii of the composite filament material.

Next, the second layer of the 3D object may be deposited. One or more additional layers can be deposited adjacent to the first layer prior to depositing the second layer. At least a first energy beam from at least one energy source may be used to selectively melt at least a portion of the first layer and/or the second layer, thereby forming at least a portion of the 3D object. The energy beam may be a laser beam. The energy source may be in optical communication with one or more beam splitters, which one or more beam splitters can split an energy beam from at least one light source into one or more beamlets that yields at least the first energy beam.

The energy source may be a laser head that is mounted on a robot or similar mechanism that swivels around the vertical axis enabling deposition in any direction in the plane of deposition. During deposition, optical pyrometers may be aimed at the substrate to detect the temperature of the composite filament materials as they are deposited. A real time simulation program (FIG. 4) may also be used to provide feedback control of a given location, direction, or angle of the laser beam normal to the substrate and/or along the substrate among one or more locations, directions, or angles. The sample real time simulation of the optical beam path illustrates that choosing the appropriate wedge angle and energy beam orientation may result in the elliptical beam profile in FIG. 4. The real time simulation program may be a feedback control system. The feedback control system may be a Zemax simulation of the beam propagation. Upon completion of the build, the 3D object may be allowed to cool prior to removing the object from the substrate. The 3D object may be packaged and then delivered to the customer.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for printing at least a portion of a three-dimensional (3D) object, the method comprising:
   receiving, in a computer memory, a model of the 3D object;
   subsequent to receiving the model of the 3D object, directing, by a printing unit, a first segment of a filament material from a source of the filament material through an opening of the printing unit, and from the opening towards a freely suspended roller and a substrate that is configured to support the 3D object;
   depositing, by the printing unit, the first segment of the filament material adjacent to the substrate, resulting in a first layer of filament material being deposited, wherein the first layer is deposited without extrusion and in accordance with the model of the 3D object, and wherein the filament material is not a metal;
   melting, with energy from at least one energy source, at least a portion of the first layer; and
   depositing, by the printing unit, a second segment of the filament material over the first layer, resulting in a second layer of filament material being deposited, wherein the second layer is deposited without extrusion and in accordance with the model of the 3D object, thereby printing the portion of the 3D object.

2. The method of claim 1, further comprising melting, with energy from the at least one energy source, at least a portion of the second layer.

3. The method of claim 1, further comprising depositing one or more additional layers adjacent to the first layer prior to depositing the second layer.

4. The method of claim 1, wherein the filament material is a continuous fiber composite.

5. The method of claim 4, wherein the continuous fiber composite comprises a polymeric material and a reinforcing material.

6. The method of claim 1, wherein the at least one energy source provides the energy in a form of at least one energy beam.

7. The method of claim 6, wherein the at least one energy beam is incident on the filament material and on the substrate.

8. The method of claim 1, wherein the directing of the first segment of the filament material from the source towards the substrate is to a compaction unit.

9. The method of claim 8, further comprising compacting, by the compaction unit, the first layer of filament material.

10. The method of claim 1, further comprising measuring, by one or more sensors, one or more temperatures along the filament material during the printing.

11. The method of claim 1, wherein the at least one energy source comprises a convective fluid source, and wherein the melting of the at least the portion of the first layer comprises directing a convective fluid from the convective fluid source to the first layer to provide the energy to melt the at least the portion of the first layer.

12. The method of claim 11, wherein the convective fluid is directed through the printing unit.

13. The method of claim 1, further comprising:
   measuring, via feedback control, one or more properties of the first layer or the second layer during the printing; and
   adjusting, via the feedback control, one or more process parameters associated with the energy or the at least one energy source based on the one or more properties measured.

14. The method of claim 13, wherein the adjusting of the one or more process parameters comprises using a real time simulation program to adjust the one or more process parameters.

15. The method of claim 1, wherein the at least one energy source comprises a laser.

16. The method of claim 1, wherein the at least one energy source comprises a plurality of energy sources.

17. The method of claim 1, wherein the energy from the at least one energy source is external to the printing unit.

18. The method of claim 1, further comprising compacting, by a compaction unit, the second layer against the first layer.

19. The method of claim 18, further comprising cooling the compaction unit such that, upon compaction, the second layer is removable from the compaction unit.

20. The method of claim 1, wherein the filament material comprises a polymer.

21. The method of claim 1, wherein the depositing of the second segment of the filament material occurs while the at least the portion of the first layer is molten.

* * * * *